United States Patent [19]

Misholi

[11] Patent Number: 5,008,926
[45] Date of Patent: Apr. 16, 1991

[54] MESSAGE MANAGEMENT SYSTEM

[75] Inventor: Boaz Misholi, Ramat Hasharon, Israel

[73] Assignee: Efrat Future Technology Ltd., Israel

[21] Appl. No.: 887,793

[22] Filed: Jul. 17, 1986

[51] Int. Cl.$^5$ .................. H04M 3/50; H04M 11/00; H04N 1/32; H04N 1/42
[52] U.S. Cl. .................. 379/89; 358/403; 379/94; 379/96; 379/100
[58] Field of Search .................. 379/100, 96, 94, 88, 379/89; 358/257, 402, 403, 440

[56] References Cited

U.S. PATENT DOCUMENTS

| | | | |
|---|---|---|---|
| 3,993,862 | 11/1976 | Karr | 358/261.1 |
| 4,371,752 | 2/1983 | Matthews et al. | 379/89 |
| 4,518,989 | 5/1985 | Yabiki et al. | 358/86 |
| 4,523,055 | 6/1985 | Hohl et al. | 379/89 |
| 4,837,798 | 6/1989 | Cohen et al. | 379/88 |

FOREIGN PATENT DOCUMENTS

| | | | |
|---|---|---|---|
| 57-4653 | 1/1982 | Japan . | |
| 57-38055 | 3/1982 | Japan . | |
| 57-119537 | 7/1982 | Japan . | |
| 57-119541 | 7/1982 | Japan . | |
| 57-192167 | 11/1982 | Japan . | |
| 58-138148 | 8/1983 | Japan . | |
| 58-138162 | 8/1983 | Japan . | |
| 58-165452 | 9/1983 | Japan . | |
| 58-175342 | 10/1983 | Japan . | |
| 0187055 | 11/1983 | Japan | 379/89 |
| 0027664 | 2/1984 | Japan . | |
| 0030352 | 2/1984 | Japan | 379/100 |
| 59-99846 | 6/1984 | Japan . | |
| 59-117845 | 7/1984 | Japan . | |
| 0214366 | 12/1984 | Japan | 379/100 |
| 0046647 | 3/1985 | Japan | 379/100 |
| 0119161 | 6/1985 | Japan | 379/88 |
| 0119164 | 6/1985 | Japan | 379/100 |
| 0134554 | 7/1985 | Japan | 379/100 |
| 0197059 | 10/1985 | Japan | 379/100 |
| 0248057 | 12/1985 | Japan | 379/100 |
| 0132464 | 6/1987 | Japan | 379/100 |

OTHER PUBLICATIONS

"Japan is Making INS a Reality", M. Kuwabara, *Telephony*, Oct. 24, 1983, pp. 64, 68, 70, 74, 76, 78 and 81.
"Integrated Digital Switching System with Queuing Storage Facility", S. Hattori et al., International Conf. on Communications, Seattle, Wash., U.S.A. (8-12 Jun. 1980), pp. 27.4/1-5.
"The EMS Communications System Integrates the Flow of Information", G. Mierzowsky, *Telcom Report* 8 (1985), No. 1 (Siemens), pp. 47-50.
"Meridian SL Information Services", L. Lee et al., Telesis 1985 Two (Bell Northern Res., Ltd., Canada), pp. 13-19.

*Primary Examiner*—Thomas W. Brown
*Attorney, Agent, or Firm*—Ostrolenk, Faber, Gerb & Soffen

[57] ABSTRACT

A message management system comprising apparatus for producing a multi-media message, including a visually sensible portion and an aurally sensible portion, control apparatus for transmitting the multi-media message to a selected subscriber and apparatus for providing notification to the selected subscriber of the arrival of a multi-media message.

13 Claims, 56 Drawing Sheets

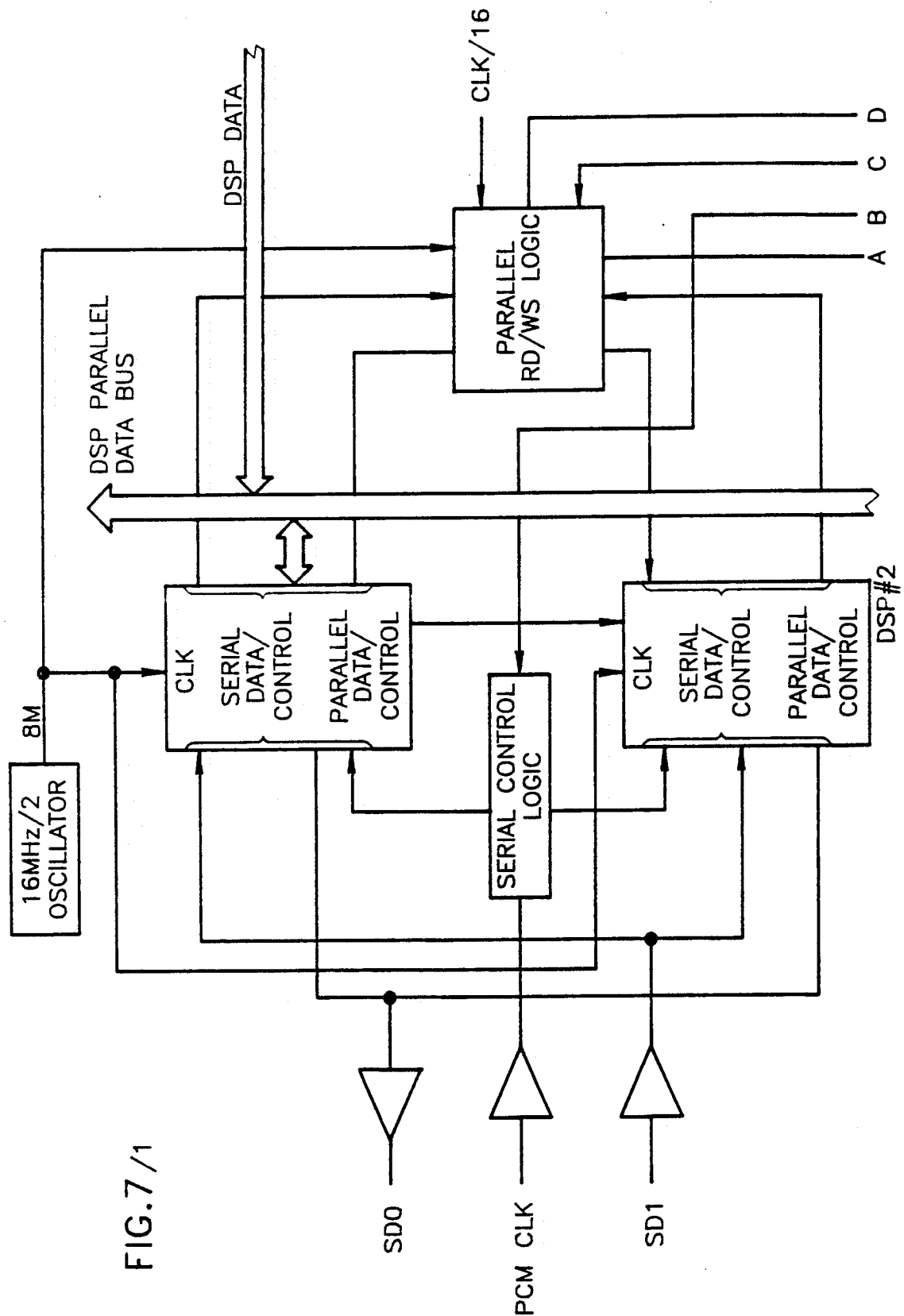
FIG.7/1

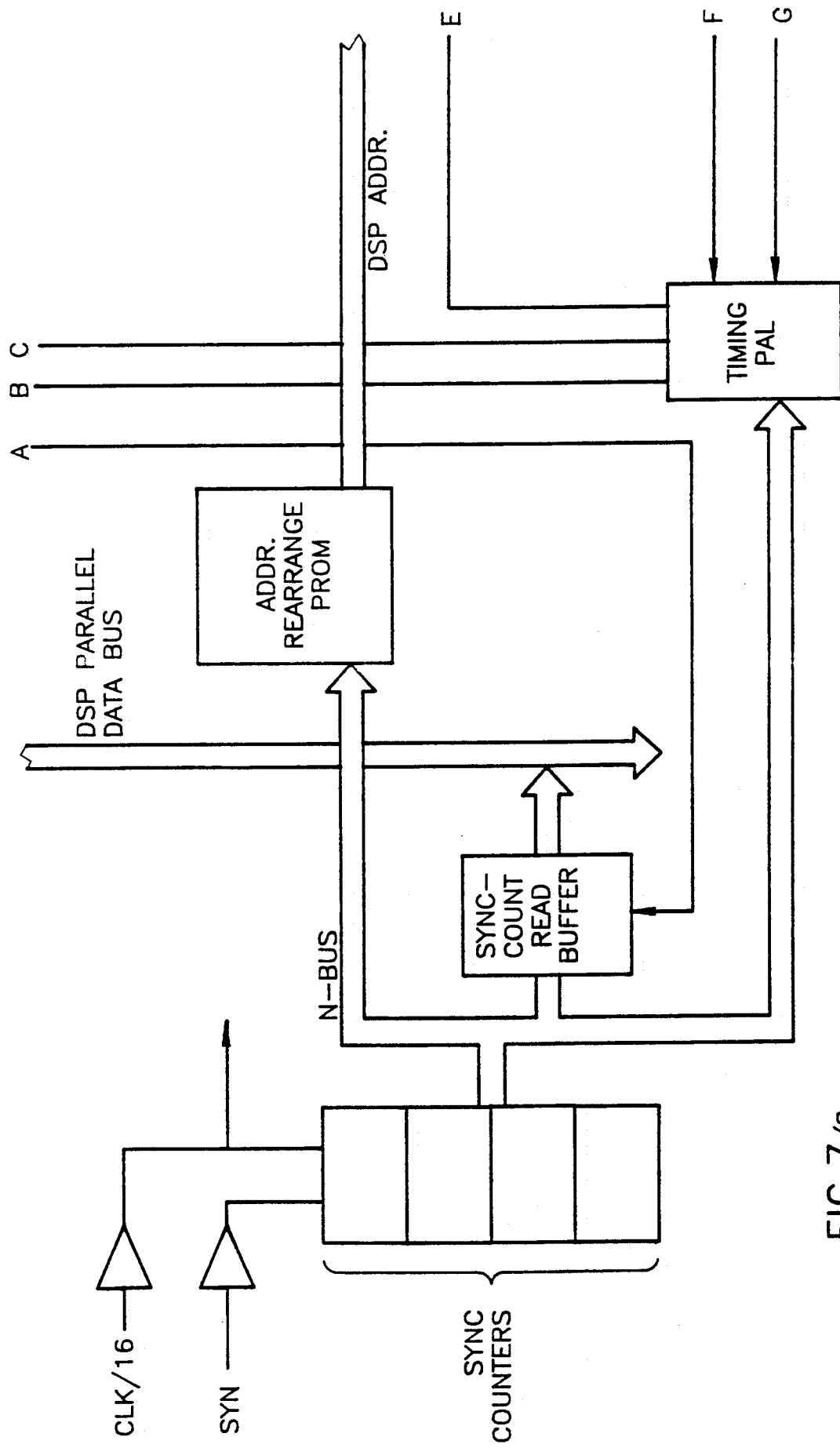
FIG.7/2

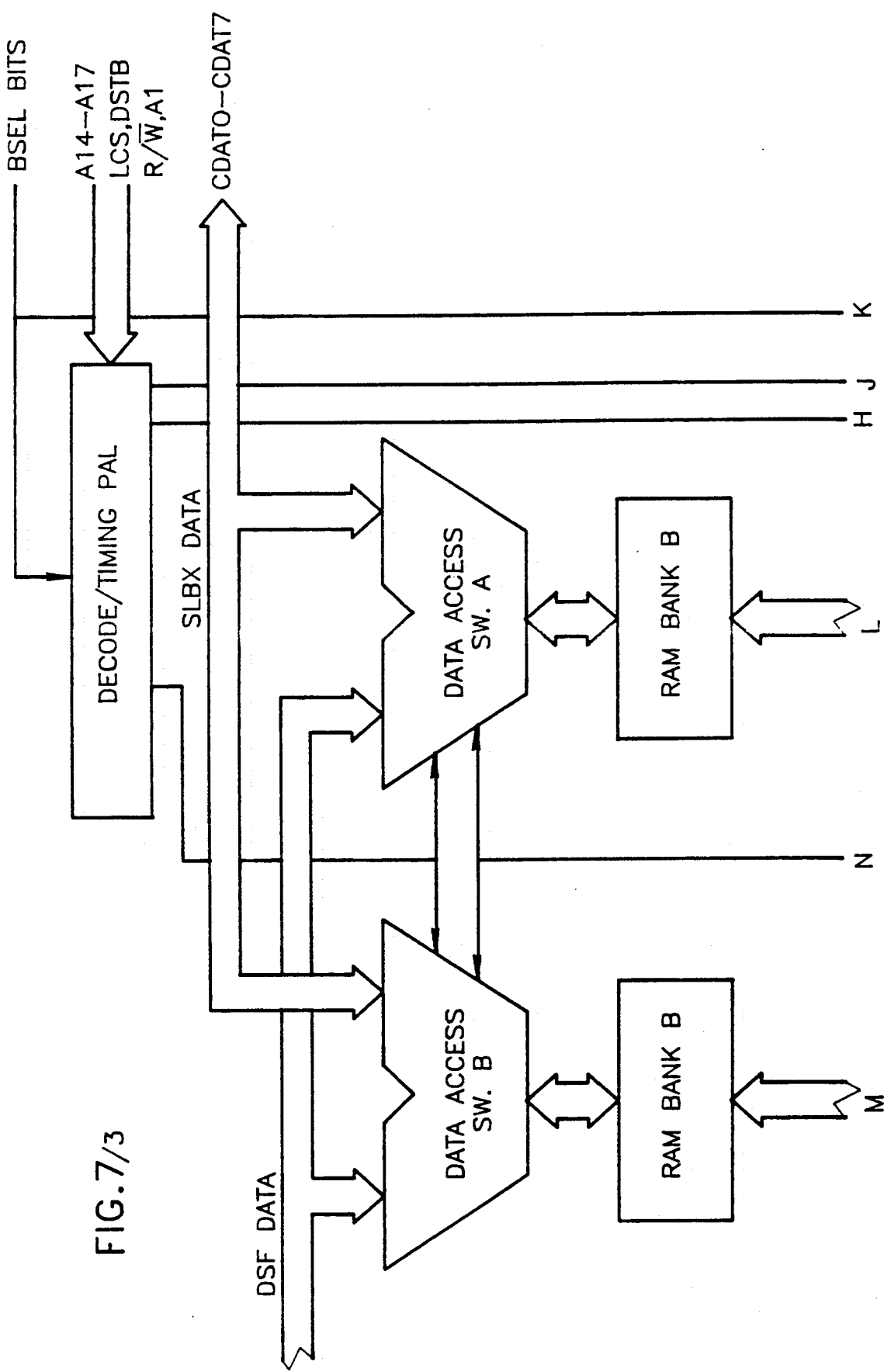
FIG. 7/3

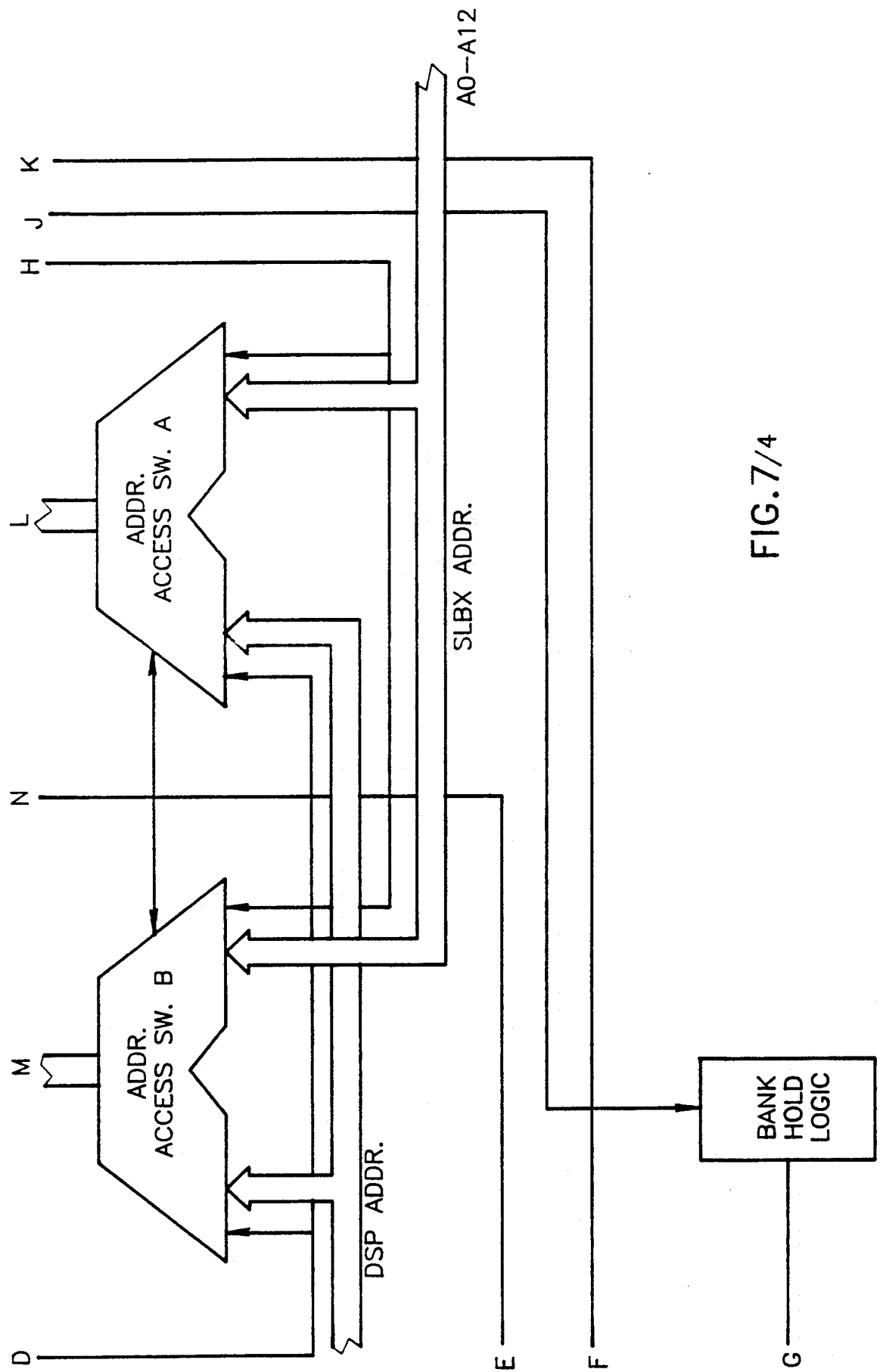
FIG. 7/4

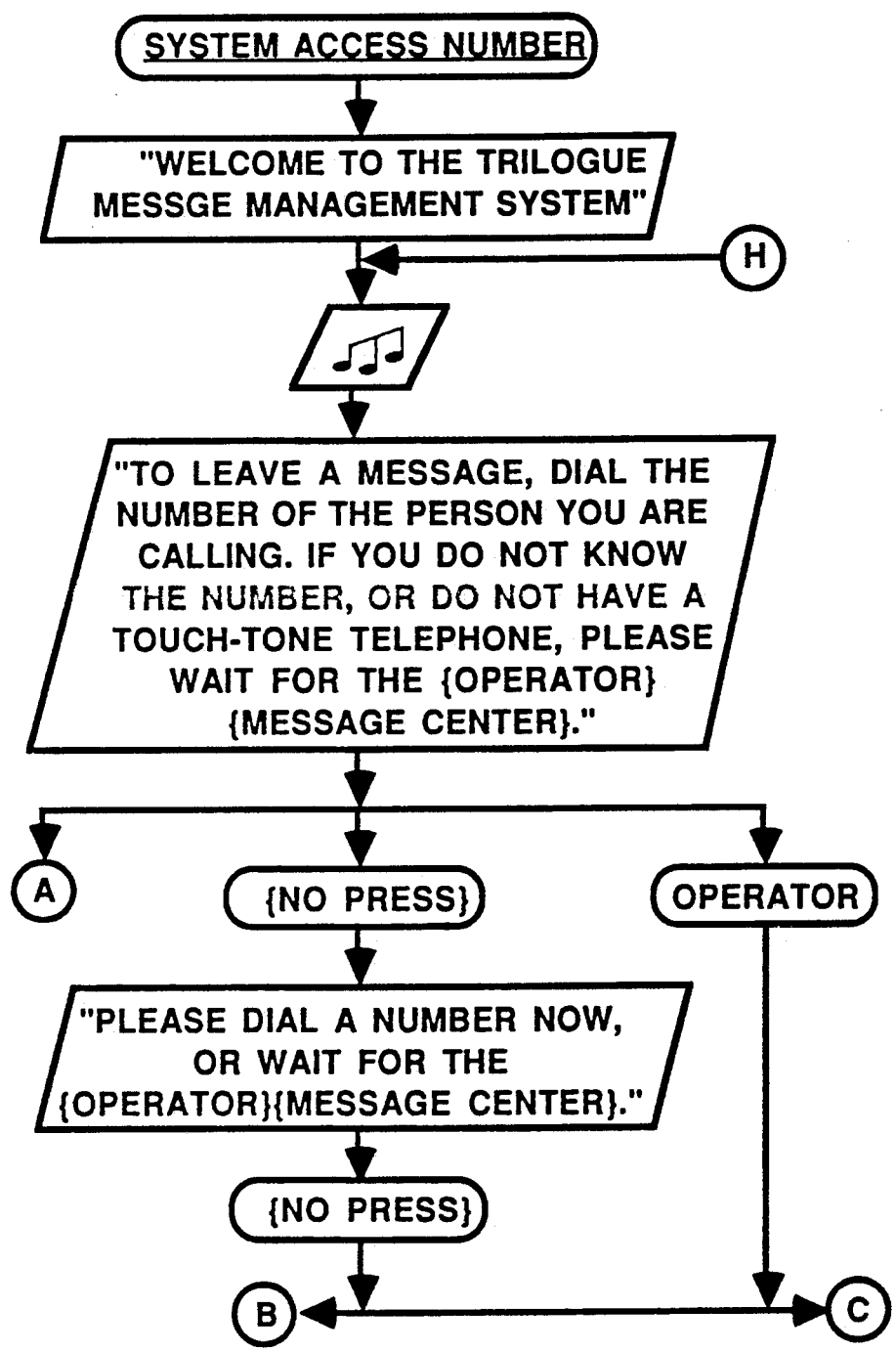
FIG. 9/1

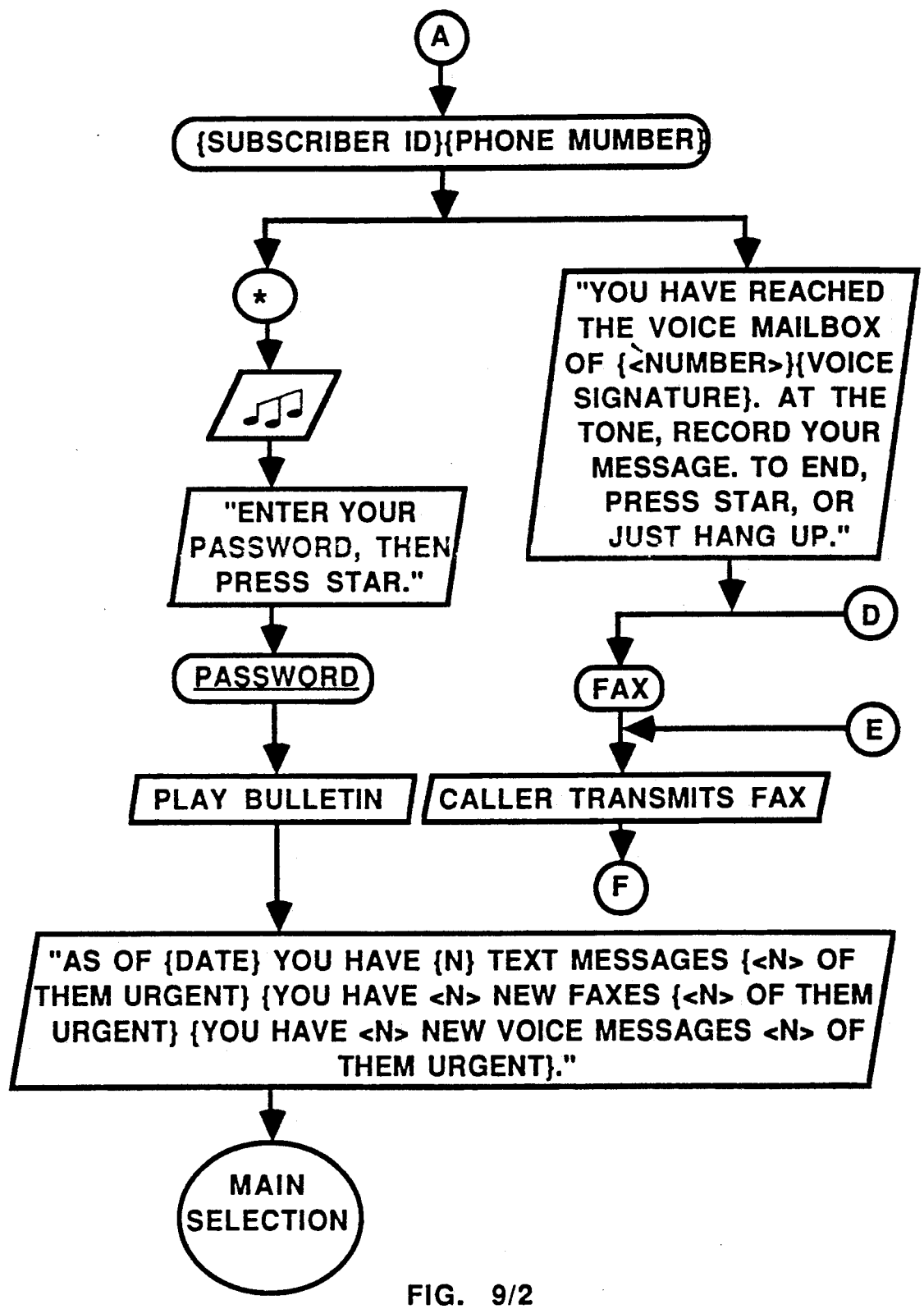
FIG. 9/2

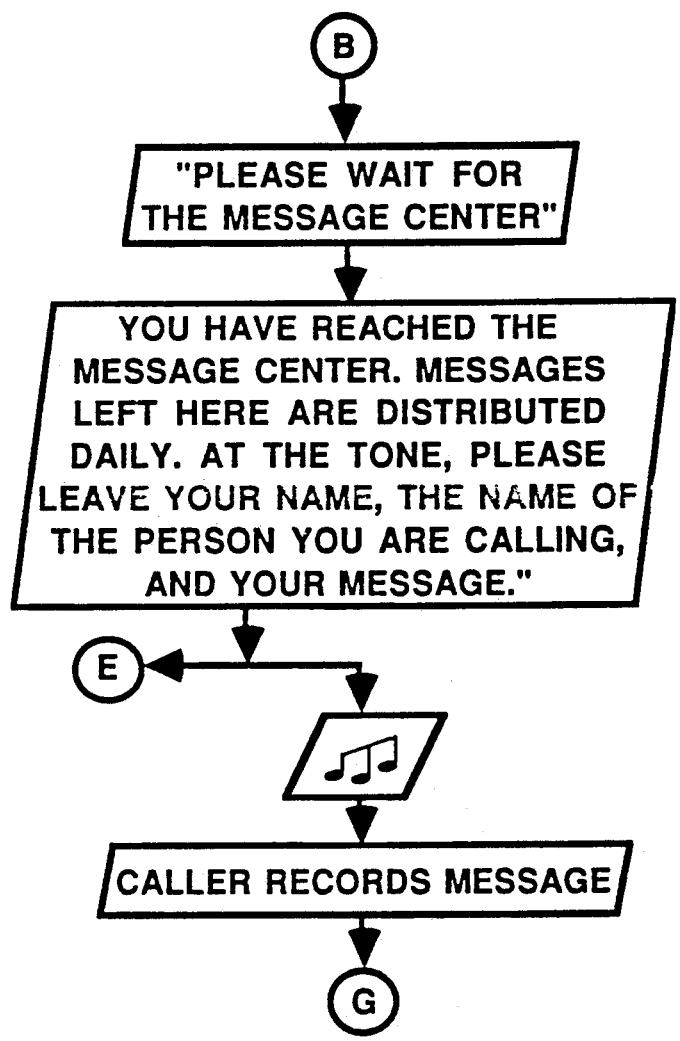
FIG. 9/3

WELCOME SESSION
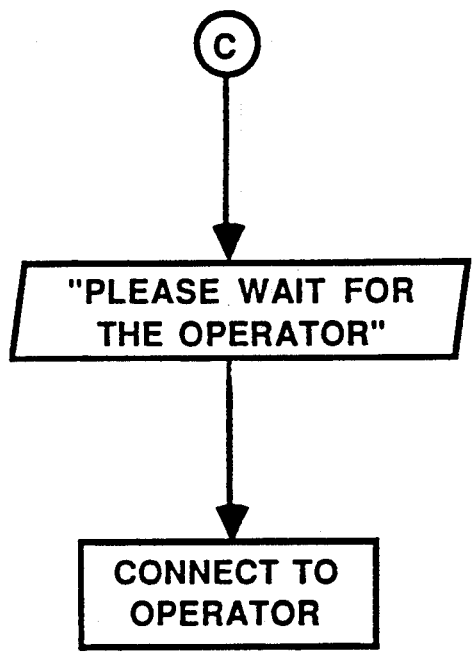
FIG. 9/4

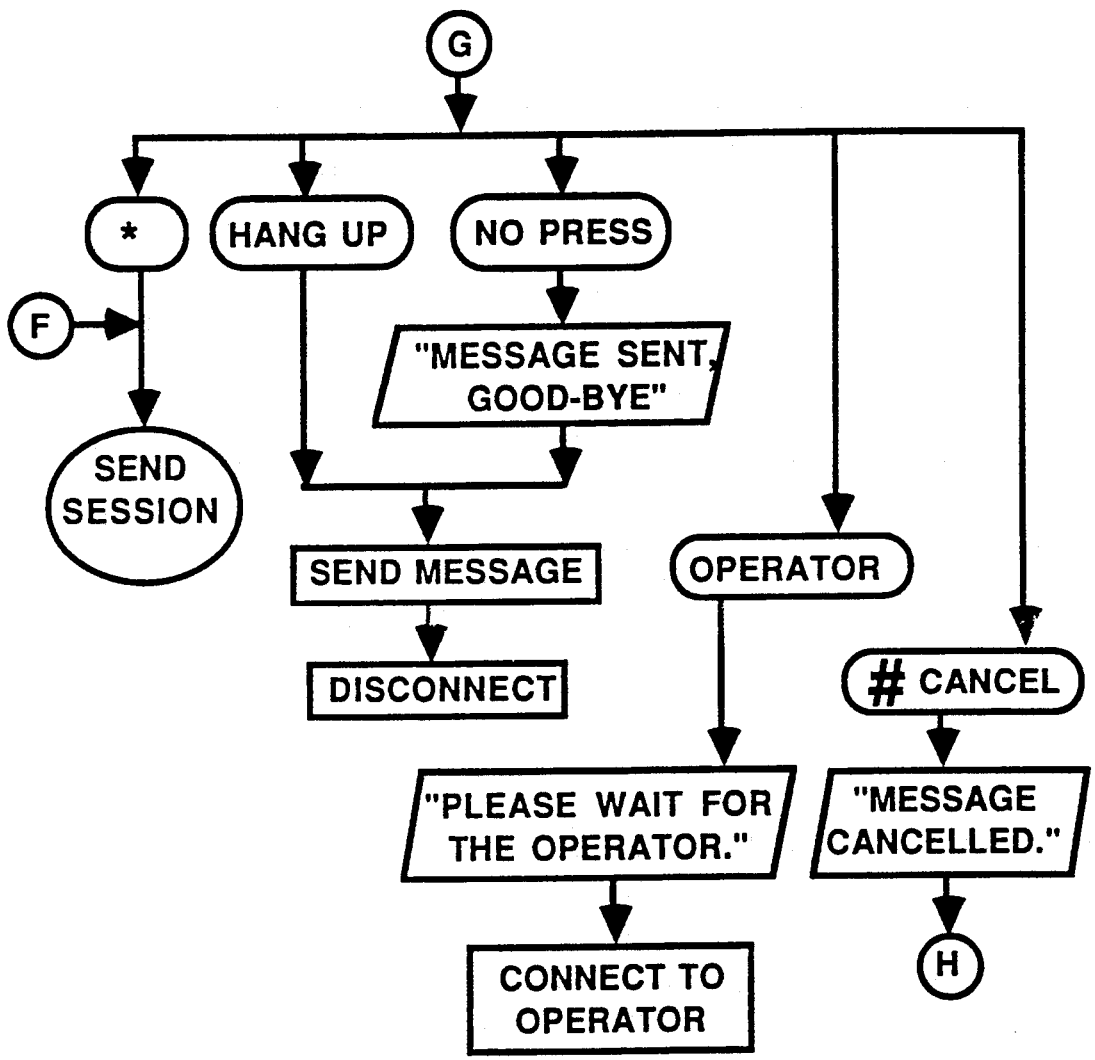
FIG. 9/5

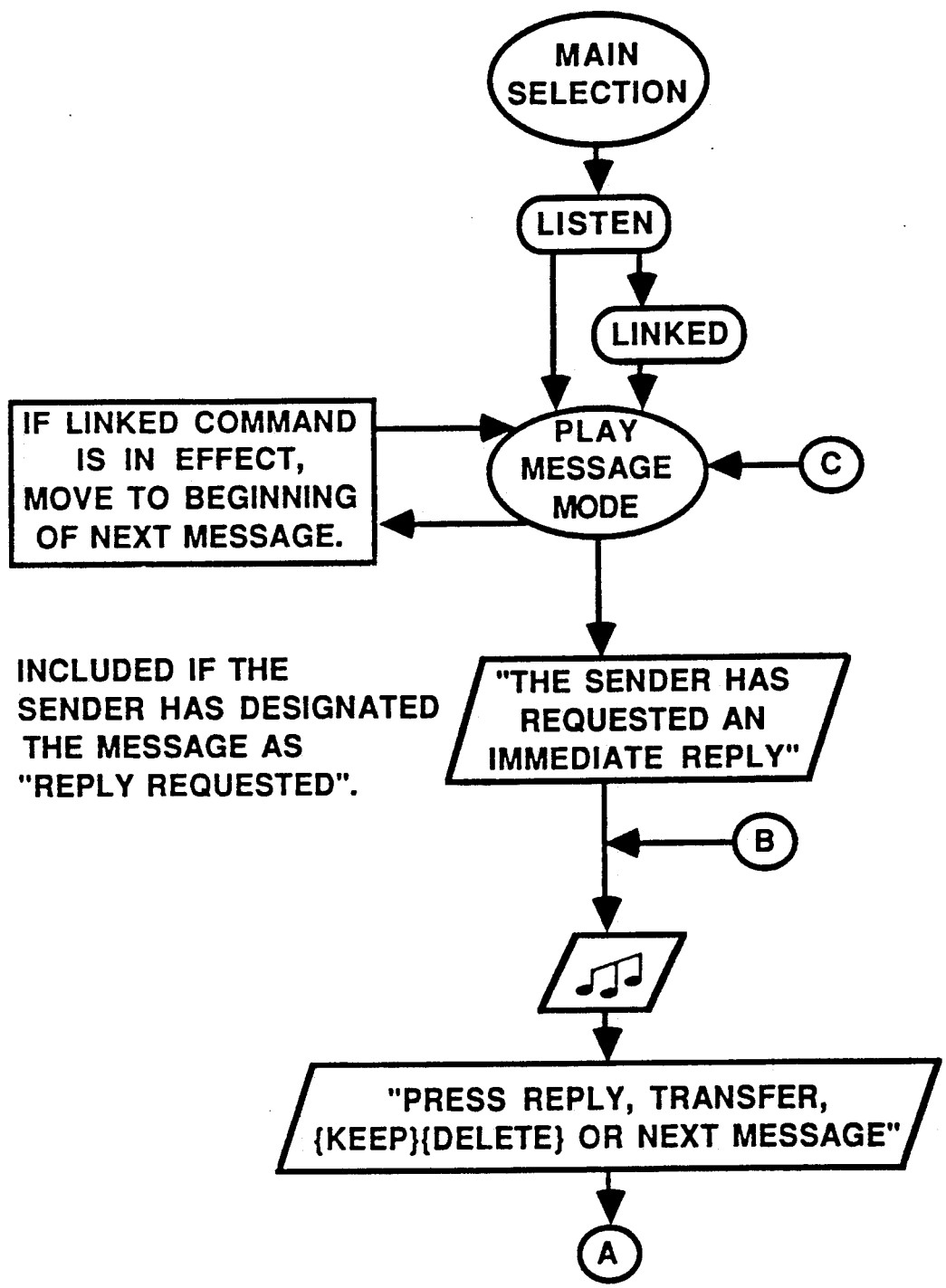
FIG. 12/1

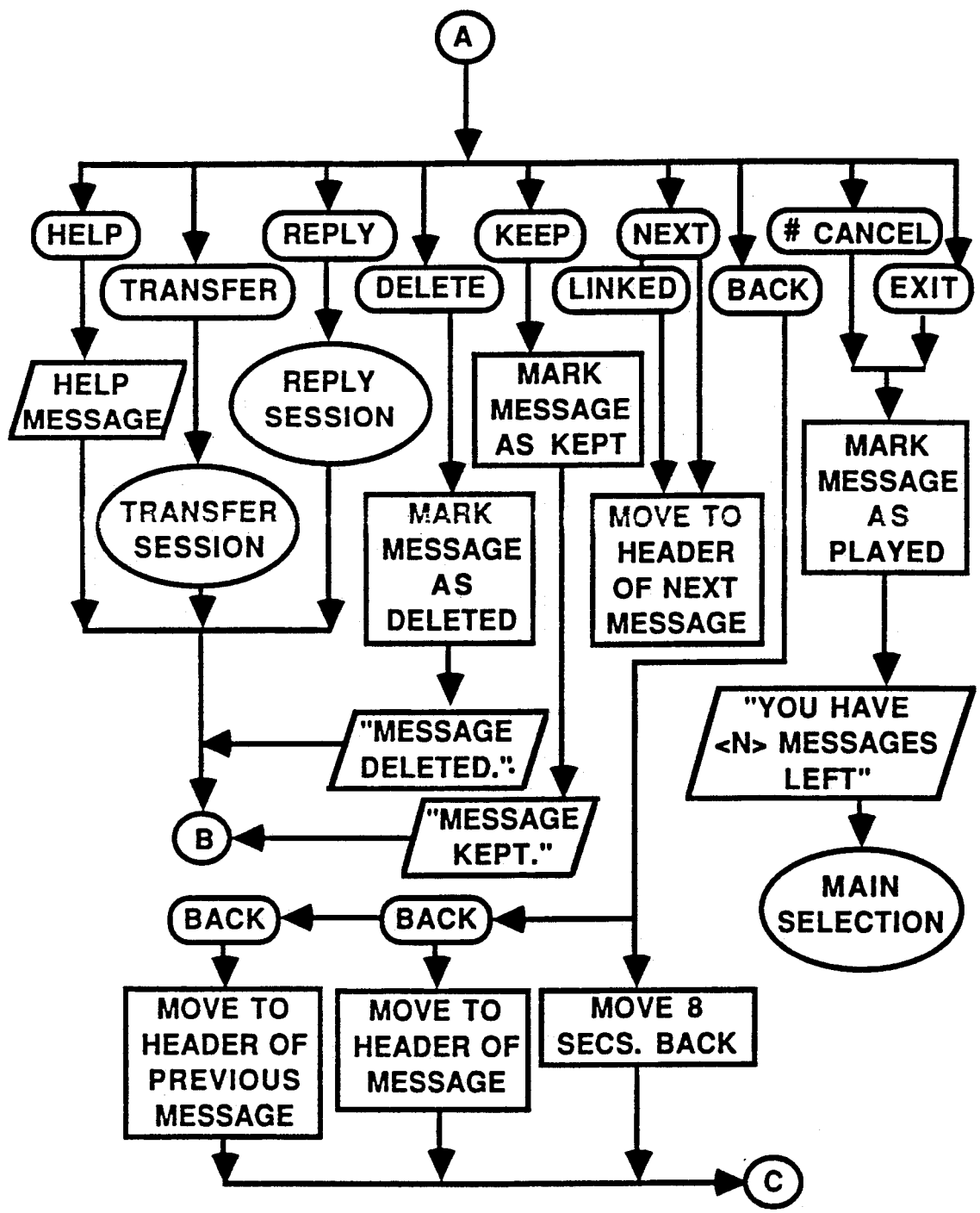
FIG. 12/2

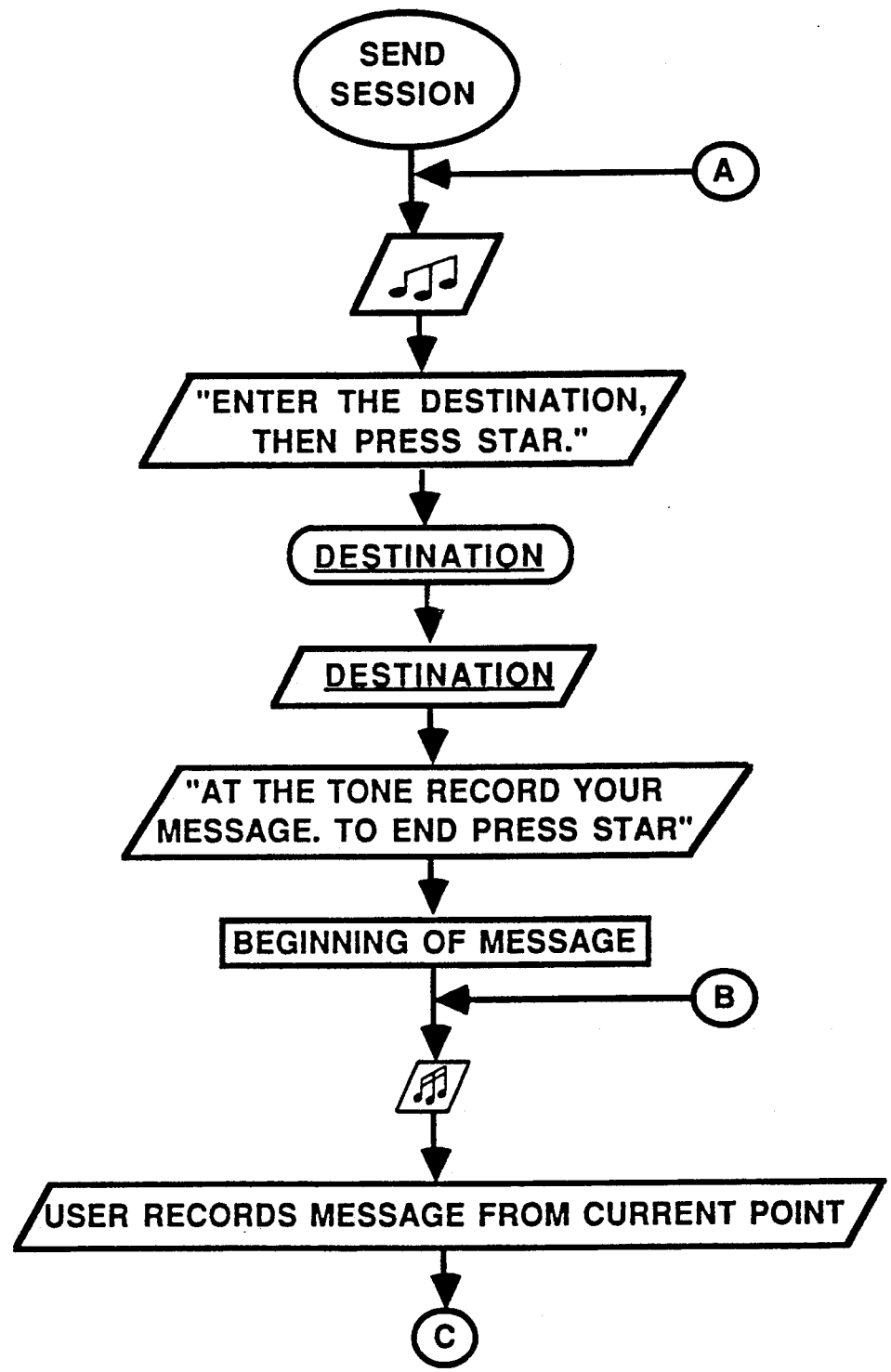
FIG. 13/1

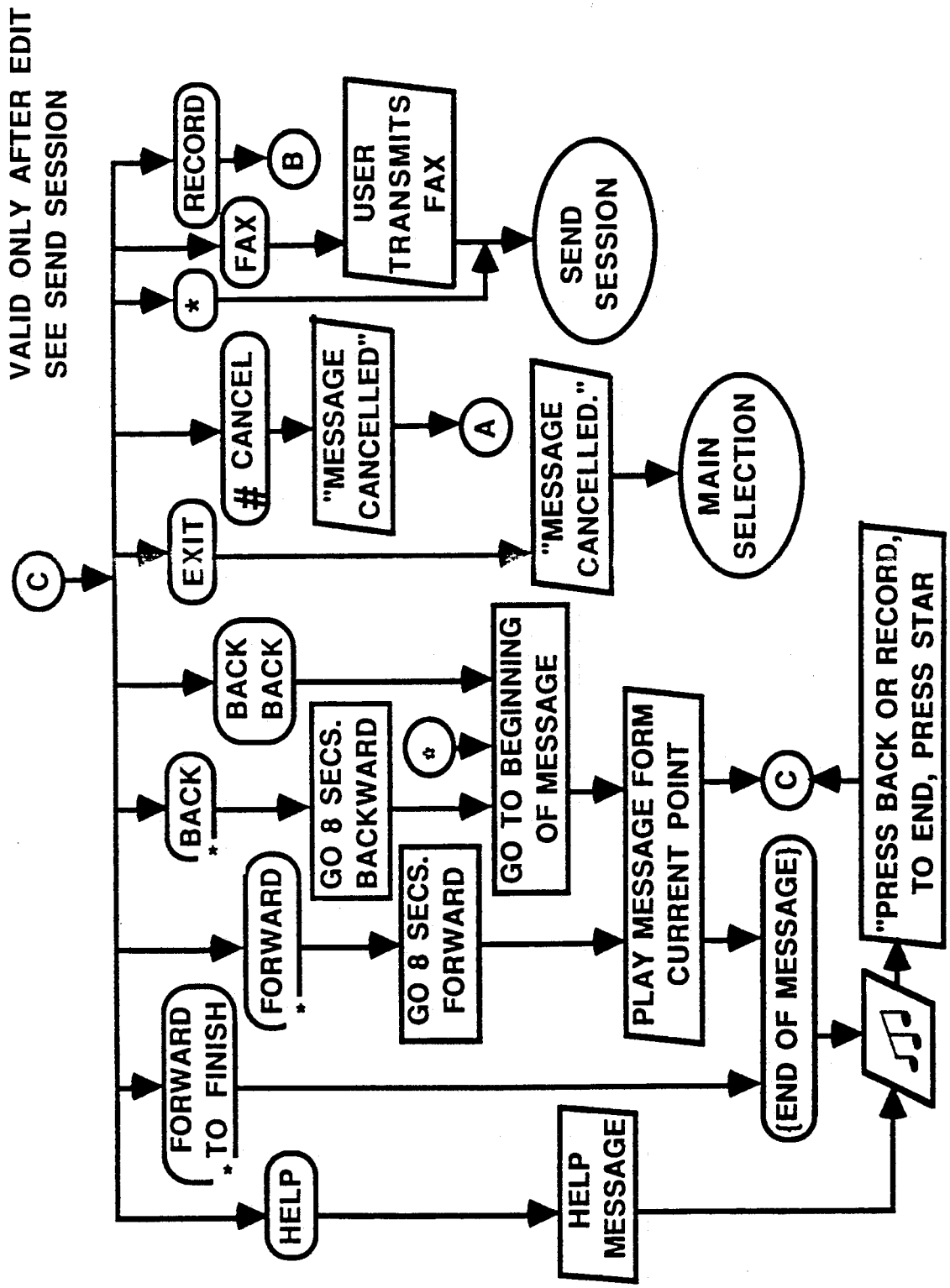
FIG. 13/2

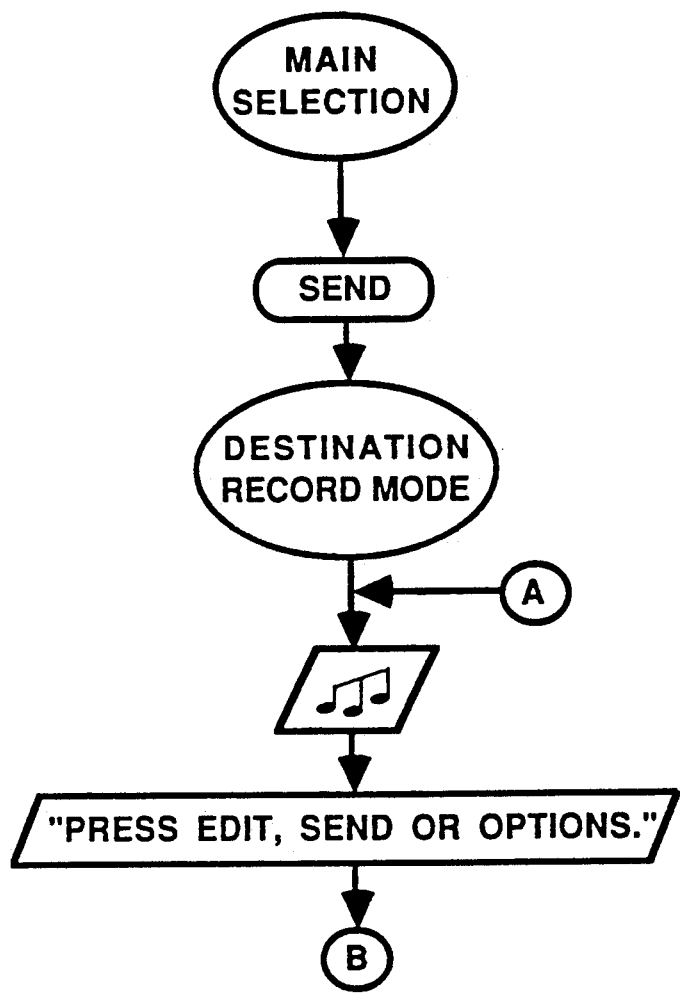
FIG. 14/1

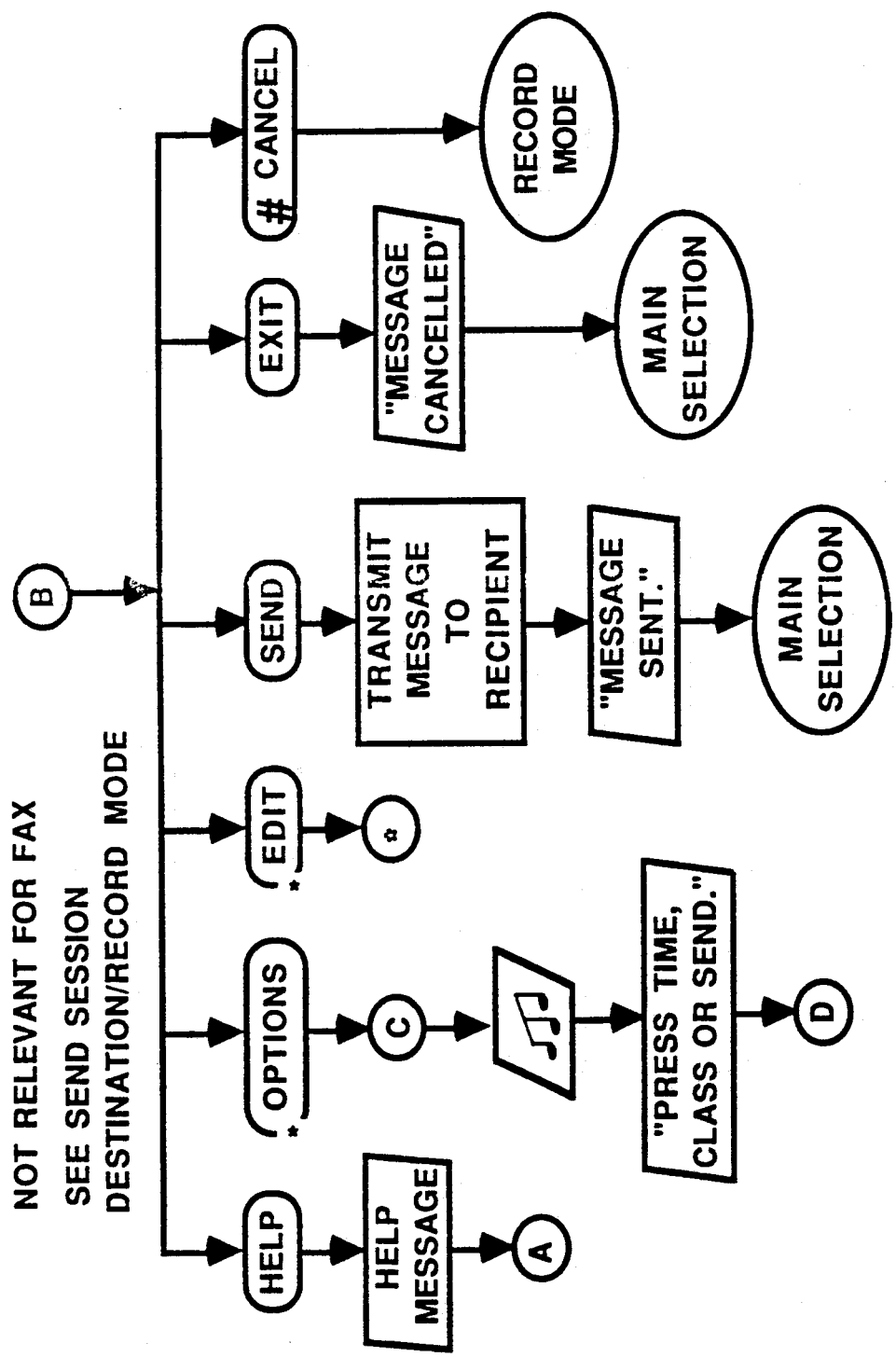
FIG. 14/2

SEND SESSION
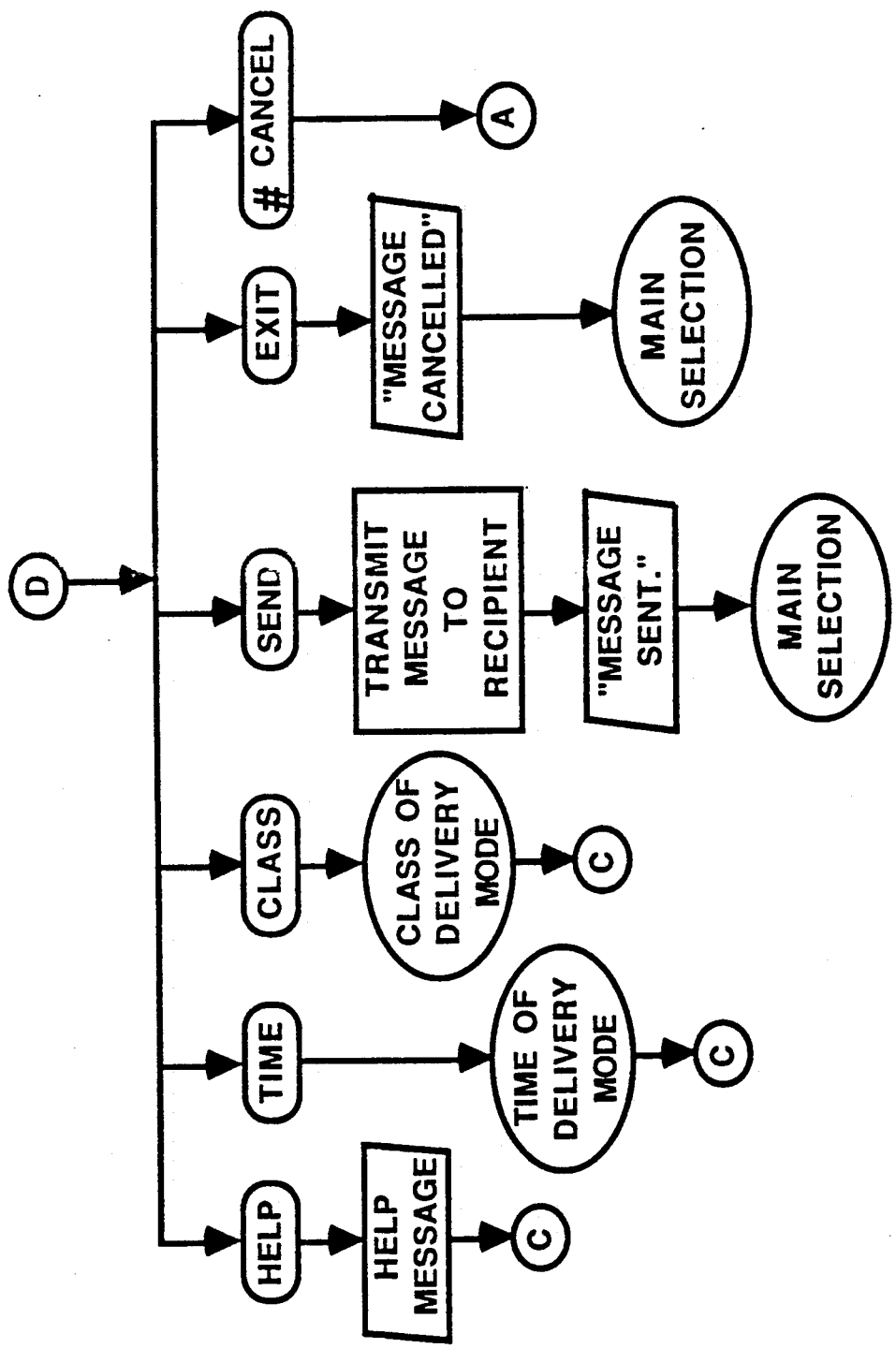
FIG. 14/3

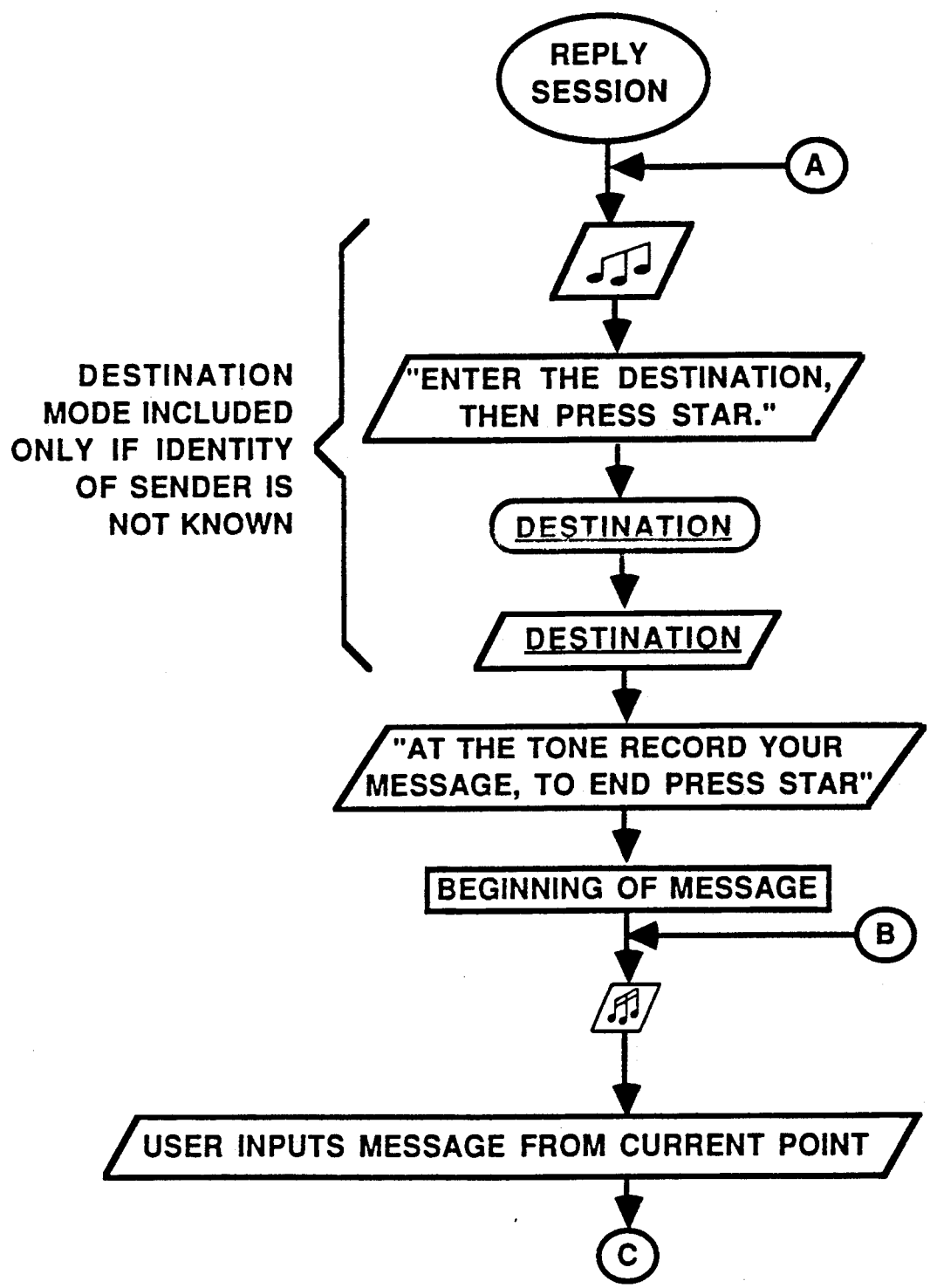
FIG. 17/1

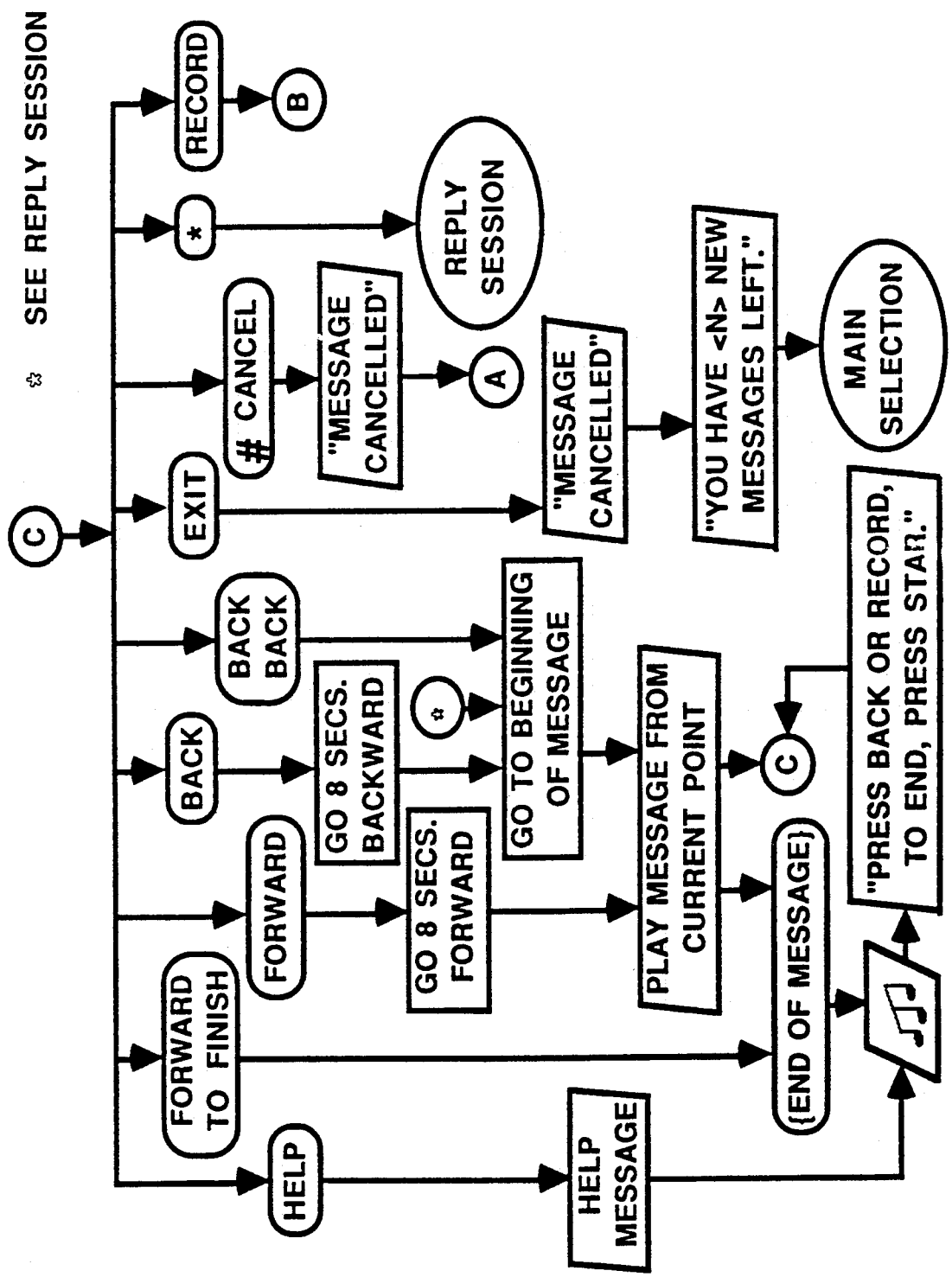
FIG. 17/2

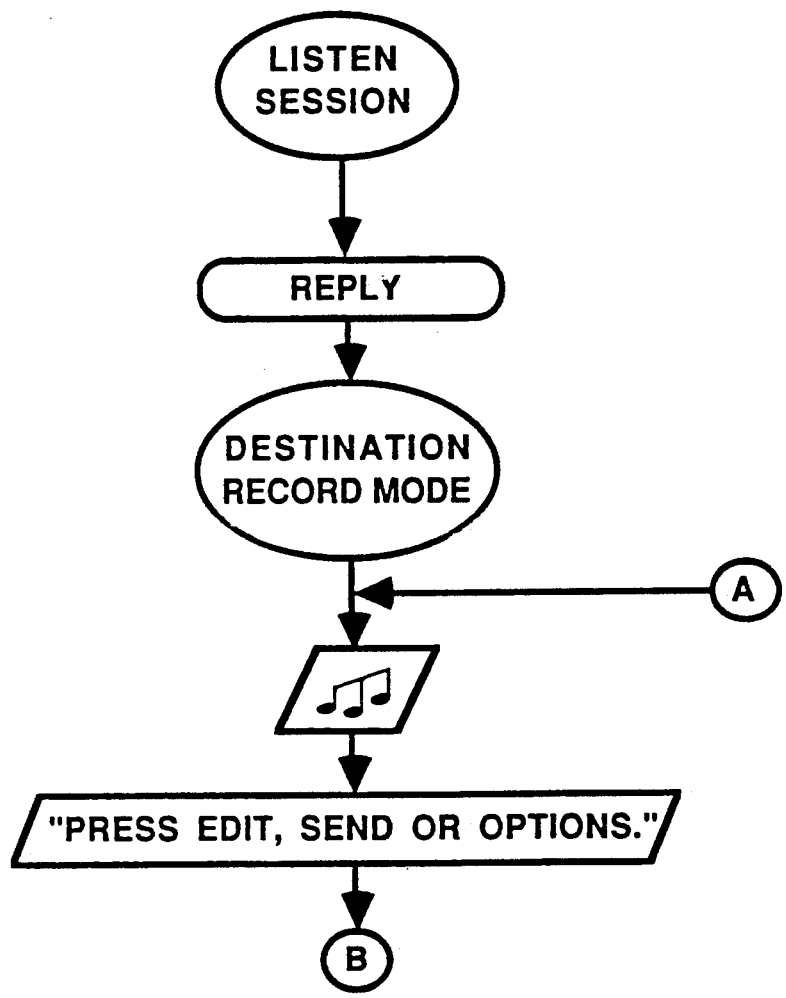
FIG. 18/1

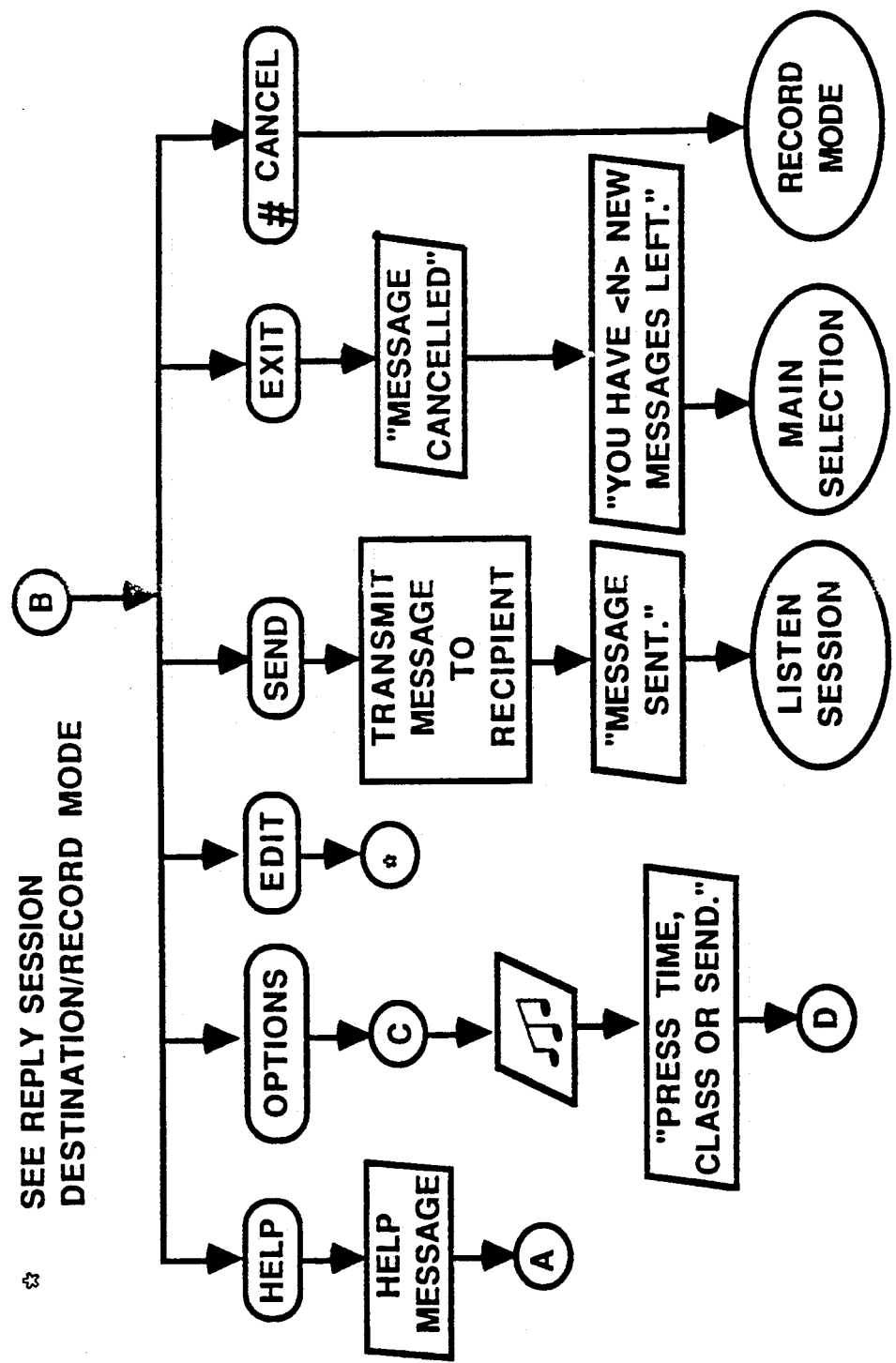
FIG. 18/2

REPLY SESSION
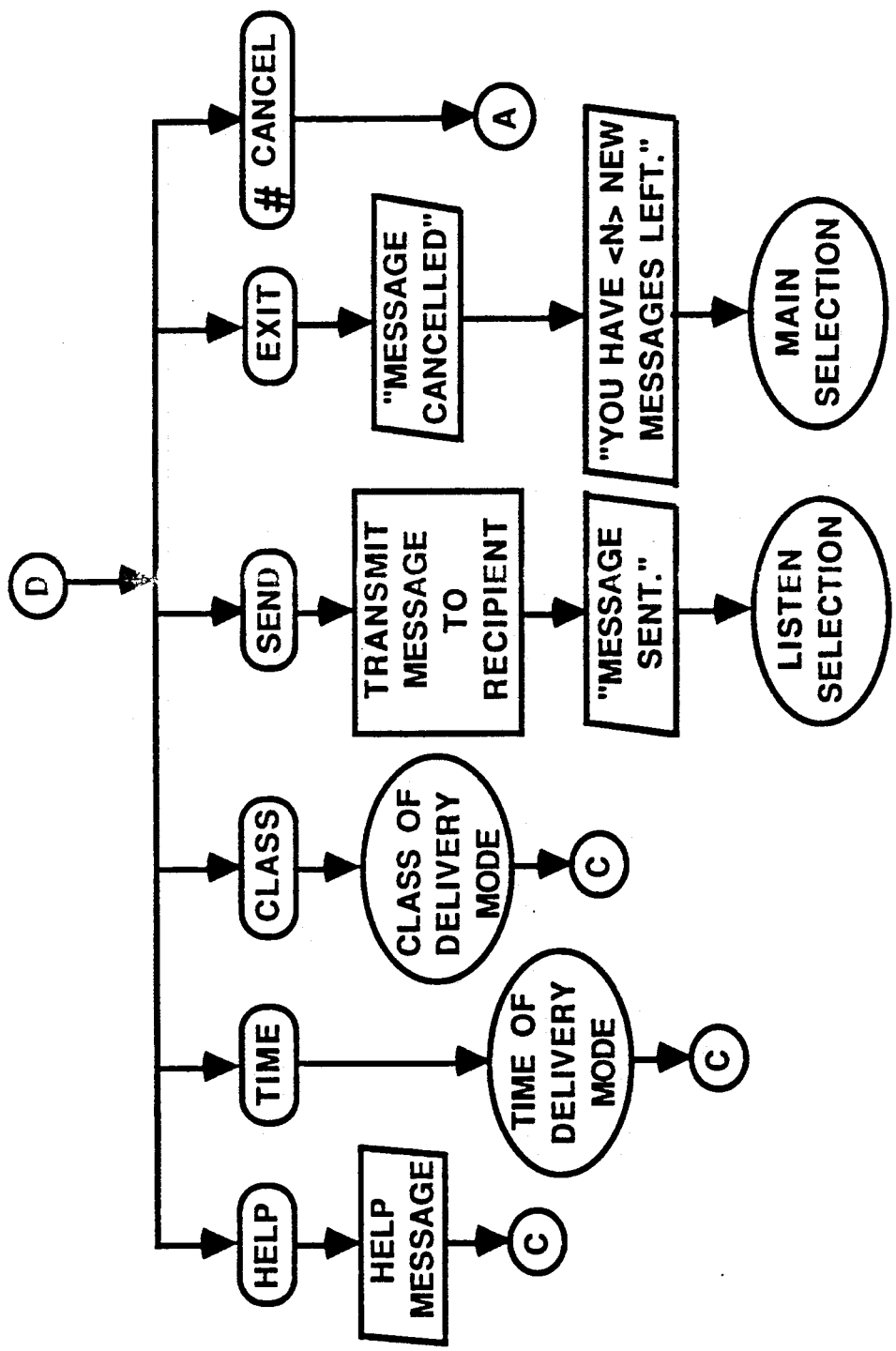
FIG. 18/3

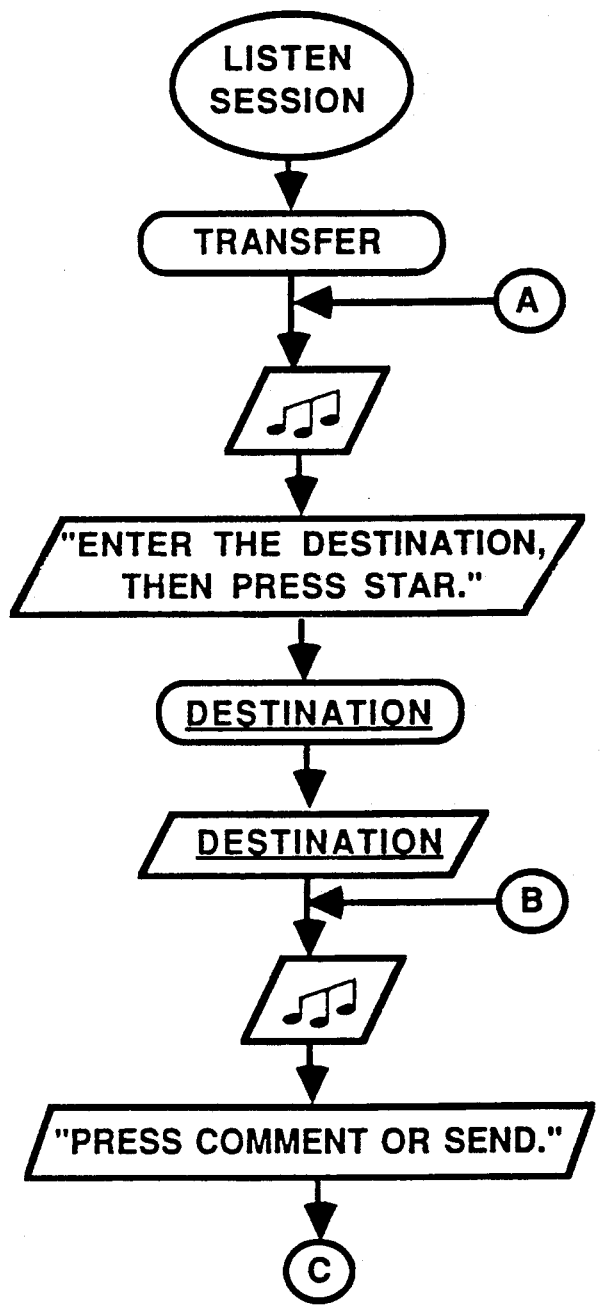
FIG. 19/1

SEND SESSION
DESTINATION/RECORD MODE
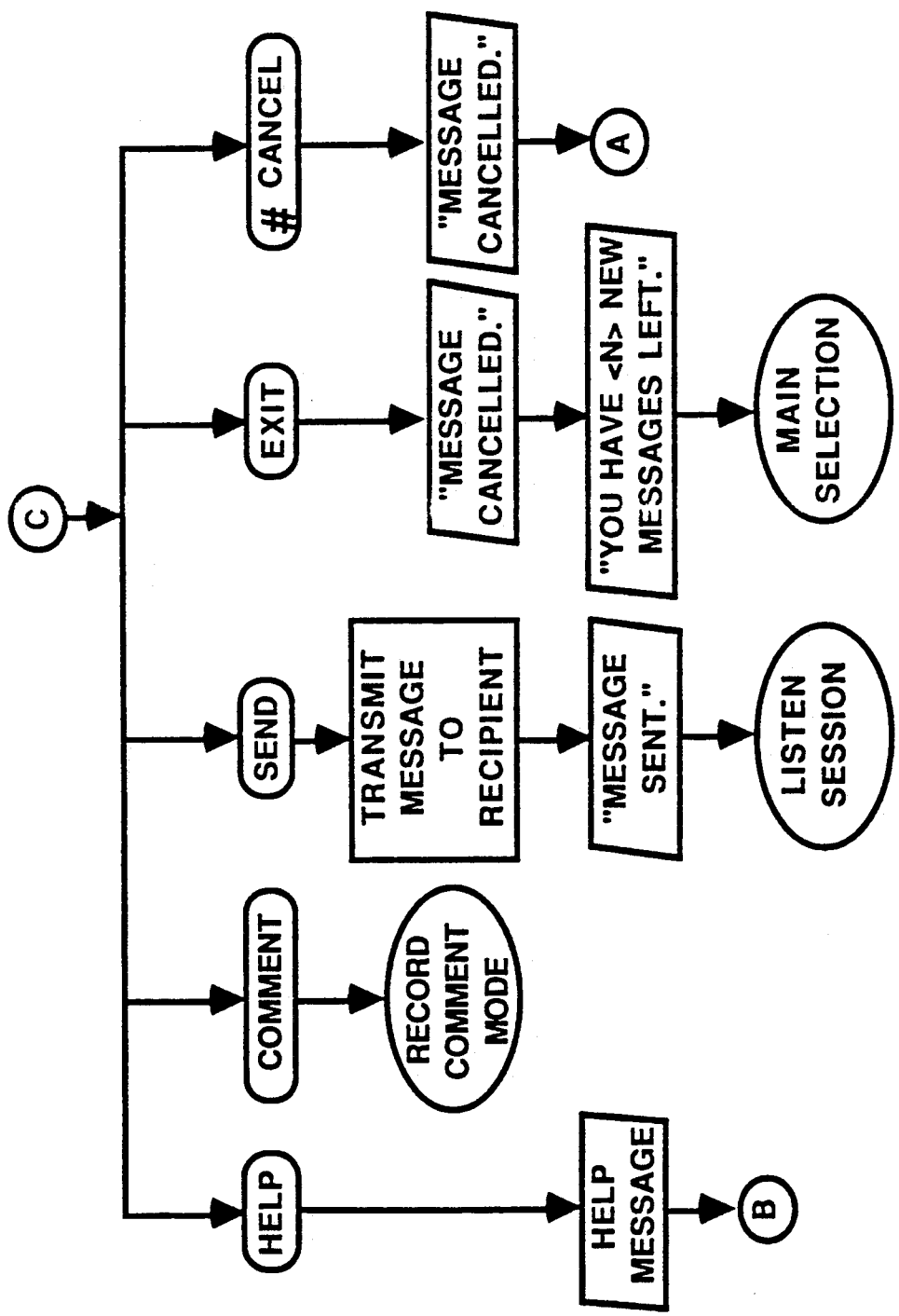
FIG. 19/2

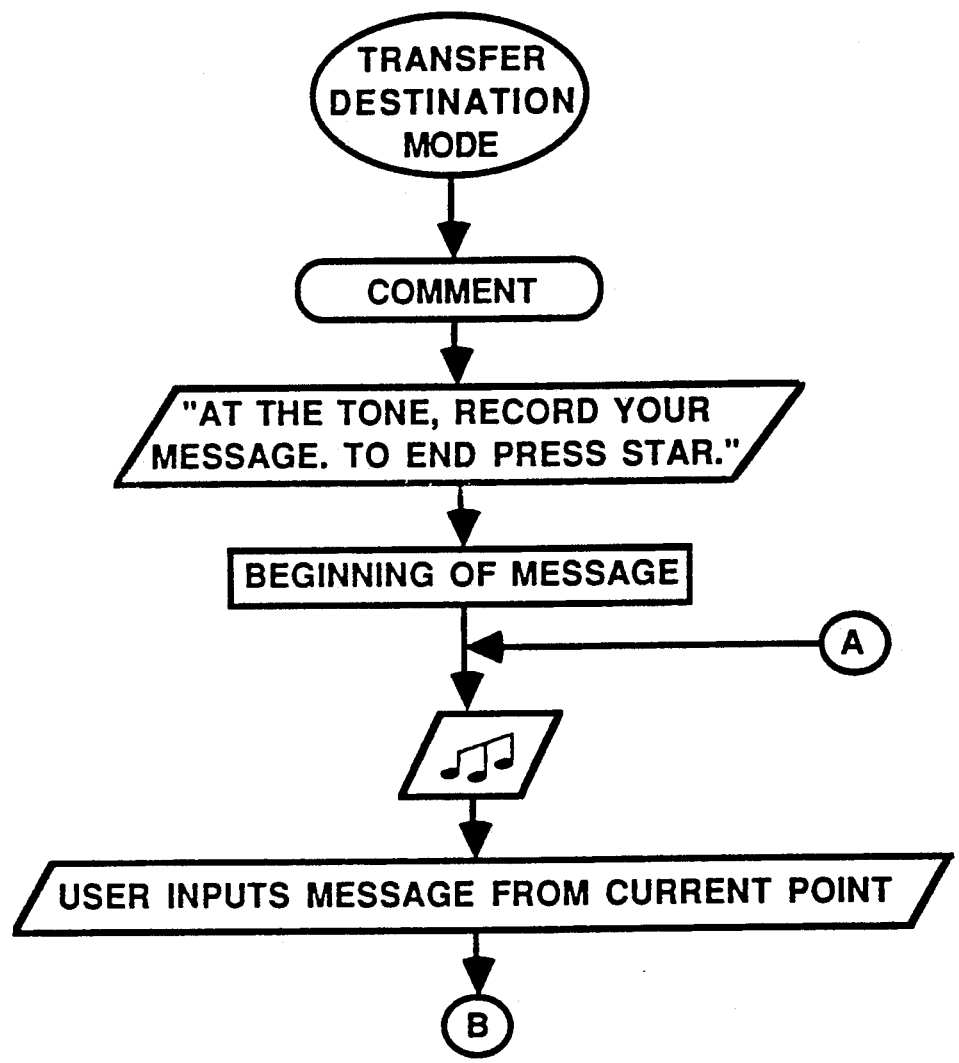
FIG. 20/1

TRANSFER SESSION
RECORD COMMENT MODE
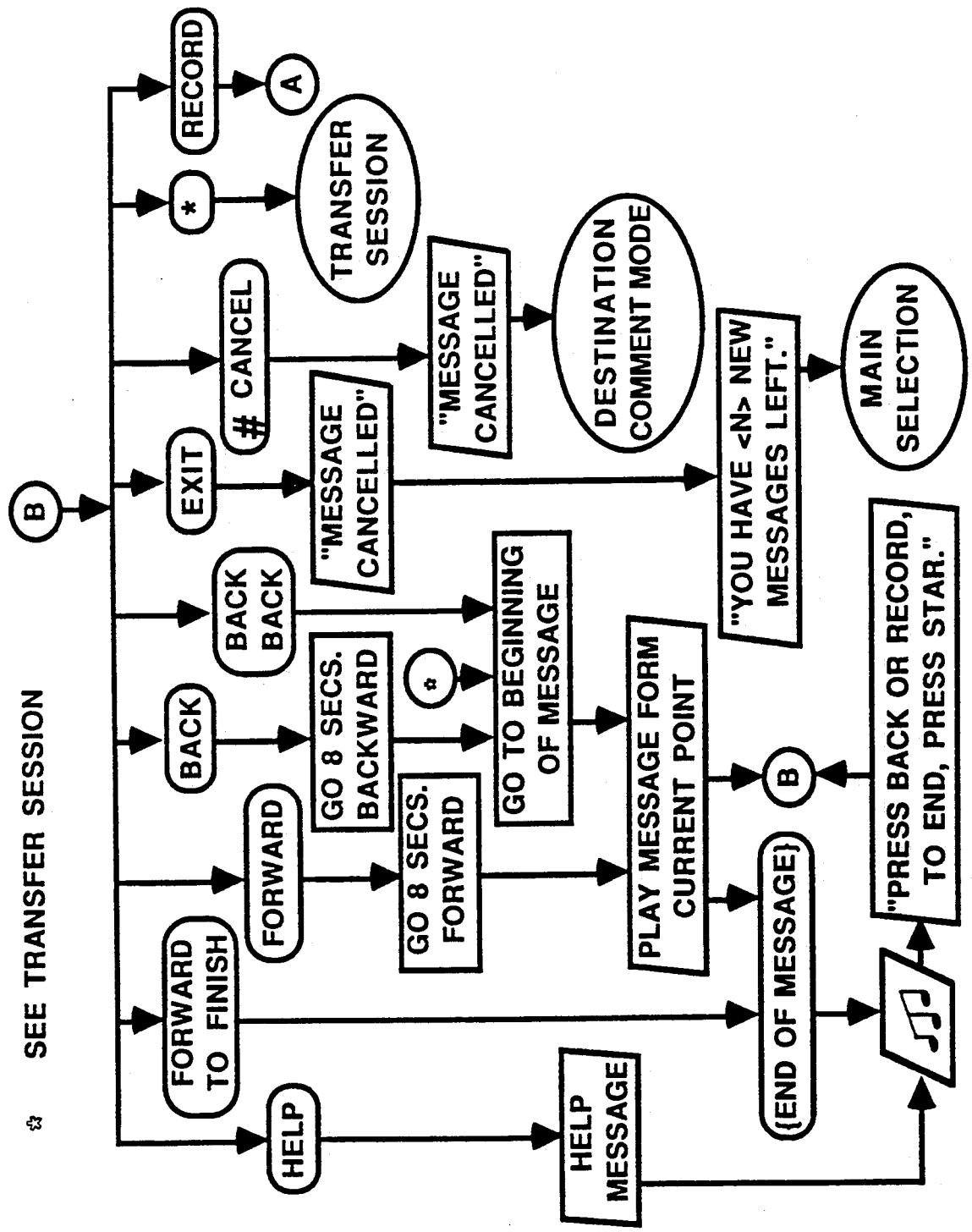
FIG 20/2

TRANSFER SESSION
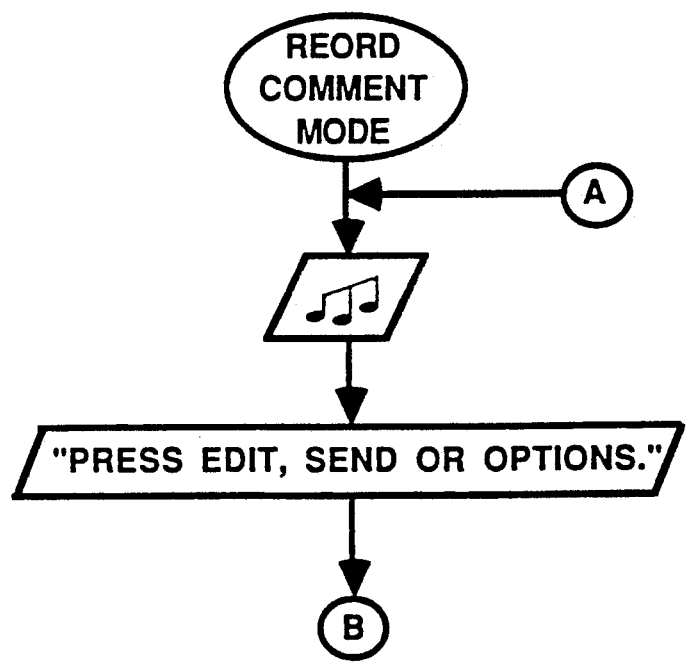
FIG. 21/1

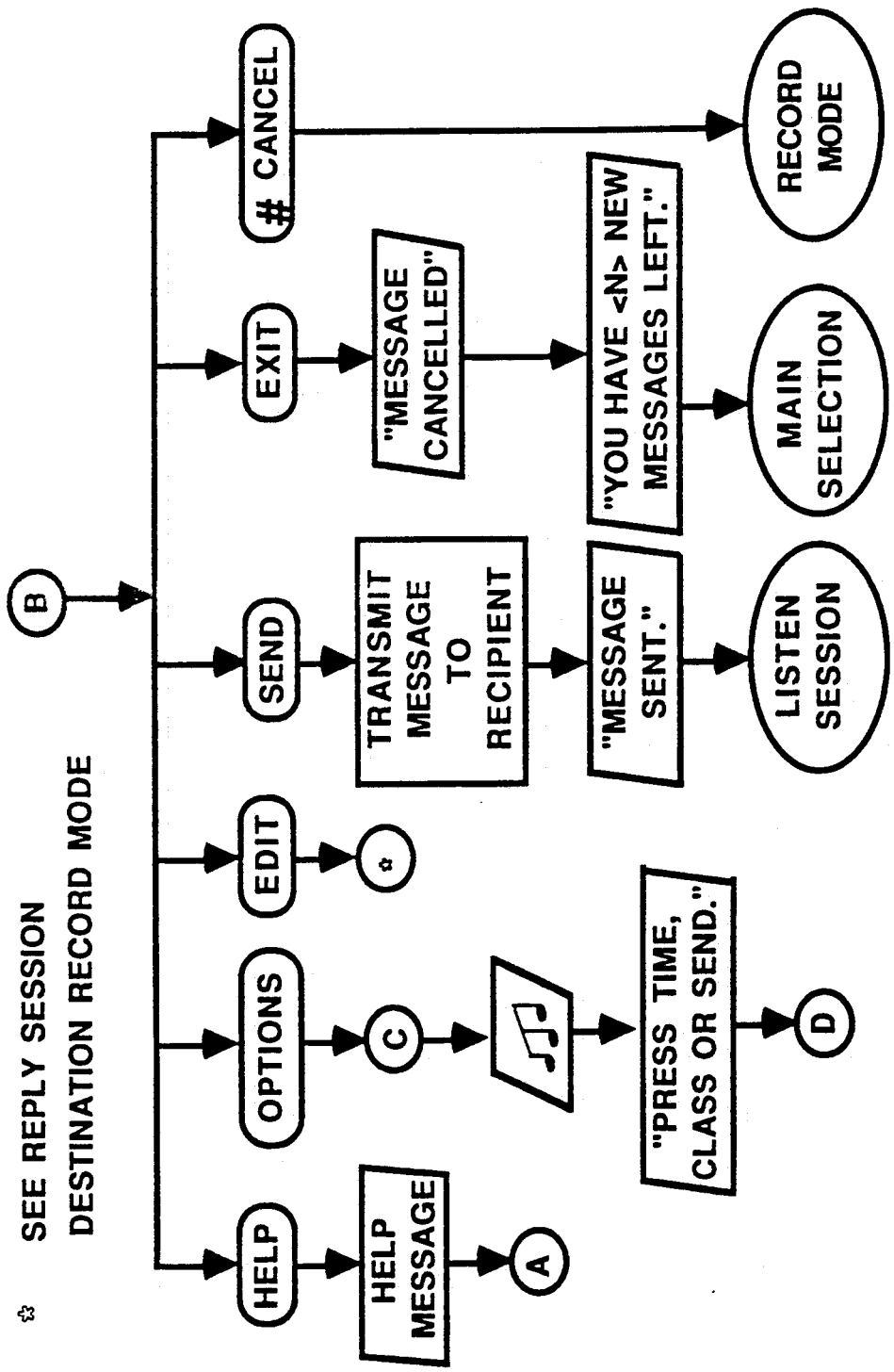
FIG. 21/2

TRANSFER SESSION
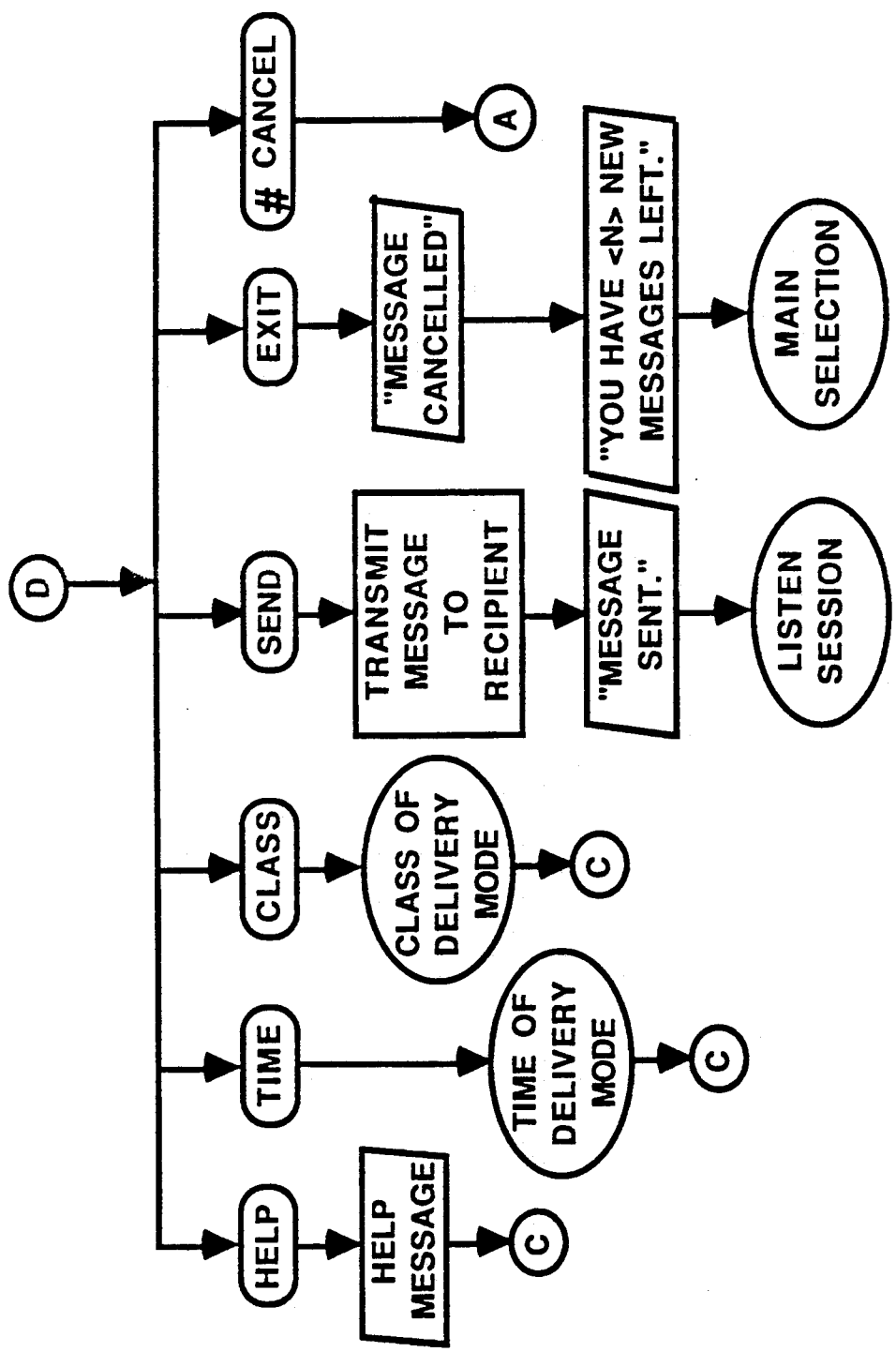
FIG. 21/3

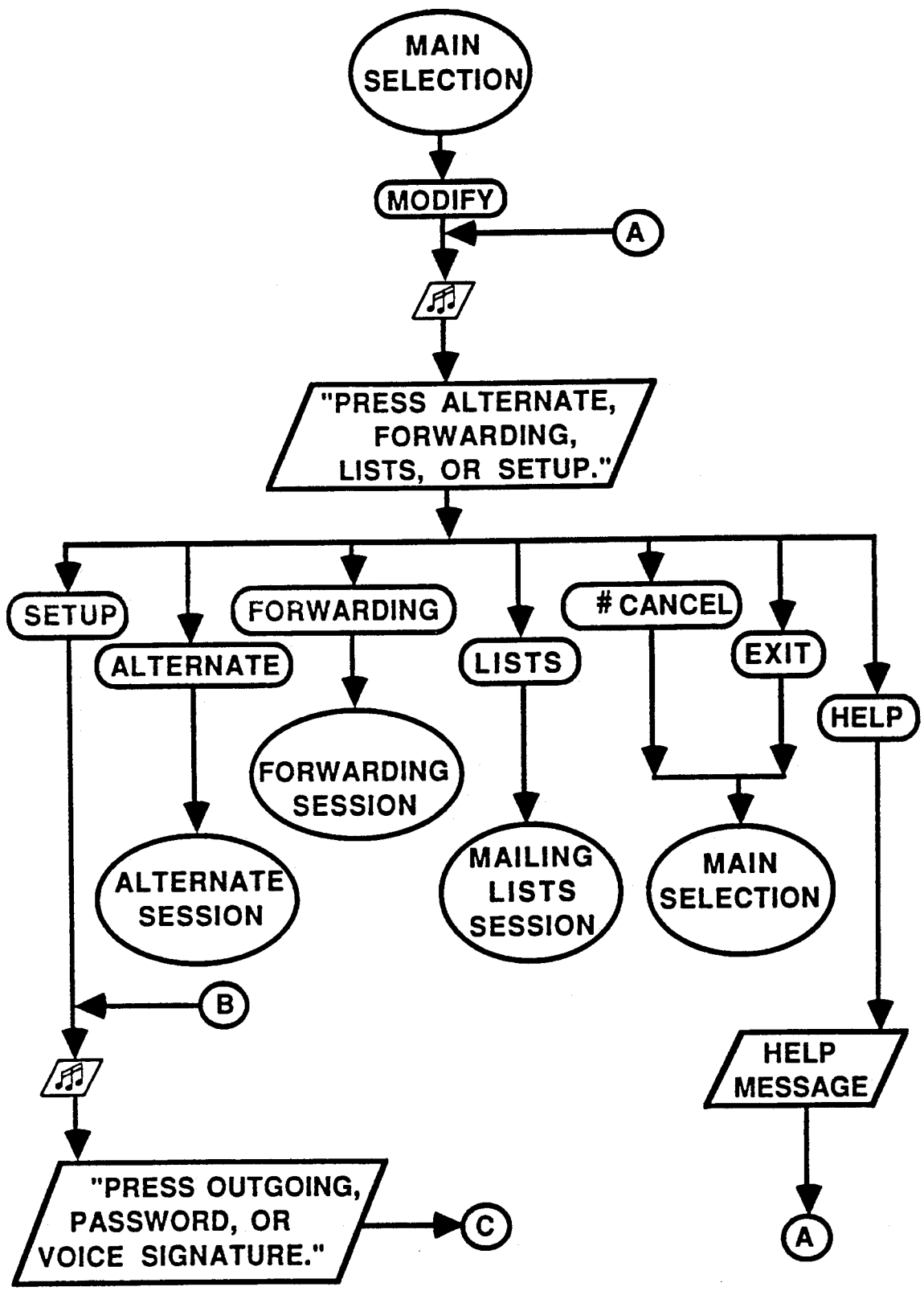
FIG. 22/1

MODIFY SESSION
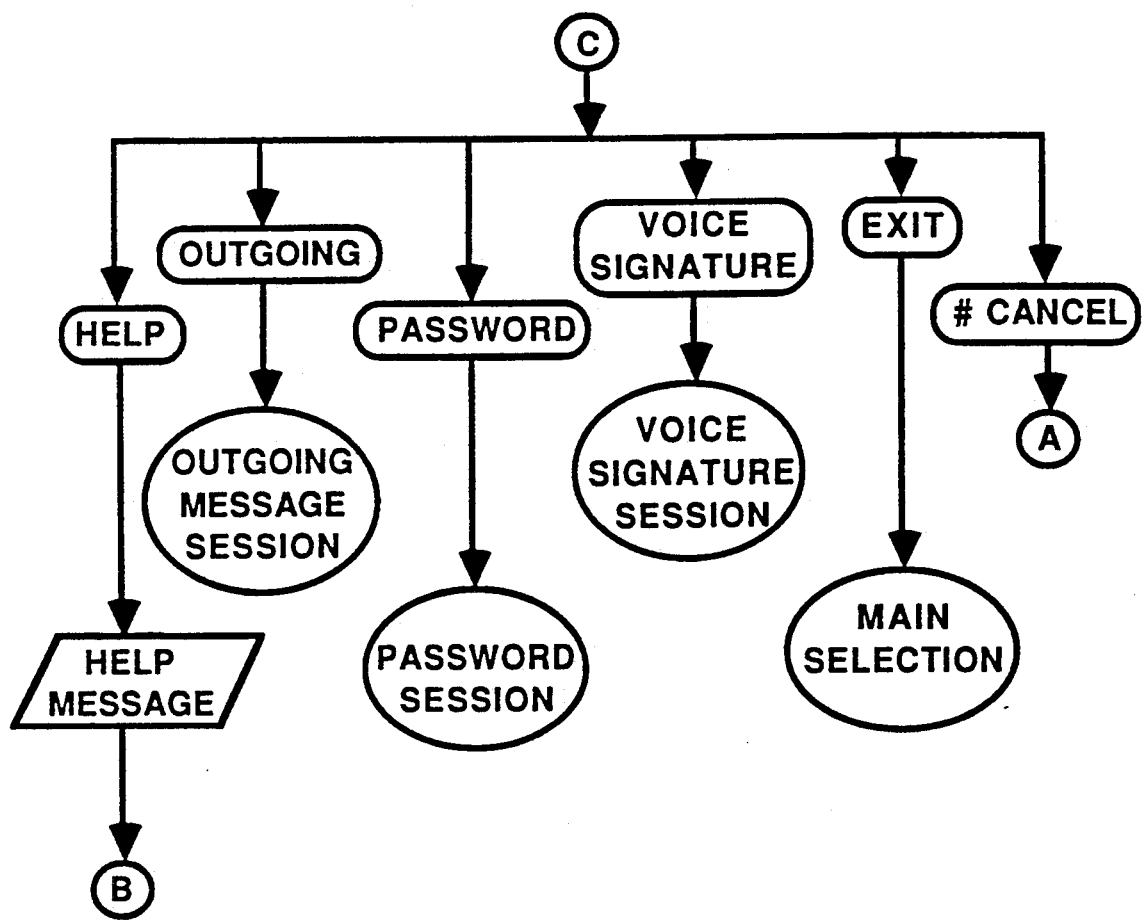

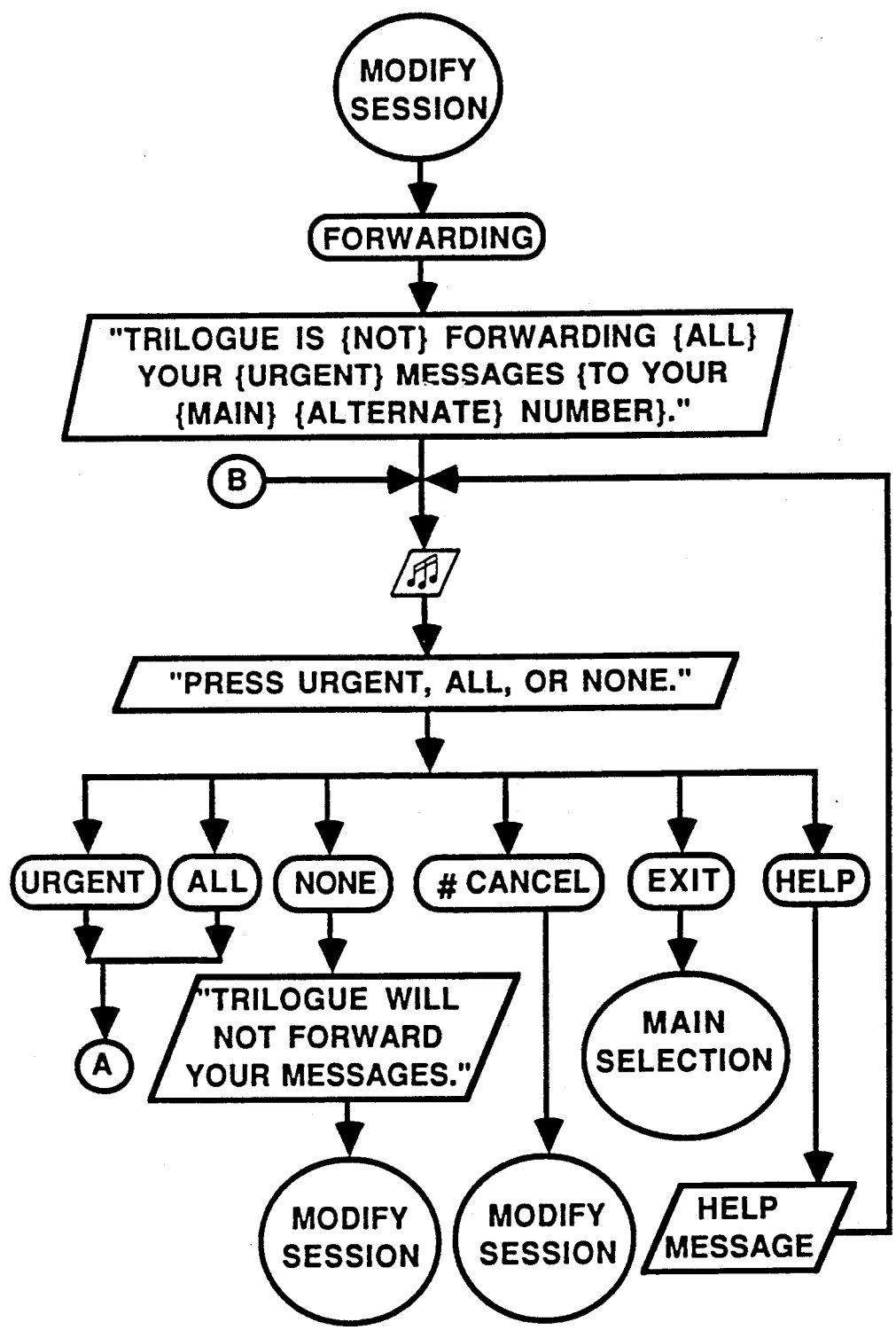
FIG. 23/1

FORWARDING SESSION
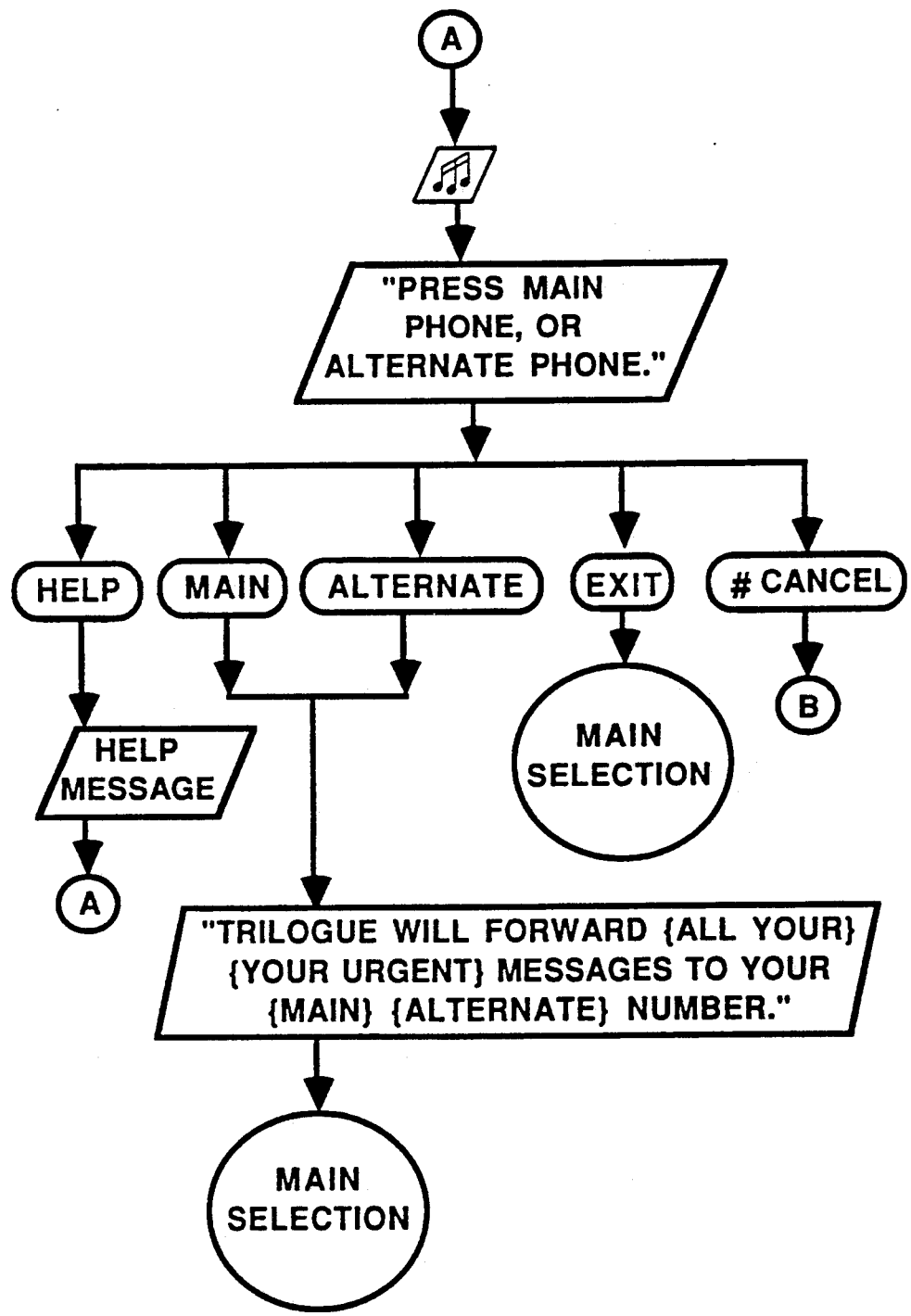
FIG. 23/2

MAILING LISTS SESSION
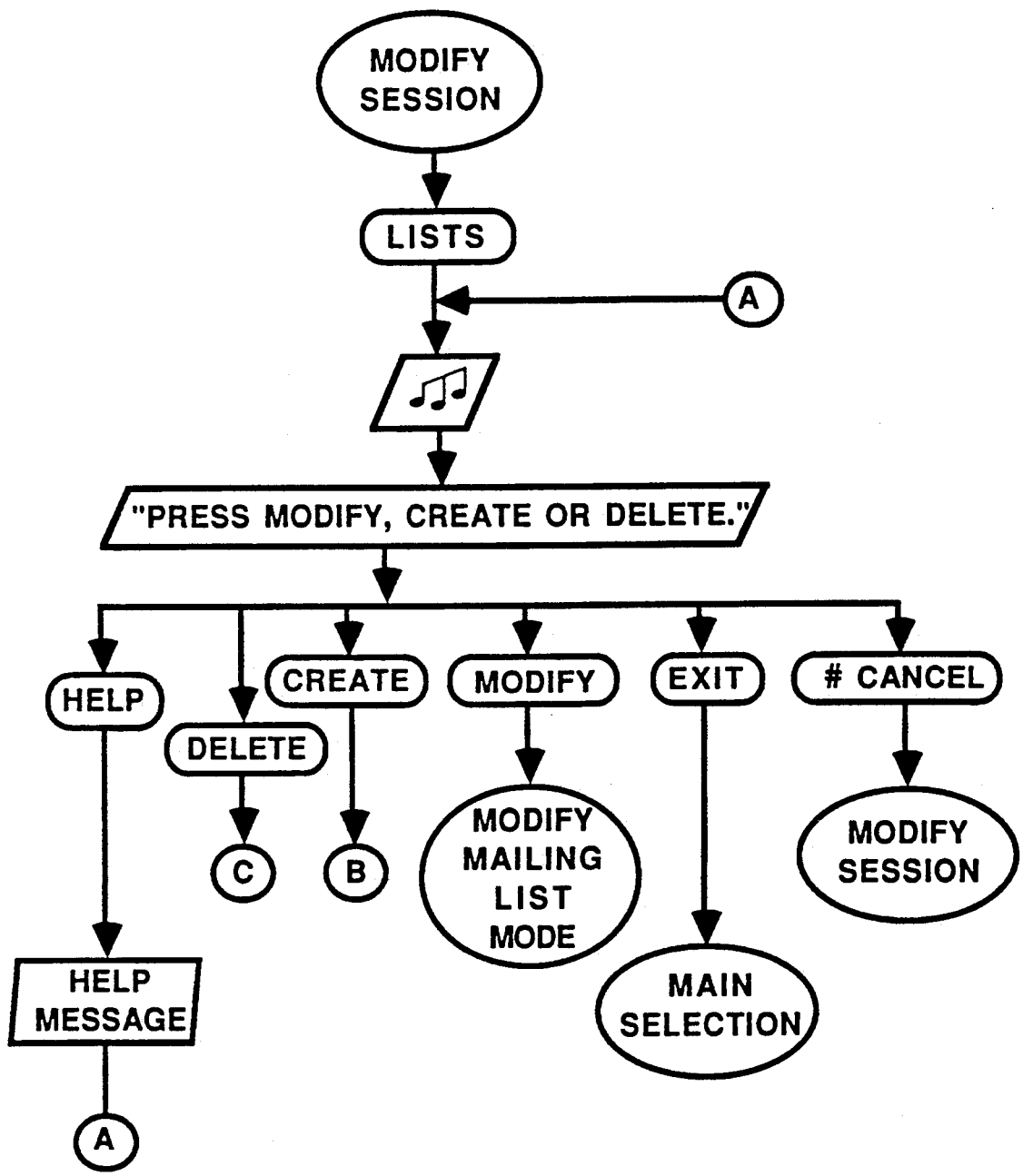
FIG. 24/1

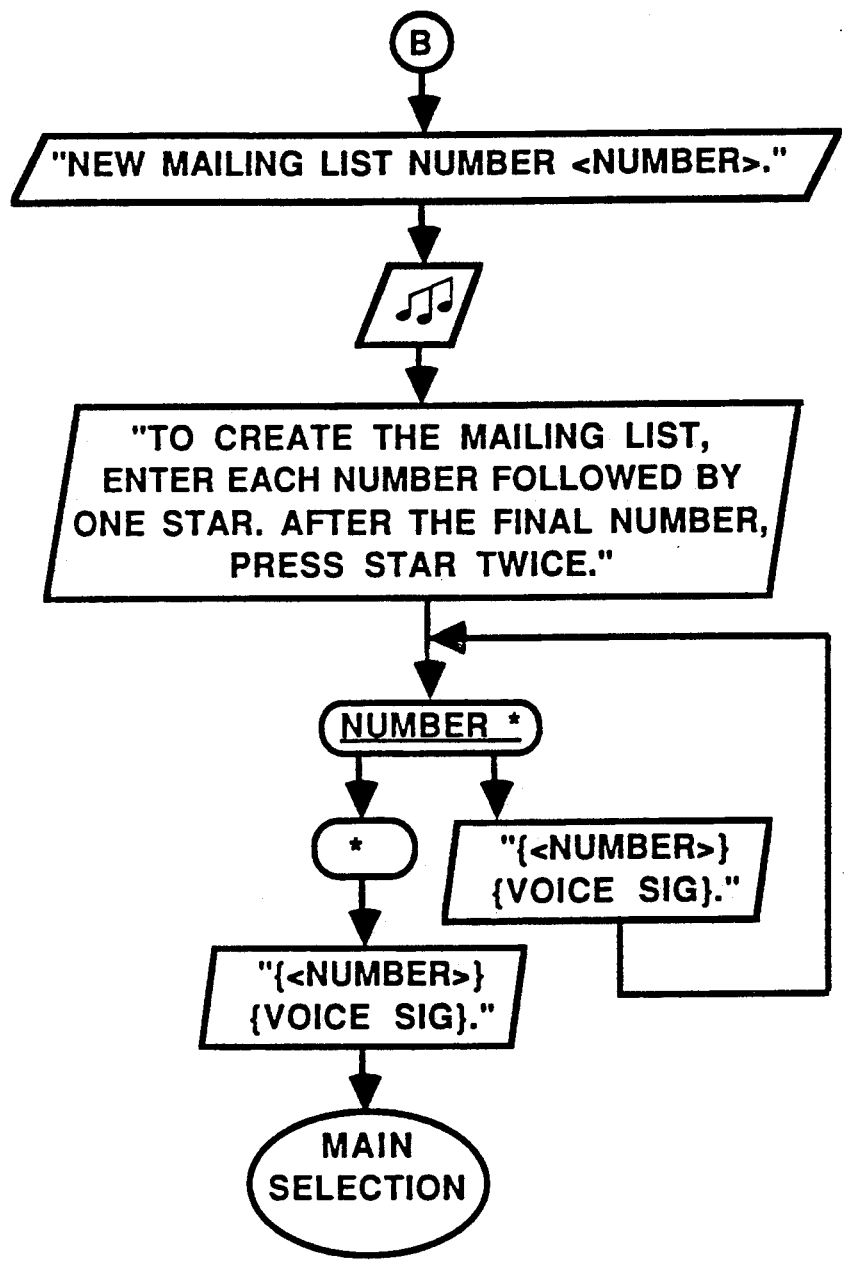
FIG. 24/2

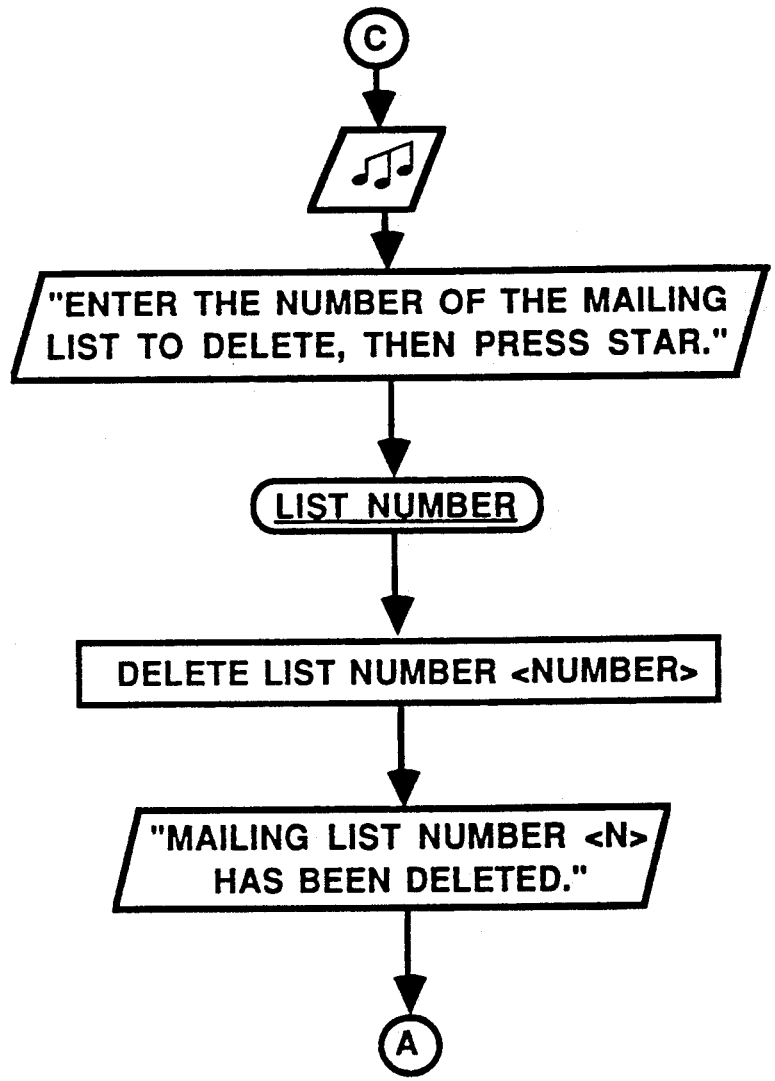
FIG. 24/3

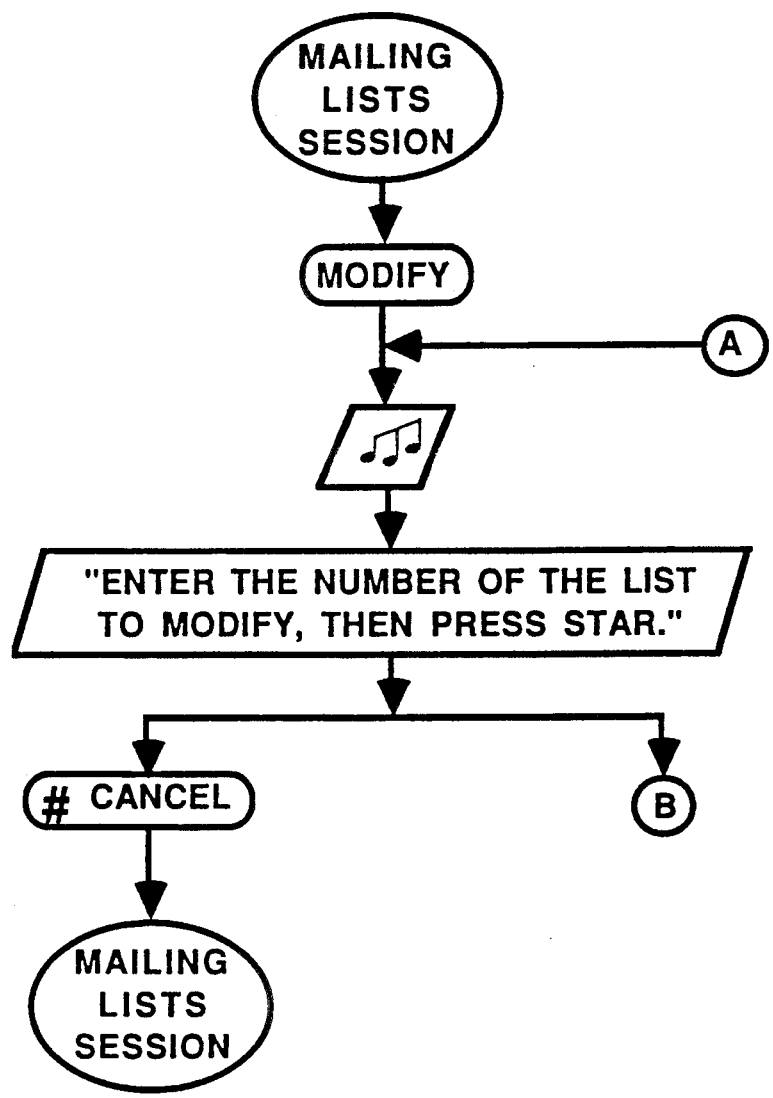
FIG. 25/1

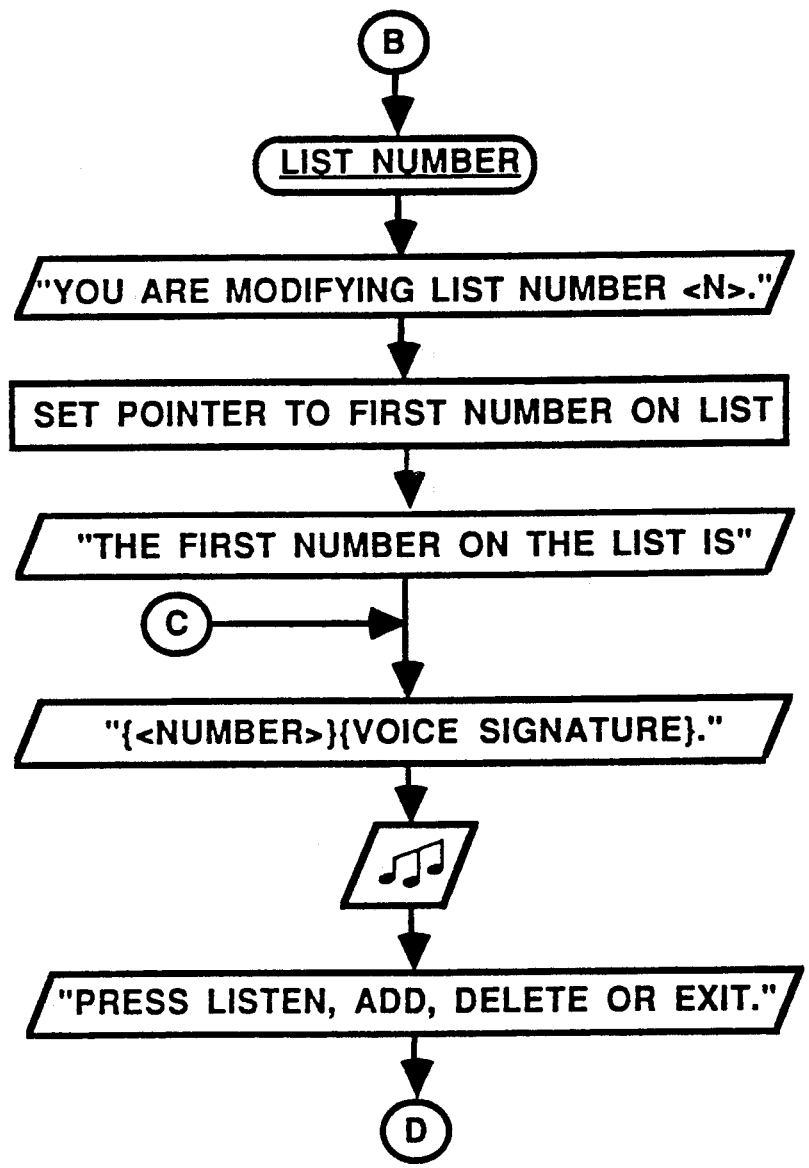
FIG. 25/2

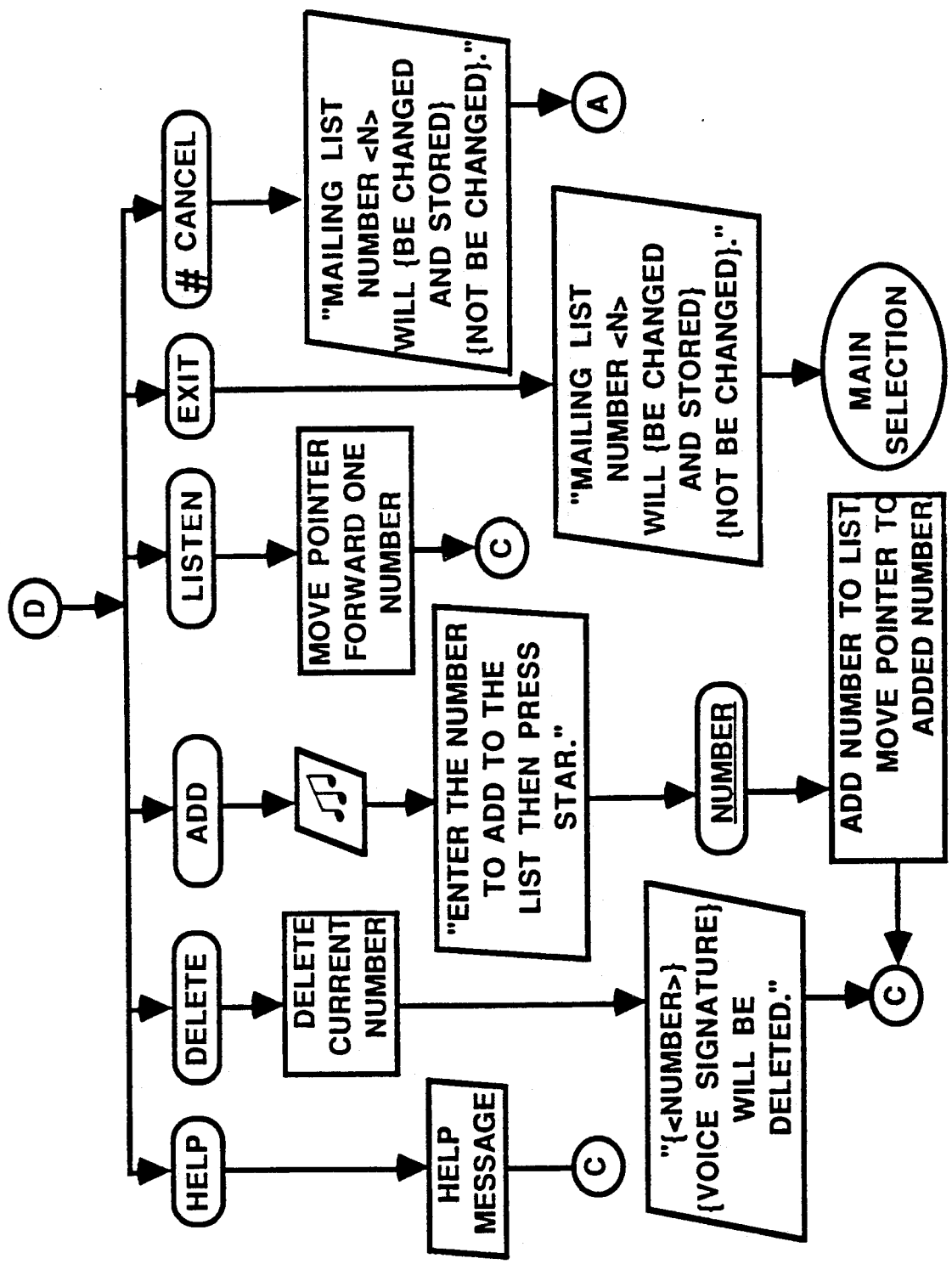
FIG. 25/3

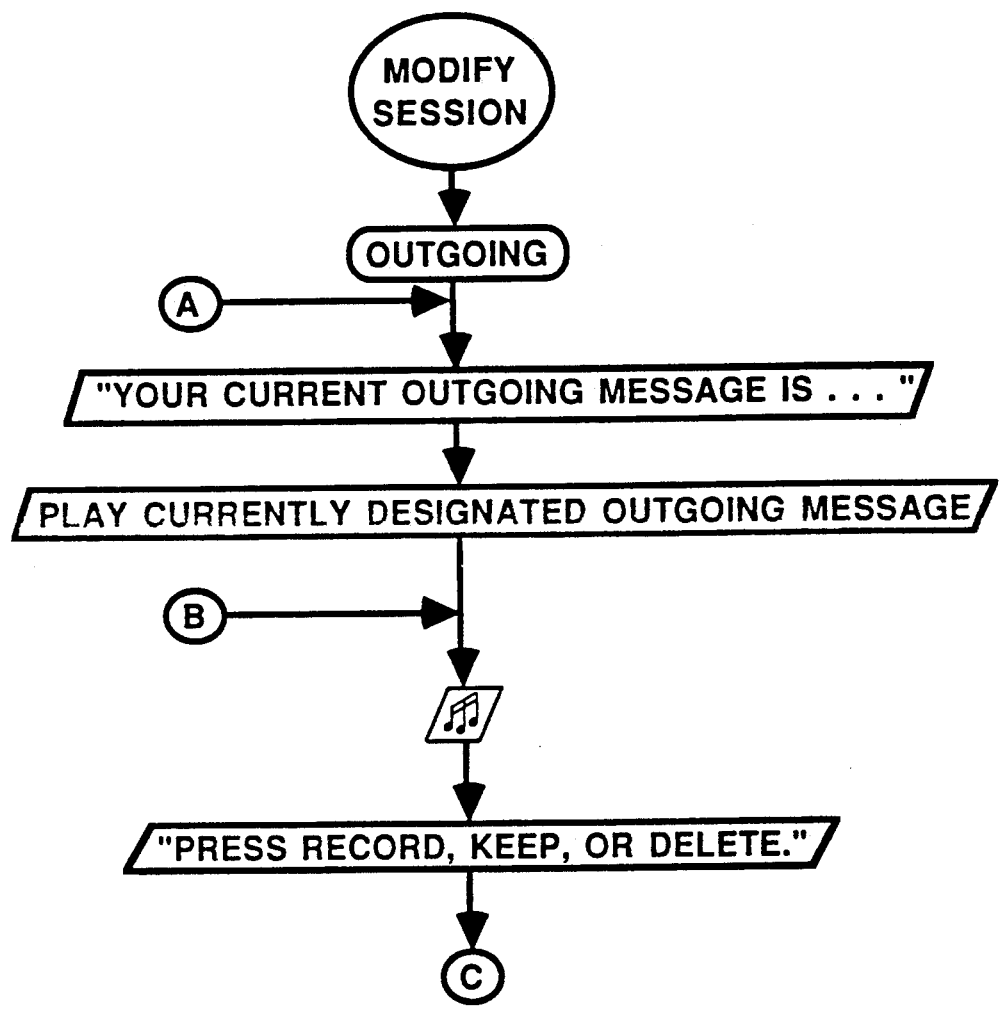
FIG. 26/1

OUTGOING MESSAGE SESSION
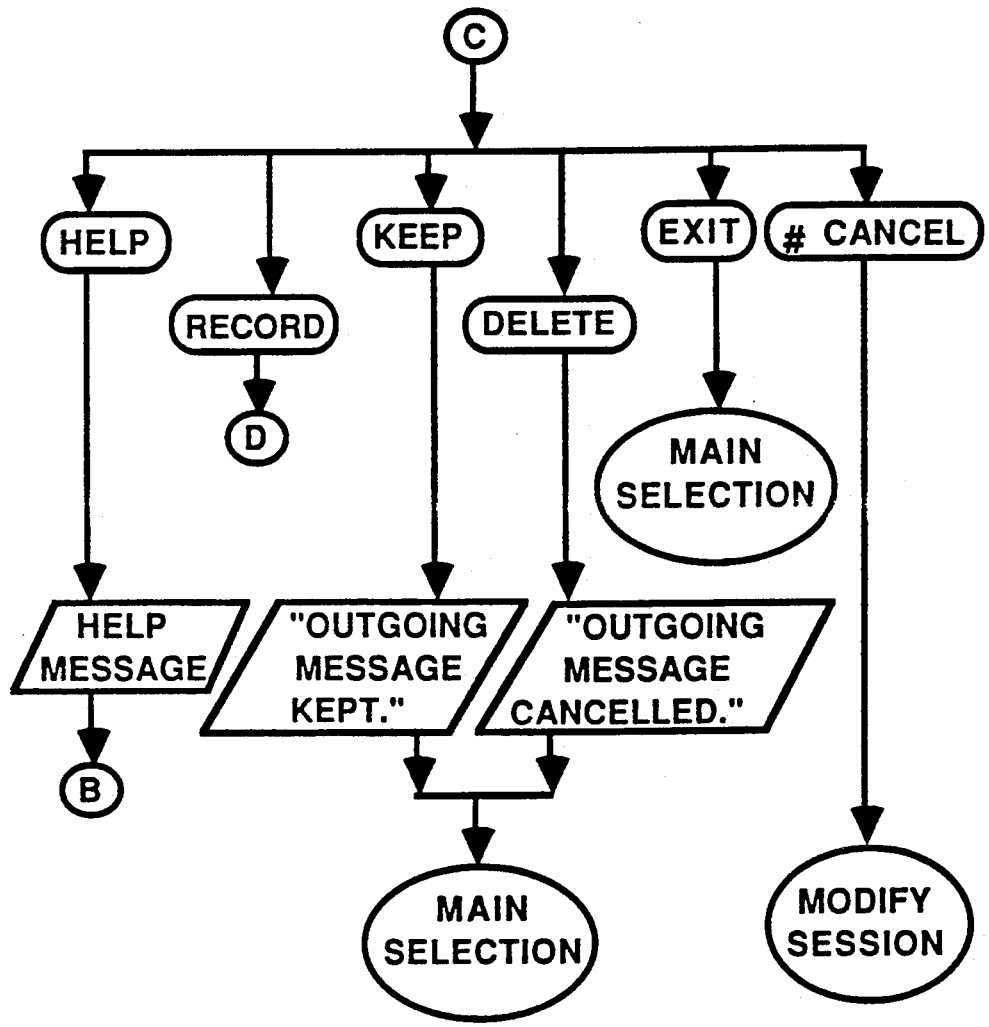
FIG. 26/2

OUTGOING MESSAGE SESSION
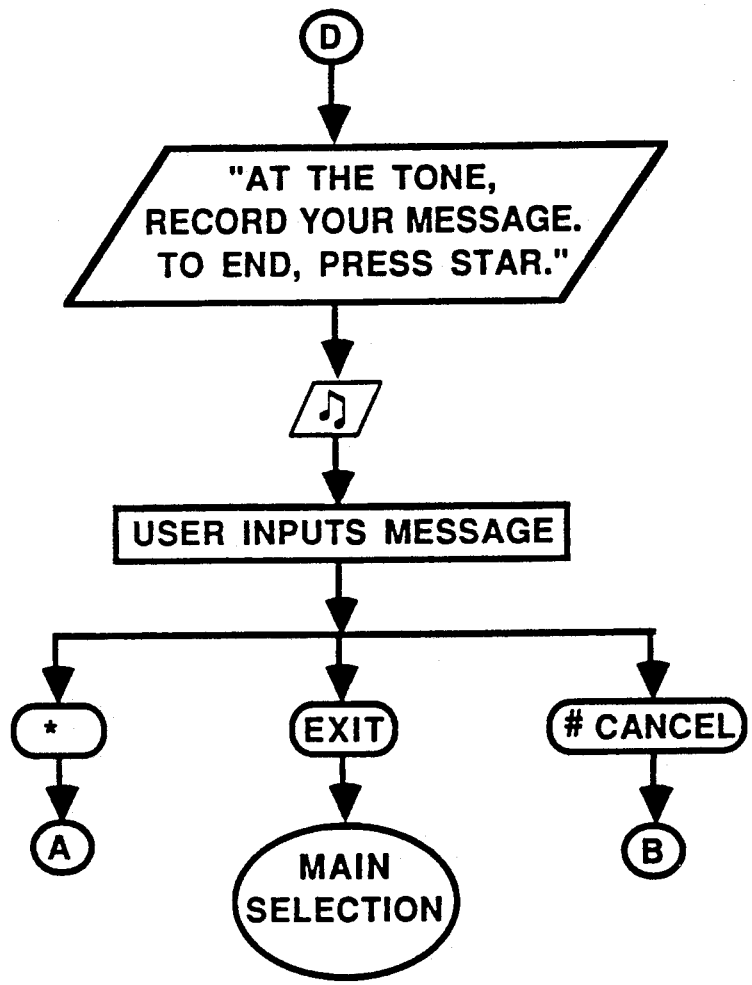
FIG. 26/3

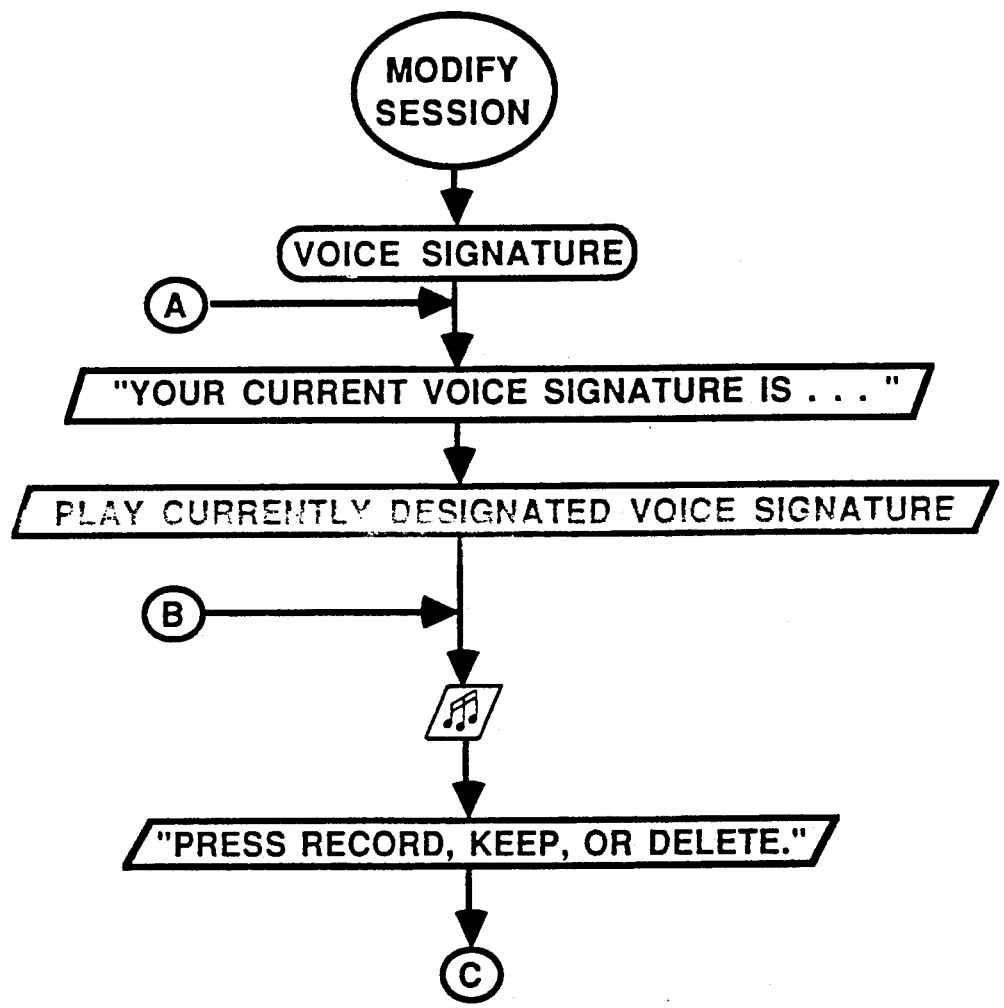
FIG. 27/1

VOICE SIGNATURE SESSION
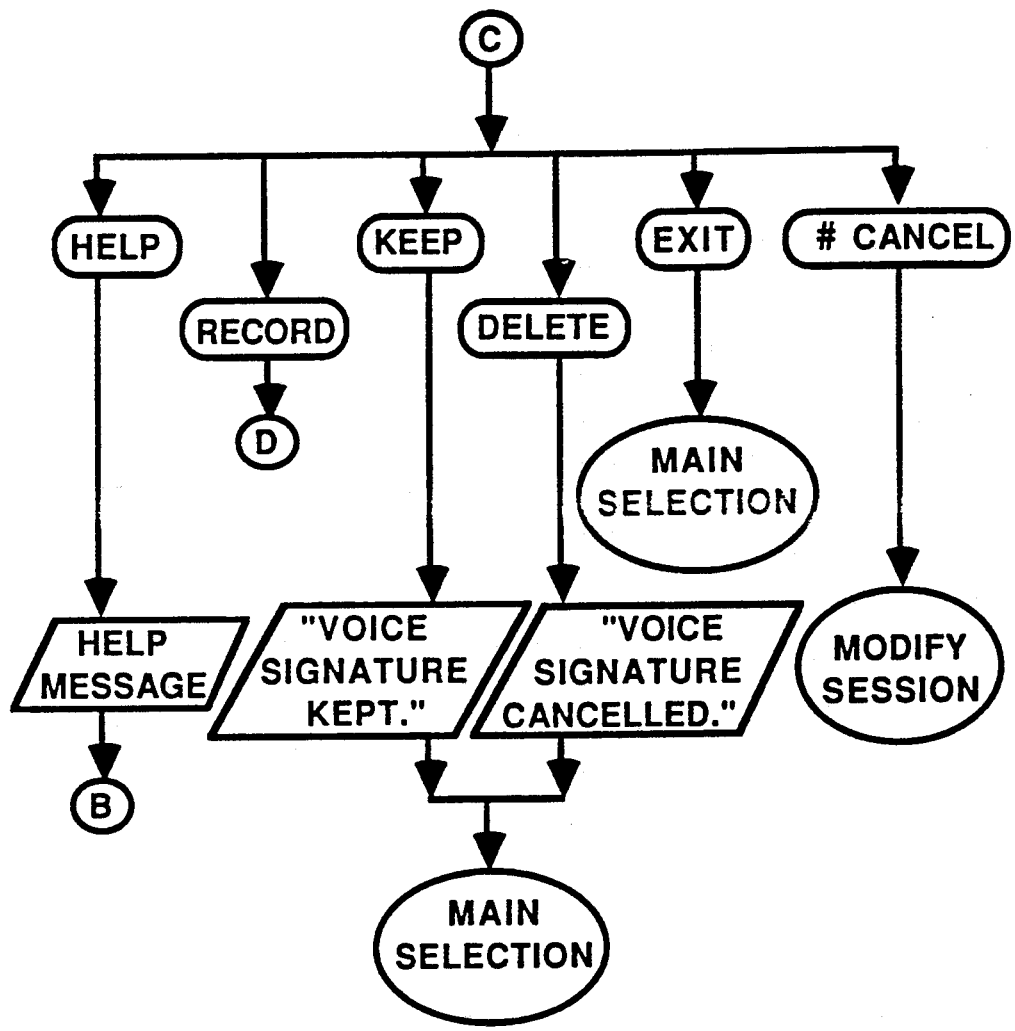
FIG. 27/2

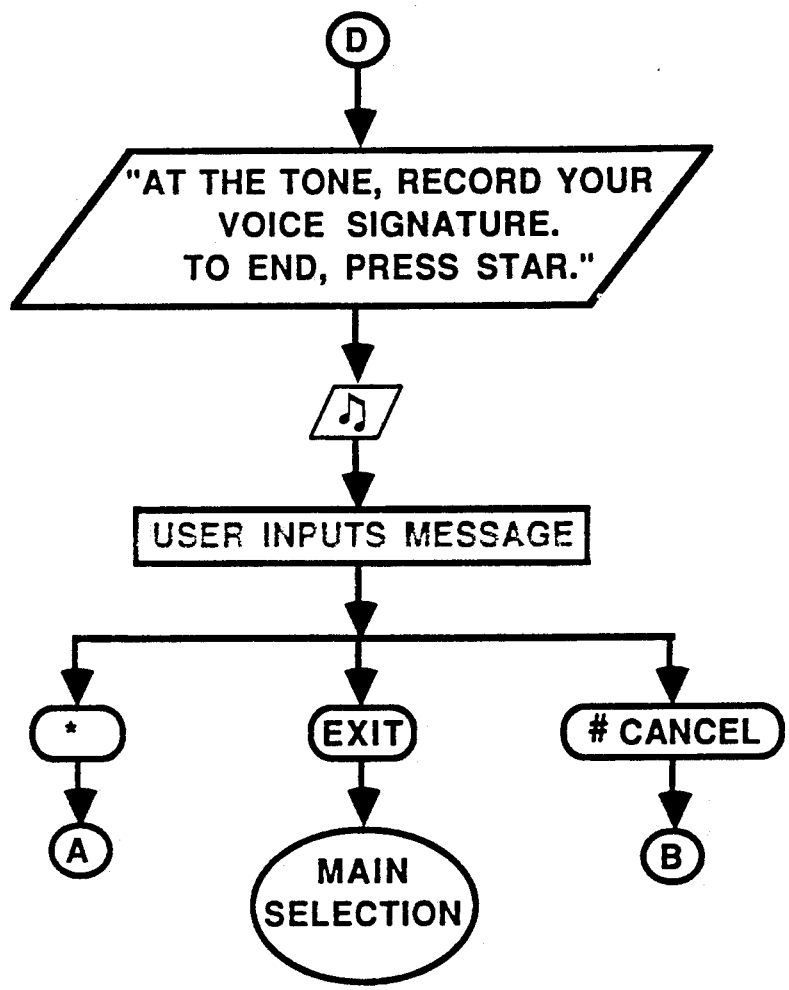
FIG. 27/3

MESSAGE MANAGEMENT SYSTEM

FIELD OF THE INVENTION

The present invention relates to message management systems generally.

BACKGROUND OF THE INVENTION

Various types of store and forward systems are known. One such system, which provides voice, facsimile (fax), data and cryptographic store and forward capability, is described in U.S. Pat. No. 4,371,752. Other voice store and forward systems are available from major computer manufacturers, such as Wang and IBM.

Store and forward systems having a facsimile capability are described in the following patent references:

Japanese Kokai No. 57-119541 provides a retrieval system for communication for the purpose of shortening the retrieval time of a facsimile communication system by reducing transmission and reception signals between the switchboards of an originating side and a terminating side, by setting the display of the completion of communication message distribution by retrieving state call information during communication by using a time-series number as key information. Communication call information is controlled by a time-series number, and the number is sent from a terminating switchboard to an originating switchboard via common-line signal equipment when a communication message is distributed to a terminating facsimile terminal. The original switchboard retrieves a communication information table by the time-series number as key information to read corresponding communication state information, and sets the display of the completion of communication message distribution, thus controlling a communication-call completion state.

Japanese Kokai No. 57-38055 provides a memory control circuit for storage exchange facsimile for the purpose of operating a plurality of input and output ports with different period and data transmission speeds at the same time, by providing each input/output port storage means and priority designation gate means and enabling use of memories with priority to ports faster in the data transmission speed. When video information is inputted to a memory section, the video information is inputted from a scanner via a coder. A compressed code data received through a communication control section from an external line is inputted to the memory section with the identification number for every original unit. The video data inputted is stored on a plurality of pages and each page is linked in the order of the originals. The identification number of each original is managed with an input/output control section and a system control section provided inside the memory section. If the output of the original is requested, the system control section and the video data are sequentially read out from the memory and transmitted to the output device.

Japanese Kokai No. 57-78325 provides a transmitting system of facsimile picture information, for the purpose of reducing the transmission time of picture information from a transmitter side terminal to a storing switchboard, by adding the specific time fill code to the storing switchboard in accordance with the picture information to be transferred. The picture information stored in a data register is transferred to a transmission shift register to be converted into series-type signals and transmitted bit by bit to a communication circuit from the register via a multiplexer. A main control device calculates the number of bits equivalent to a line of the transmission picture information based on information regarding the space of the transmission line of the picture information set to a parameter register and the data transfer speed of the circuit and then sets the calculated bit number to a counter. After detecting the line end signal EOL, the device switches the multiplexer to the side of a time fill generator if the contents of the counter is larger than zero.

Japanese Kokai No. 57-192167 provides a facsimile storage exchanger, for the purpose of efficiently transferring facsimile information to an incoming terminal with a simple constitution by inserting information to be added to a facsimile signal after converting the information into coded graphic information. The conventional device is provided with a graph generating circuit and a graph insertion circuit. When facsimile information is transmitted from a facsimile, a storage section stores a facsimile signal. In this case, a control circuit stores time information given from a clock section and when the facsimile signal is stored in the storage section, it is transmitted, via various circuits, and finally coded. The coded data of the circuit is inserted into a facsimile information graph insertion circuit and given to a communication control circuit.

Japanese Kokai No. 58-138148 provides a mail box index output system, for the purpose of improving the performance and economy in mail box service, by editing and synthesizing a prescribed part to be an index of each mail in a mail box and transmitting the picture data to the corresponding terminal, in a facsimile storage exchange system. First, a mail managing section reads out a part of an encoded picture data of a head page of each mail in a desired mail box from a file sequentially and tranfers it to an index forming section. In this section the transferred encoded picture data is decoded at a decoder as binary data and this is transferrred to a buffer of a full-white recognition circuit via a bus. Thus, when the encoded picture data relating to the index of all the desired mails are stored in a memory the data are transferred to a desired facsimile terminal via the section, a facsimile procedure control section, and a telephone exchange network for recording and output.

Japanese Kokai No. 58-138162 provides a facsimile storage converting system, for the purpose of reducing the load for the facsimile data conversion control and the file capacity, by encoding and communicating encoded facsimile data in a form matched to the standards of a facsimile device at the reception side, after the data is decoded into the original facsimile data. When only the sub-scanning line density of stored facsimile data is dissident with the standards of the reception side, the data is matched by elimination for one line's share at every other line in decoding the data at a decoding section. Since the amount of facsimile data encoded at an encoding section is reduced by half of the data transferred from a facsimile data storage section, the data transferred to a facsimile device is discontinuous. Then, the encoded data is not transmitted to the devise directly but transferred to the data storage section for storage after the decoding and storage of data for one original share are finished, the data is transmitted again to the facsimile device.

Japanese Kokai No. 58-165452 provides a facsimile exchange system, the purpose of which is to eliminate the need for the repetition of retransmission from a transmission terminal, by receiving a telegraphic message transmitted from a transmission terminal at a facsimile storage exchange for a reception terminal tentatively even when it is in use, and transmitting the message automatically when the reception terminal is free.

Japanese Kokai No. 59-99846 provides a facsimile communication device for the the purpose of improving the utilizing efficiency of a 4-wire system exclusive line by connecting the 4-wire exclusive line to an external device by switching in response to a control signal. A semi-duplex communication facsimile terminal is provided with a switching controller which is connected optionally by switching to an external device by an output signal of a controller incorporation transmission/receiving terminal of a 4-wire exclusive. When the unidirectional or bidirectional transmission line is idle, it is used for information transmission between the devices. As a result, the utilizing efficiency of the lines is improved.

Japanese Kokai No. 58-175342 provides a data transmission control system, with the purpose of eliminating the interruption of the transmission information due to the congestion of a system and to decrease the frequency of retransmission, by sending out a time filler when the next transmission data does not exist after the end position equivalent to a line of the transmission data is detected. When the picture information is transmitted to a terminal, a facsimile storage exchange stores the received picture information once in a storage device and then transmits the stored picture information to the terminal. An end position EOL of the picture information equivalent to a line is detected in the transmission data, whether or not the position shows the end of the data equivalent to a page. If the EOL does not show the end of the data of a page and no transmitting request is given for the next transmission data, end mark EOL of the picture information equivalent to a page is transmitted and then a time filler is sent out for a maximum of five seconds until the transmitting request is given to the next transmission data.

Japanese Kokai No. 59-117845 provides a facsimile storage exchange, for the purpose of attaining the communication of a facsimile screen at a possible resolution degree of screen by commanding a compression rate from a transmission terminal, storing the rate by coding, commanding an expanding rate from a receiving terminal and decoding the rate. A facsimile signal inputted from a facsimile terminal passes through a compressor via an exchange switch, an amount of information is compressed and the signal is converted into a prescribed code at a coder and stored in a large capacity file memory. The stored facsimile information is read out from the memory when it is required to be communicated to a facsimile terminal of output side, and decoded into the original code at a decoder, the amount of information is expanded through an expander and the signal is outputted to a facsimile terminal via an exchange.

Japanese Kokai No. 57-119537 provides a facsimile communication system, for the purpose of achieving economization without spoiling the advantage of a store and forward switching type facsimile communication system, by immediately transferring data without storing it when the free state of an incoming terminal is discriminated. Picture information from an originating terminal is stored in a storing and converting device only when the central processor of a switchboard judges that the standard of the originating terminal and the standard of a terminating terminal extracted from a subscriber file are different from each other, or when the terminating terminal is busy. When the standards are coincidental and the terminating terminal is free, a picture signal is transferred immediately through an instantaneous circuit and never stored.

Japanese Kokai No. 57-119537 provides a facsimile communication system of store and forward exchanging type comprising: terminals each having an automatic reception function; exchange including a subscribers file for storing standards of said terminals; and a storage and conversion device for transmitting and receiving picture signals to and from said terminal, said exchange comprising: a first means for collating the standard of a transmitting terminal and the standard of a receiving terminal which are extracted from said subscribers file; and a second means for judging whether or not said receiving terminal is busy, wherein the picture signals transmitted out of said transmitting terminal are at once transferred to said receiving terminal without storing said picture signals into said storage and conversion device when said first means determines that the standards of said transmitting and receiving terminals are identical with each other and when said second means judges that said receiving terminal is not busy. The facsimile communication system is characterized in that said picture signals transmitted out of said transmitting terminal are stored in said storage and conversion device when said second means judges that said receiving terminal is busy, and the stored picture signals are transferred to said receiving terminal when said receiving terminal becomes not busy.

The facsimile store and forward systems described above, with the exception of the Matthews et al U.S. Pat. No. 4,371,752, do not have a voice store and forward capability or the ability to be controlled by the regular touch-tone (DTMF) keypad of a standard telephone in order to transfer, send, receive, checkout messages waiting, reply, or listen to help instructions. They also do not have the ability to annotate facsimile messages with voice or annotate voice messages with facsimile.

None of the prior art described above includes the feature of providing a voice notification of receipt of a facsimile message.

SUMMARY OF THE INVENTION

The present invention seeks to provide a highly efficient and economical message management system, which incorporates, as a portion thereof, integrated voice and image store and forward apparatus.

There is thus provided in accordance with a preferred embodiment of the present invention a message management system comprising apparatus for producing a multi-media message, including a visually sensible portion and an aurally sensible portion and control apparatus for transmitting the multi-media message to a selected subscriber. Preferably there is also provided apparatus for providing notification to the selected subscriber of the arrival of a multi-media message.

Additionally in accordance with a preferred embodiment of the present invention, the apparatus for producing a multi-media message comprises telephone apparatus and image transmission apparatus. The image transmission apparatus preferably comprises facsimile apparatus but alternatively may comprise any other suitable apparatus for transmitting images, i.e. text or any other suitable images.

Further in accordance with a preferred embodiment of the present invention, the telephone apparatus and image transmission apparatus are located remotely from each other. According to an alternative embodiment of the present invention, the telephone apparatus and image transmission apparatus are located in close proximity.

Additionally in accordance with a preferred embodiment of the present invention, the control apparatus comprises a DTMF keypad.

Further in accordance with an embodiment of the present invention, the message management apparatus also comprises apparatus for providing a store and forward function.

In accordance with the foregoing embodiment of the invention, the apparatus providing a store and forward function may comprise interconnect subsystem apparatus arranged to interconnect with telephone switching apparatus and image transmission apparatus, a control subsystem for providing control instructions to the interconnect subsystem apparatus, including instructions for transmitting and receiving image transmissions and voice messages and instructions for providing voice messages relating to such image transmissions and mass storage subsystem apparatus coupled to the control subsystem for storing voice and image transmissions. The storage is in digital form. According to a preferred embodiment of the invention, the image is stored in digital form without an intermediate conversion to audio prior to storage.

There is also provided in accordance with a preferred embodiment of the present invention a store and forward system comprising interconnect subsystem apparatus arranged to interconnect with telephone switching apparatus and image transmission apparatus, a control subsystem for providing control instructions to the interconnect subsystem apparatus, including instructions for transmitting and receiving image transmissions and voice messages and instructions for providing voice messages relating to such image transmissions and mass storage subsystem apparatus coupled to the control subsystem for storing voice and images to be forwarded.

In accordance with a preferred embodiment of the invention, the mass storage subsystem is operative for storing voice messages, images, and messages combining voice and images to be forwarded.

Additionally in accordance with an embodiment of the present invention, the interconnect subsystem comprises facsimile subsystems and line subsystems. The control subsystem is connected to the facsimile subsystem apparatus via a SCSI (Small Computer System Interface) bus or RS232 protocol and is connected to the line subsystem via a LBX (Local Bus Extension) bus.

Further in accordance with an embodiment of the present invention, the control system and the mass storage subsystem apparatus are coupled by a SASI (Shugart Association System Interface) bus.

Additionally in accordance with an embodiment of the invention there is provided means for storing voice messages, images, and messages combining voice and images. Preferably the means for storing comprises means for storing images in digital form without an intermediate conversion to audio.

Further in accordance with a preferred embodiment of the present invention, there is provided means permitting a subscriber receiving said message to reply or annotate said message in a medium other than that in which the message was received. Preferably the permitting means is operative to provide voice reply or annotation of a received message.

BRIEF DESCRIPTION OF THE DRAWINGS

The present invention will be understood and appreciated more fully from the following detailed description, taken in conjunction with the drawings in which:

FIG. 7 is a block diagram illustration of SPU (Signal Processing Unit) circuitry forming part of the line subsystem shown in FIG. 3;

FIGS. 9-27 are flow chart representations describing the man/machine interface of the system of the present invention.

DETAILED DESCRIPTION OF A PREFERRED EMBODIMENT

Figure 1:
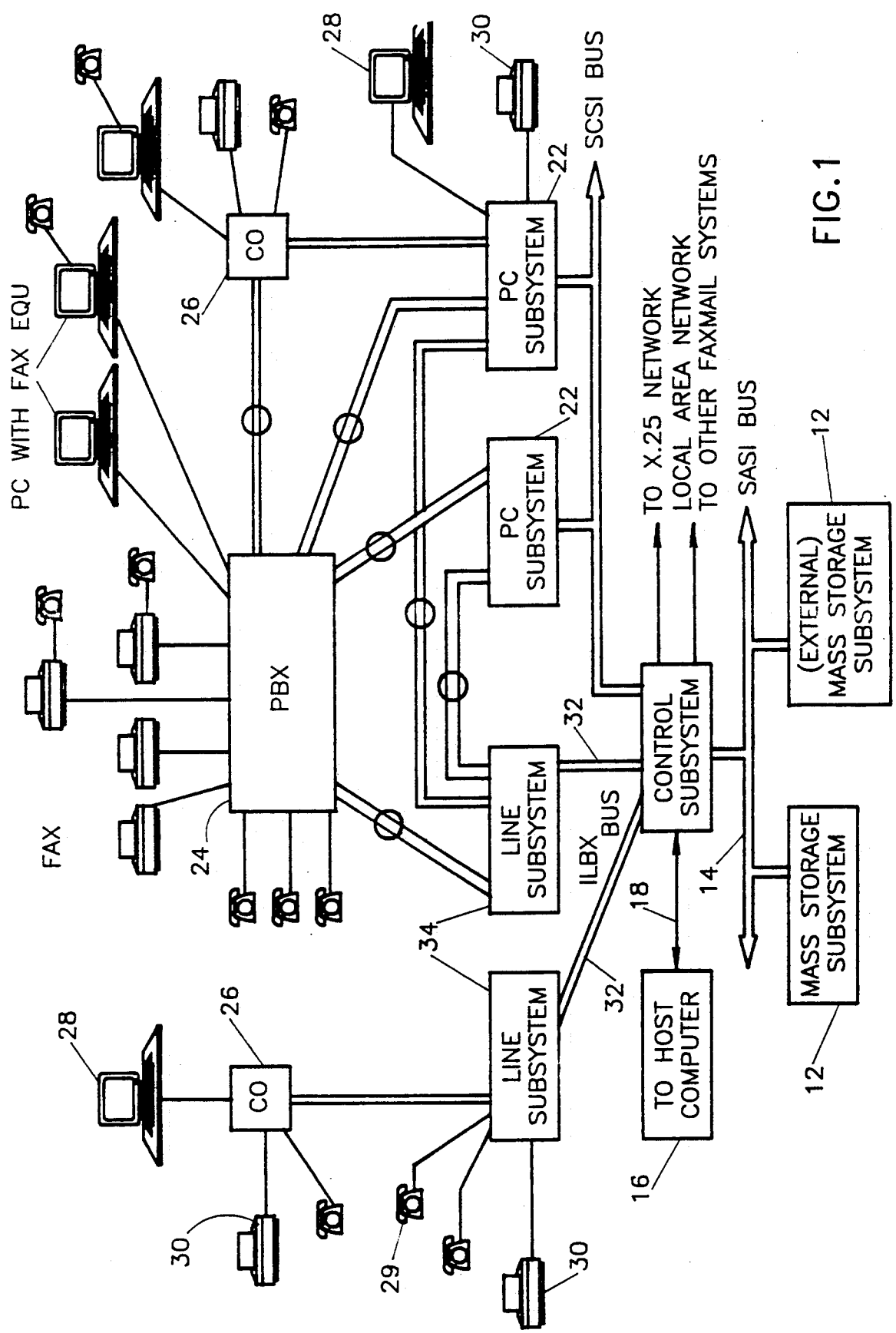
FIG. 1 is a block diagram illustration of a message management system constructed and operative in accordance with a preferred embodiment of the present invention.

The message management system of the present invention supports a message file system and receives and stores image records in subscriber's mailboxes. As noted above, any suitable type of image transmission may be employed. A preferred type of image transmission is facsimile transmission. Therefore, the explanation which follows relates to a message management system employing facsimile image transmission.

The apparatus of the present invention is capable of informing a subscriber when a voice message, a facsimile record, or a combination of the two has been placed in his mailbox. The apparatus informs the subscriber by calling him over the telephone or by any other suitable technique.

The system, using any DTMF telephone, scans the subscriber's mailbox for messages which are either voice messages or facsimile records. The subscriber can then hear or view his messages, delete or keep them, reply to the sender, or forward them to another subscriber, while optionally adding annotation.

The subscriber can also forward his facsimile messages to any other subscriber's mailbox anywhere over the telephone network via a specially equipped personal computer or a facsimile system. The user can also retrieve the facsimile message immediately at a facsimile machine or at a specially equipped PC connected to his telephone line. He can control both transmission and retrieval of the facsimile message from his telephone keypad. Equipment for suitable adaptation of a PC is available from TITN Inc. and GAMALINK both of the U.S.A.

The invention may also comprise text reading capability and capability for reading out received text. The text reading capability may be provided by a commercially available DEST PC Scan device available from DEST Corporation of Milpitas, Calif., and associated Text-Pak software, also available from DEST Corporation. The voice read out capability may be provided by voice synthesis apparatus commercially available from Speech Plus Incorporated of Mountain View, Calif., under the trade mark Call-Text.

It may therefore be appreciated that incoming faxes may be read to subscribers over ordinary telephones. Additionally, using the DEST apparatus, the incoming image, whether text or graphics or a combination thereof, may be displayed on a subscriber's CRT display.

As noted above, the apparatus of the present invention supports the addition of a voice annotation to a facsimile record and linking of facsimile records into multirecord facsimile files.

Anybody, whether or not a subscriber, can create and send a voice message, a facsimile record or a combined message (facsimile record with voice annotation) to any subscriber or to any telephone number.

Facsimile records may be sent to a subscriber's mailbox by specifying his ID or extension number and to a facsimile system (or specially equipped PC) by specifying its extension number. Facsimile records may be sent to a non-subscriber's facsimile by specifying its telephone number as well as to a list of subscribers, non-subscribers, and facsimile systems.

Notification of the arrival of a facsimile record is preferably provided by a voice message to the subscriber's mailbox and/or a telephone call to a prespecified telephone number. The subscriber may then forward the facsimile to any facsimile system or PC over the telephone network (including a facsimile machine or PC connected to his telephone line).

The entire interaction of the user (subscriber or non-subscriber) with the system is carried out over the telephone. The user is guided with voice prompts and controls the system with DTMF keystrokes or with voice commands. Sending a facsimile to a subscriber and receiving it and programming the telephone number for notification are all done over the telephone.

A special option of the system is the support of DID lines with associated subscribers' mailboxes. The user may call such an appropriate DID number to send or receive a voice message or facsimile. This eliminates the need for DTMF telephone sets.

The apparatus of the present invention includes a facsimile subsystem typically comprising an IBM XT personal computer (PC) or compatible equipment.

The system of the present invention typically supports up to 32 lines of voice (telephone) and facsimile (in fixed pairs) or up to 32 voice (telephone) lines in two groups of 16 lines and up to 16 lines of facsimile in two groups of 8 lines where lines of facsimile can be dynamically allocated (upon demand) to lines of voice within a pair of groups. Alternatively, the system may support up to 16 independent facsimile lines.

Reference is now made to FIG. 1, which illustrates in block diagram form, an integrated voice and facsimile store and forward system constructed and operative in accordance with a perferred embodiment of the present invention. The system comprises a control subsystem 10 which is coupled to one or more mass storage subsystems 12 via an SASI bus 14. The control subsystem is also coupled to a host computer 16 via an RS 232 or Ethernet link 18. The control subsystem may be coupled additionally to an X25 network (not shown), and to a local area network or other FAXMAIL systems, such as those described in the present disclosure.

Control subsystem 10 is also coupled via a SCSI bus 20 to a plurality of PC subsystems 22, each of which is adapted to interface with a PBX telephone switch 24, a telephone central office 26, PC terminals 28 and facsimile machines 30. Control subsystem 10 is also coupled via one or more LBX busses 32 to a plurality of line subsystems 34, each of which is adapted to interface with a PBX telephone switch 24, a telephone central office 26, as well as telephones 29 and facsimile machines 30, directly or via the central office 26.

Figure 2:
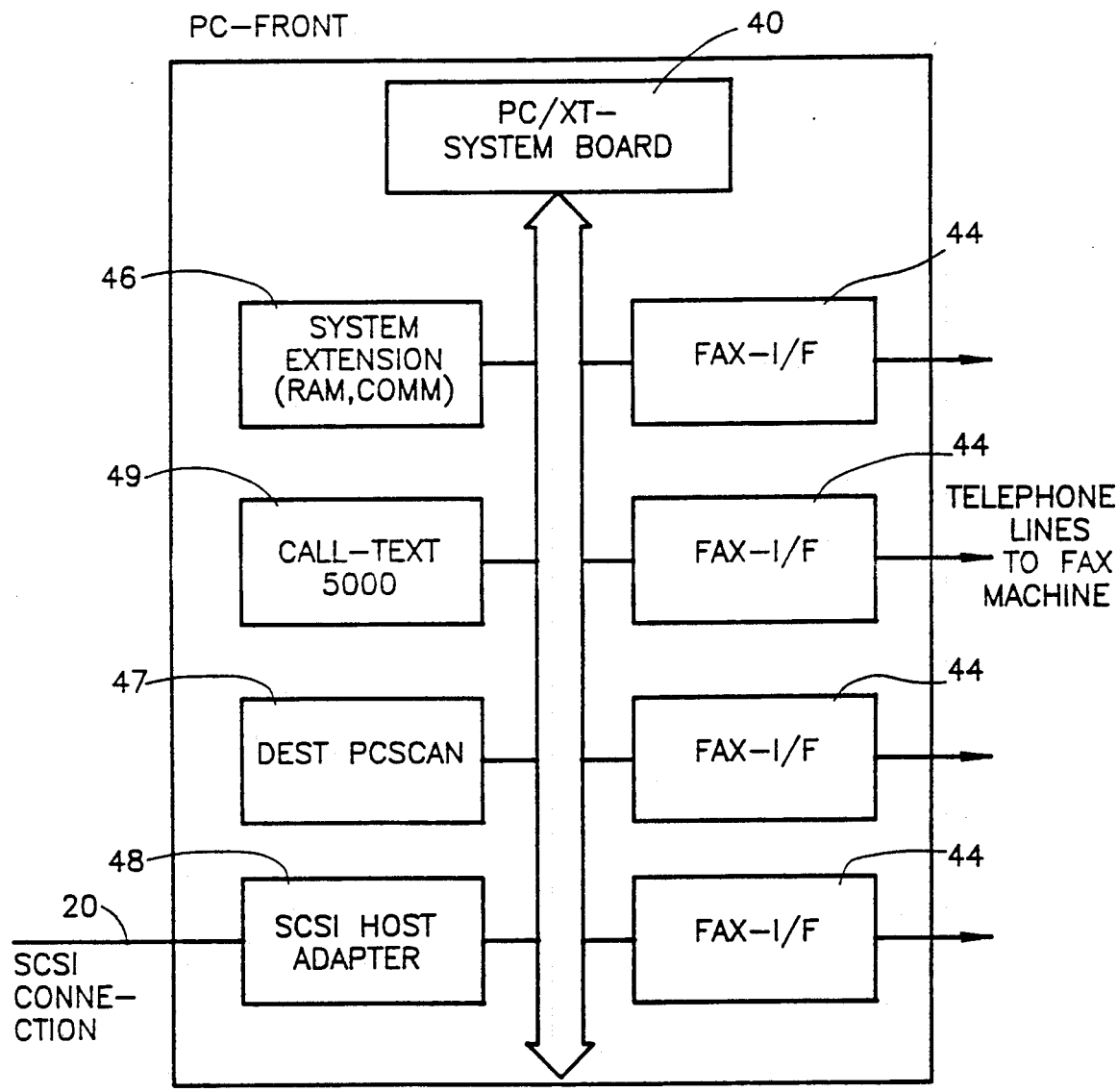
FIG. 2 is a block diagram illustration of a facsimile subsystem forming part of the system of FIG. 1.

Reference is now made to FIG. 2, which illustrates, in block diagram form, a PC subsystem 22. It is seen that the PC subsystem comprises a conventional PC/XT system board 40 connected by means of an Input-Output bus 42 to a plurality of FAX interface cards 44 available from TITN Inc. A conventional PC system extension card 46 is also coupled to bus 42, as is an SCSI Host Adapter card 48, which couples the PC subsystem to the control subsystem via SCSI bus 20 (FIG. 1). A DEST PC Scan device 47 may be provided to provide image reading capability for inputting received faxes for display or voice read out. A Call-Text device 49 may be provided for providing voice read out of incoming faxed texts.

The PC typically operates using the conventional DOS operating system. TITN's TWICE PC FAX software package resides on the facsimile card and provides an interface with group 3 facsimile systems.

TITN's TWICE PC FAX package communicates with the application software described hereinbelow via TITN's mailbox mechanism. The application software resides on the main CPU in the control subsystem which connects to the facsimile subsystem through the SCSI bus. A PCLINK software module that operates on the personal computer CPU serves as an interface between the facsimile cards and the main CPU 80 by transferring the mailbox data between the facsimile cards' memories and the control subsystem memory through the SCSI bus. Upon receiving an interrupt from a facsimile card the PCLINK instructs the PC SCSI adapter to transfer the data in the OUT part of the facsimile card mailbox structure from the facsimile card memory to the control subsystem memory 70, 78. Upon receiving an interrupt signal from the main CPU the PCLINK instructs the PC SCSI adaptor to transfer the incoming data from the SCSI bus to the IN part of the mailbox structure on the proper facsimile card memory.

Figure 3:
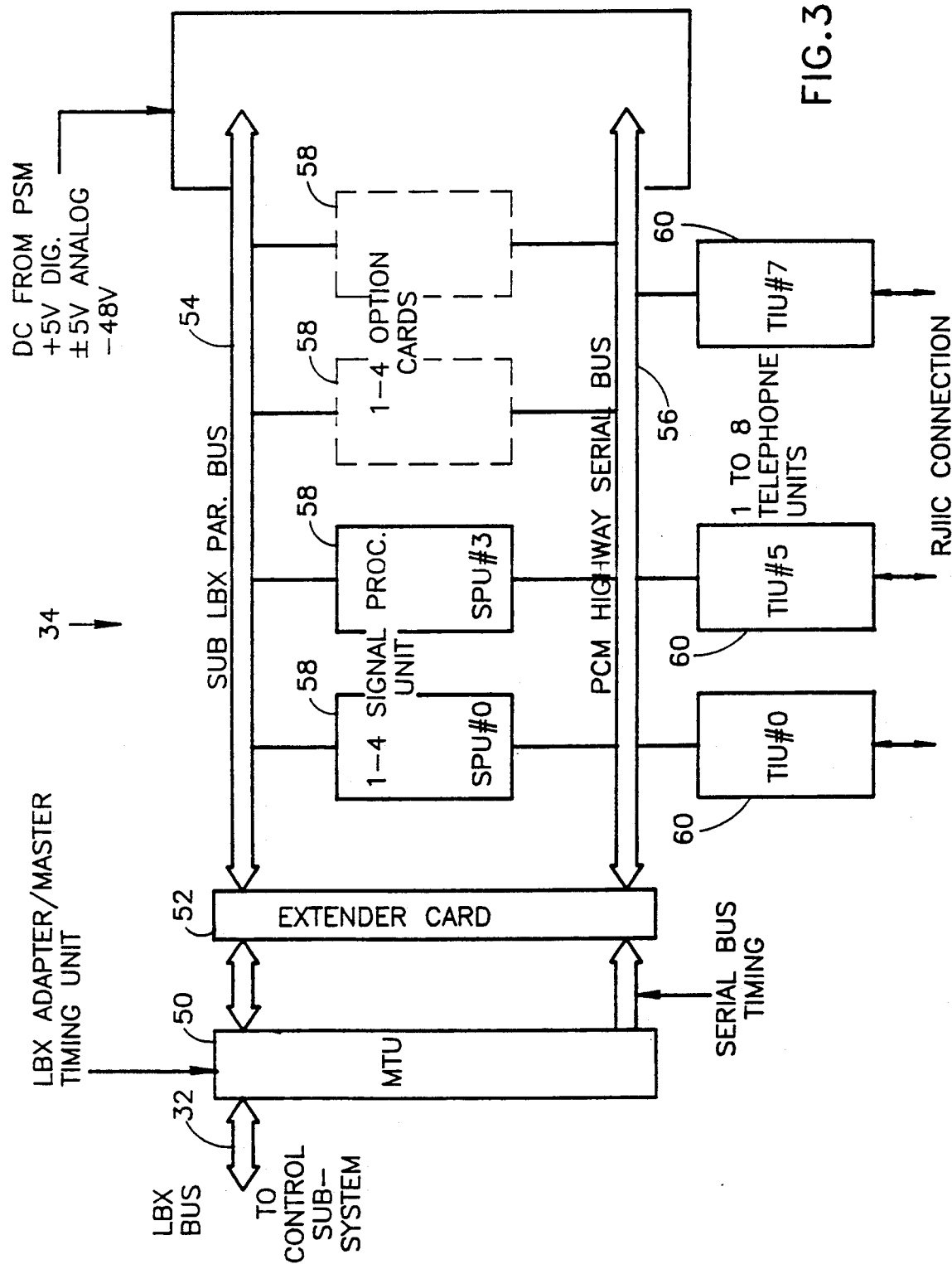
FIG. 3 is a block diagram illustration of a line subsystem forming part of the system of FIG. 1.

Reference is now made to FIG. 3, which illustrates, in block diagram form, a line subsystem 34. The line subsystem comprises an MTU interface card 50, which is described hereinbelow in connection with FIGS. 6A and 6B, and which is connected to the control subsystem via the LBX bus 32 (FIG. 1). The MTU interface card 50 is coupled via an extender card 52 to a sub LBX parallel bus 54 and to a PCM highway serial bus 56. A plurality of signal processing units (SPU) 58 are coupled to the busses 54 and 56. A plurality of telephone interface units (TIU) 60 are connected to the PCM highway bus 56 and are connected to telephone lines via an RJIIC connection.

Figure 4:
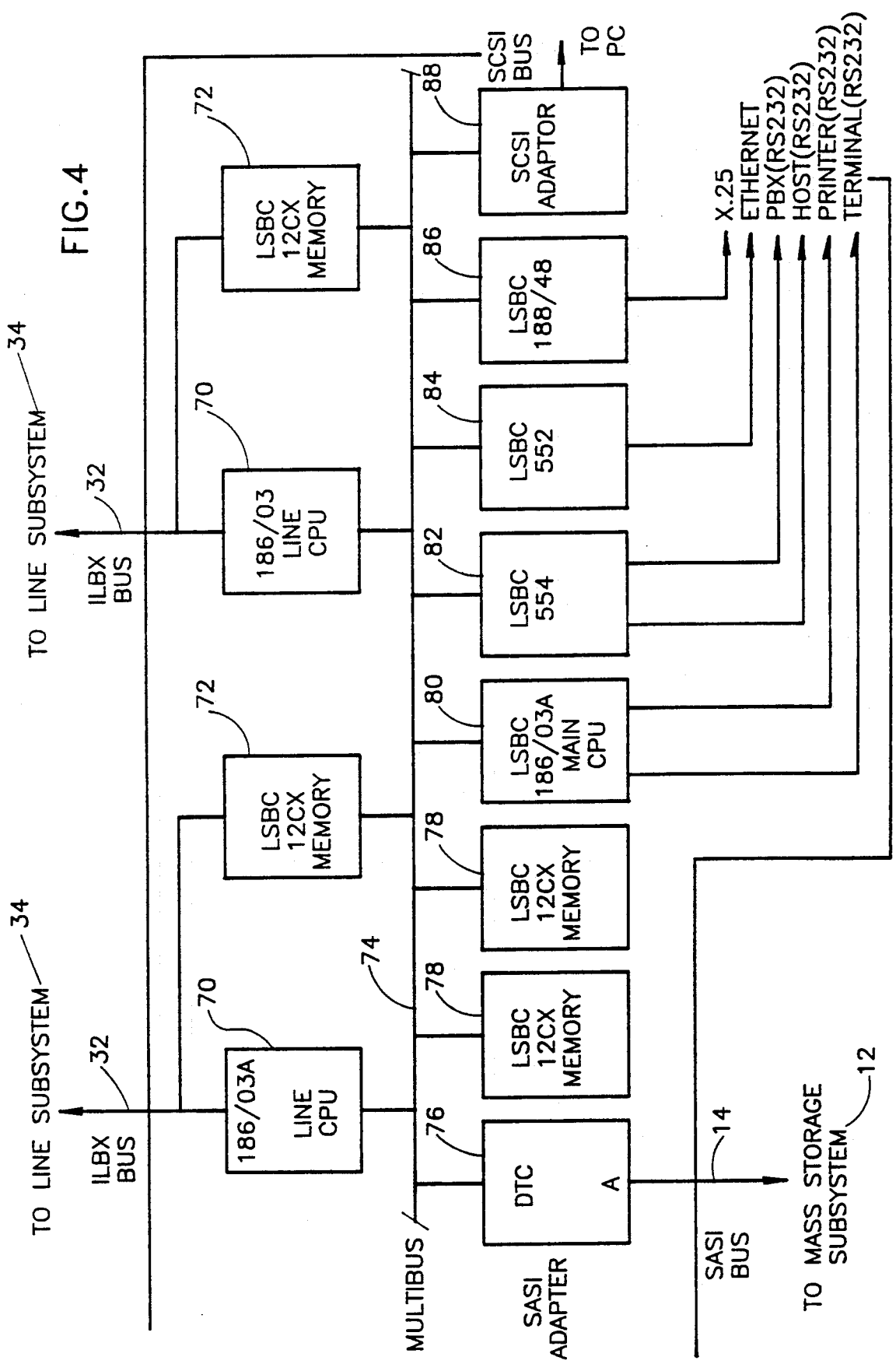
FIG. 4 is a block diagram illustration of a control subsystem forming part of the system of FIG. 1.

Reference is now made to FIG. 4, which illustrates, in block diagram form, the control subsystem 10 of FIG. 1. The control subsystem comprises a line CPU 70, such as an Intel 186/03A, and a memory 72, such as an Intel SBC12 CX memory, which are coupled to each of the line subsystems 34 via the LBX busses 32.

Line CPUs 70 and memories 72 are all connected to a multibus 74. Connected to multibus 74 are an SASI adaptor 76, coupled via SASI bus 14 to the mass storage subsystem 12, a pair of memories 78, such SBC CX 12 of Intel, a main CPU 80, such as an SBC 186/03 of Intel, a host computer interface 82, such as an Intel SBC 544, an ethernet interface 84, such as an Intel SBC 552, and X 25 interface 86, such as an Intel SBC 188/48 and an SCSI adaptor 88 which couples the control subsystem 10 via SCSI bus 20 to the PC subsystems.

Figure 5:
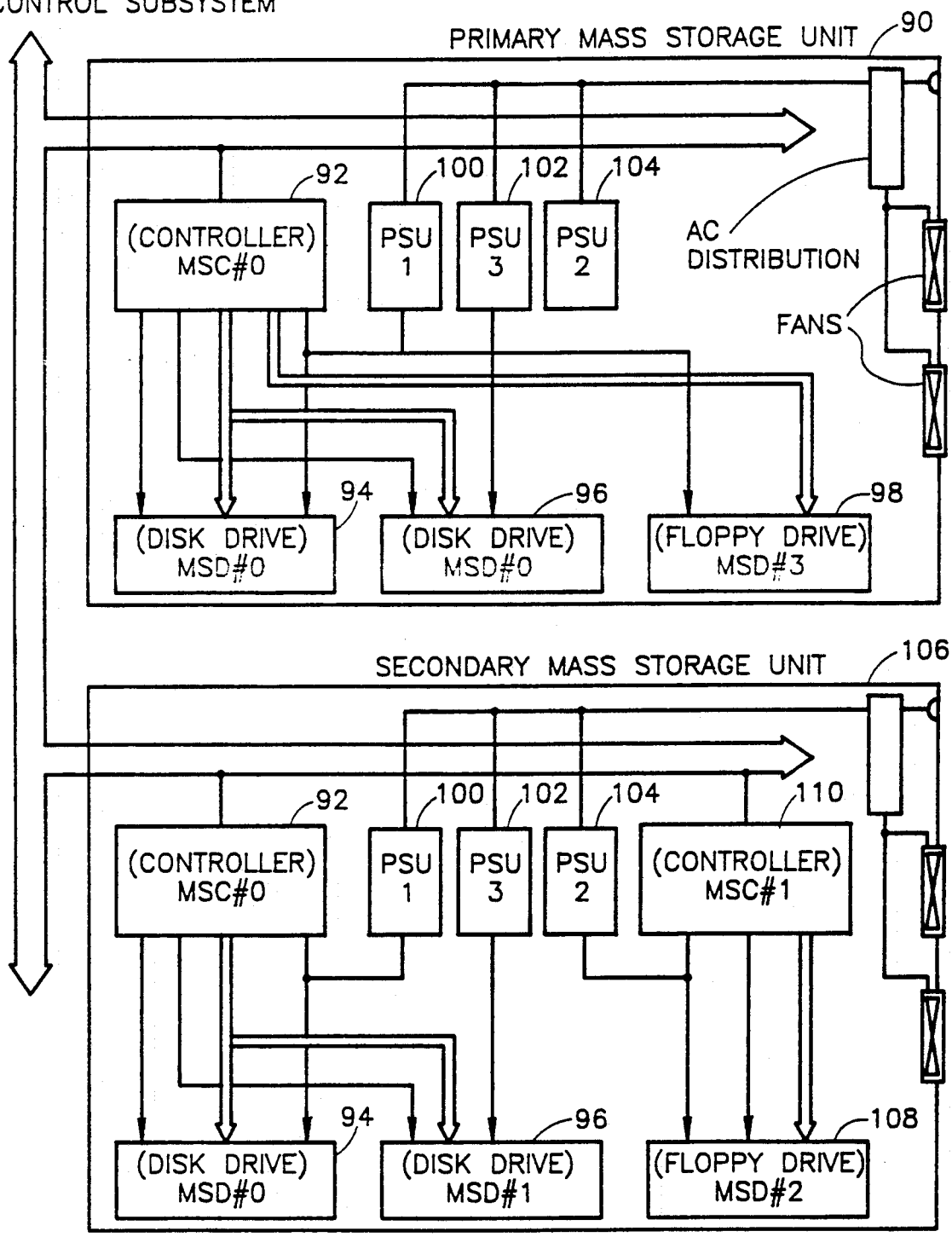
FIG. 5 is a block diagram illustration of a mass storage subsystem forming part of the system of FIG. 1.

Reference is now made to FIG. 5, which illustrates the mass storage subsystem 12. It is seen that subsystem 12 comprises a primary mass storage unit 90 including a controller 92, such as an OMTI 5200, which operates a pair of disk drives 94 and 96 and a floppy drive 98.

Subsystem 12 also comprises a secondary mass storage unit 106 which is similar to unit 90 except that it comprises a third disk drive 108, operated by a separate controller 110, in place of the floppy drive 98. PSU circuits 100, 102 and 104 provide power to the various components.

Figure 6A:
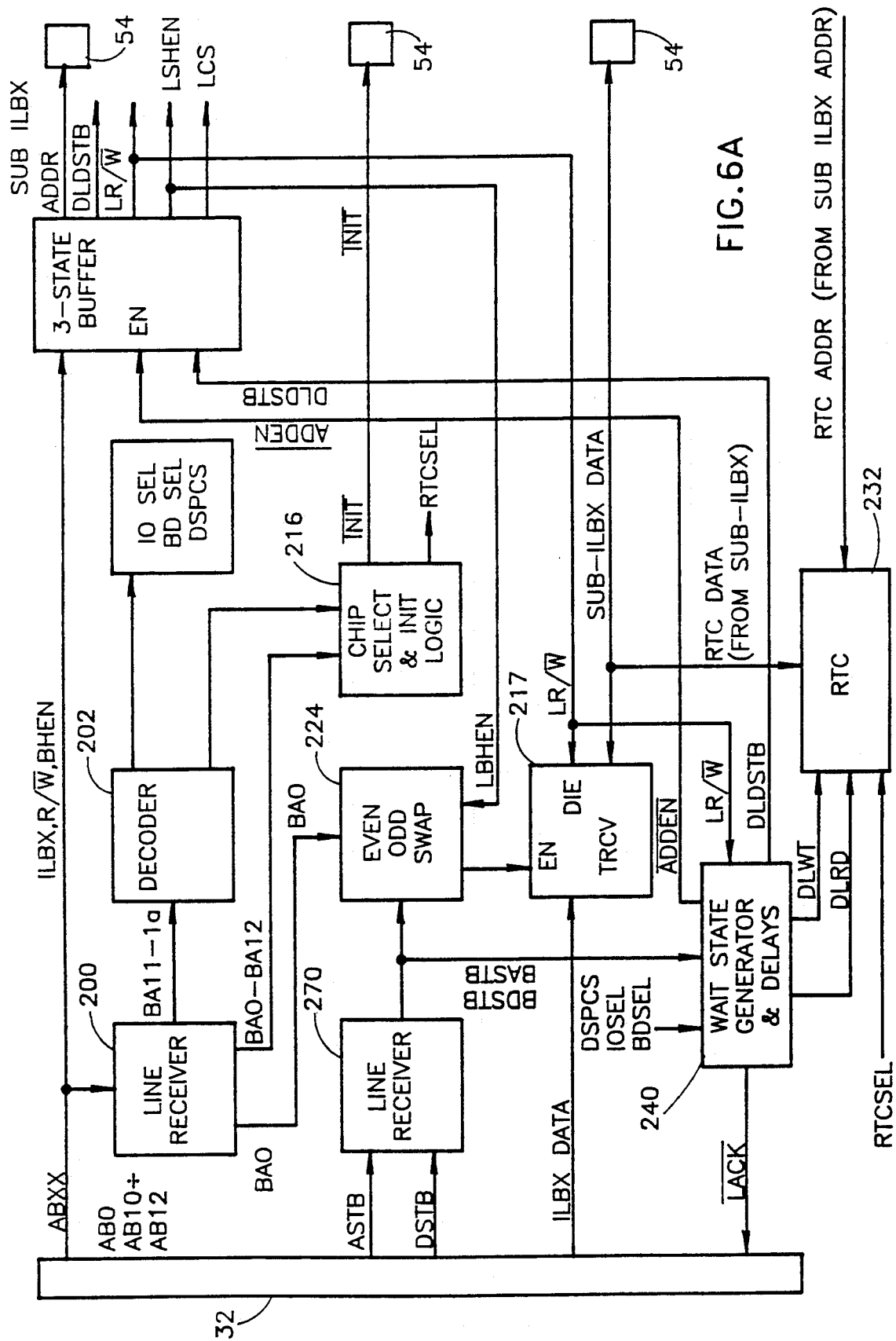
FIGS. 6A and 6B are block diagram illustrations of respectively parallel and serial MTU (Main Timing Unit) circuitry forming part of the line subsystem shown in FIG. 3.
Figure 6B:
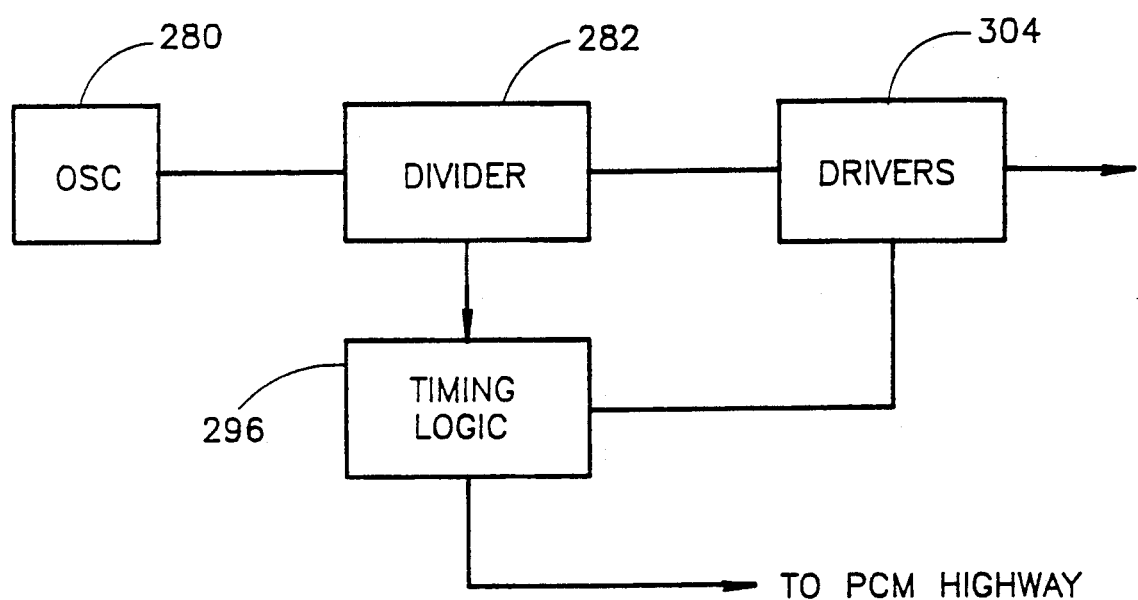

Reference is now made to FIGS. 6A and 6B, which are block diagram illustrations of MTU circuitry forming part of the line subsystem shown in FIG. 3. The general function of the MTU circuitry is to provide an interface between the LBX bus 32 and the sub-LBX parallel bus 54 enabling a line CPU 70 (FIG. 4) to access the SPU circuits 58 (FIG. 3). In addition the MTU circuitry generates the necessary timing signals for providing control of the operation of the TIU circuits 60.

Address bus signals AB0-AB19, received along the LBX bus, are processed in the following manner: Signals AB0, AB10-AB19 are fed to a line receiver 200 which shapes the signals and outputs to an address decoder 202, which generates timing signals BDSEL, DSPCS and IOSEL. Timing signal IOSEL is employed to gate the access of the line CPU 70 to the MTU circuitry 50. Timing signal DSPCS is employed to gate the access of the line CPU 70 to the SPU circuits 58. Timing signal BDSEL is employed to gate timing generation circuitry provided as part of a wait state generator 240. Address decoder 202 is typically embodied in a PROM.

Address signals AB0-AB16 supplied from LBX bus 32 are supplied to three line drivers which define a three state buffer 214, which outputs buffered subLBX address signals to the sub LBX parallel bus 54.

Buffered address signals BA0-BA12 from line receiver 200 and timing signal IOSEL are supplied to an address decoder 216, which provides chip selection and initialization logic functions.

LBX data signals from LBX bus 32 are coupled to three transceivers which are collectively indicated on FIG. 6A as transceiver 217. The transceivers, which operate in both directions, shape and buffer the signals, and are also coupled to subLBX data signals. One transceiver is employed to provide a swapping operation for a double 8 bit transfer by a 16 bit bus. The operations of the three transceivers are controlled by timing signals generated by timing circuitry 224.

The operation of timing circuitry 224 is described hereinbelow: Timing signals BDSEL, STDSTB, LBHEN and BAO are fed to timing circuitry 224, comprising an address decoder and logic gates.

A real time clock 232 supplies real time information (time and date) to the line CPU 70, which accesses clock 232 using timing signals, address signals, DLWT/, DLRD/ and data bus signals. The clock 232 receives electrical power from power supply back up circuitry (not shown).

Status input circuitry, provided as part of transceiver 217, provides conversion of analog signals from the subLBX bus to digital signals that can be read by the Line CPU 70 and includes a line receiver (not shown).

Wait state generator and delay circuitry 240 includes two shift registers, five flip flops 266, 260, 262, 264 and 266 and a decoder. Gating signals ASTB/ and DSTB are buffered by a line receiver 270 which outputs a buffered signal BDSTB to one of the flip flops and a buffered signal BASTB/ to another of the flip flop via a gate (not shown).

A clock signal together with gating signals BDSEL, DSPCS and IOSEL are supplied to the two shift registers which, in turn, output timing signals DLDSTB, DLWT/, LACK/. These timing signals are delayed versions of the corresponding inputs to the two shift registers and are used to gate input-ouput operations of the rest of the circuitry.

The MTU circuitry 50 also includes timing circuitry for the TIU and SPU circuitries 58 and 60 respectively. This timing circuitry comprises an oscillator 280, which outputs a 16 MHZ clock signal to divider circuitry 282, which includes six counters. 294, Outputs of these counters are supplied to timing logic circuitry 296, which comprises a shift register and two flip flops. Outputs from timing logic circuitry 296 and divider circuitry 282 are supplied to line driver circuitry 304 which outputs timing signals to the subLBX bus 54.

Reference is now made to FIG. 7, which is a block diagram illustration of SPU circuitry forming part of the line subsystem shown in FIG. 3. The general functions of the SPU circuitry will now be set forth:

A. Conversion of a 64 kbs PCM signal from the TIU circuitry 60 into 32 kbs ADPCM data and vice versa.

B. Detection of ring signals in cooperation with the TIU circuitry 60.

C. Detection of pulse dialing signals and, in cooperation with the TIU, detection of the DTMF dialing signals.

D. Detection of signaling tones in cooperation with the TIU circuitry 60.

E. Voice energy calculation for automatic gain control and pause compression.

F. Control of output gain via the TIU circuitry 60.

The SPU circuitry of FIG. 7 comprises interface circuitry indicated generally by reference numerals 350 and 351 in addition to digital signal processing devices 352 and 354. Interface circuitry 350 provides switch bank based communication between devices 352 and 354 on the one hand and line CPU 70 on the other hand via subLBX bus 54.

The circuitry of FIG. 7 may also be adapted to provide fax modem functions.

The operation of the switch bank based communication will now be described: At any given moment, the line CPU 70 can access RAM banks A or B, respectively indicated by reference numerals 356 and 358 via six of twelve 3-state transceivers provided in data access switch banks 360 and 362 and 3-state buffers provided in address access switch banks 364 and 366. The 3-state buffers are used to switch address signals from the subLBX bus 54 and control signals from a decoder 384 to the RAM banks A and B, while the 3-state buffers are used to switch address signals from address translation circuitry 394 and control signals from parallel read-write logic circuitry 388 to RAM banks A and B.

The three-state transceivers 360, are used to switch data signals from subLBX bus 54 and from devices 352 and 354 to the RAM banks A and B.

The switching operation is controlled by timing signals from decoder 384. A line receiver 390 shapes control signals A1, DSTB, R/W, A13-16, and LCS from the subLBX bus 54. Line receiver 390 outputs corresponding buffered signals to decoder 384, which in turn, outputs control signals which are directed to the remainder of the SPU circuitry. Decoder 384 is typically embodied in a PAL 16L8 chip.

Sync counters 392 and address translation circuitry 394 are employed to generate address signals. Address translation circuitry is typically embodied in a PROM 74S471 having firmware.

Timing circuitry located near decoder 386, which comprises two flip flops 402 and 404 and two logic gates 402 and 404, together with decoder 386 generate timing signals used to read the serial PCM information into the devices 352 and 354. Decoder 386 is typically embodied in a PAL 16L8 chip having firmware.

Figure 8:
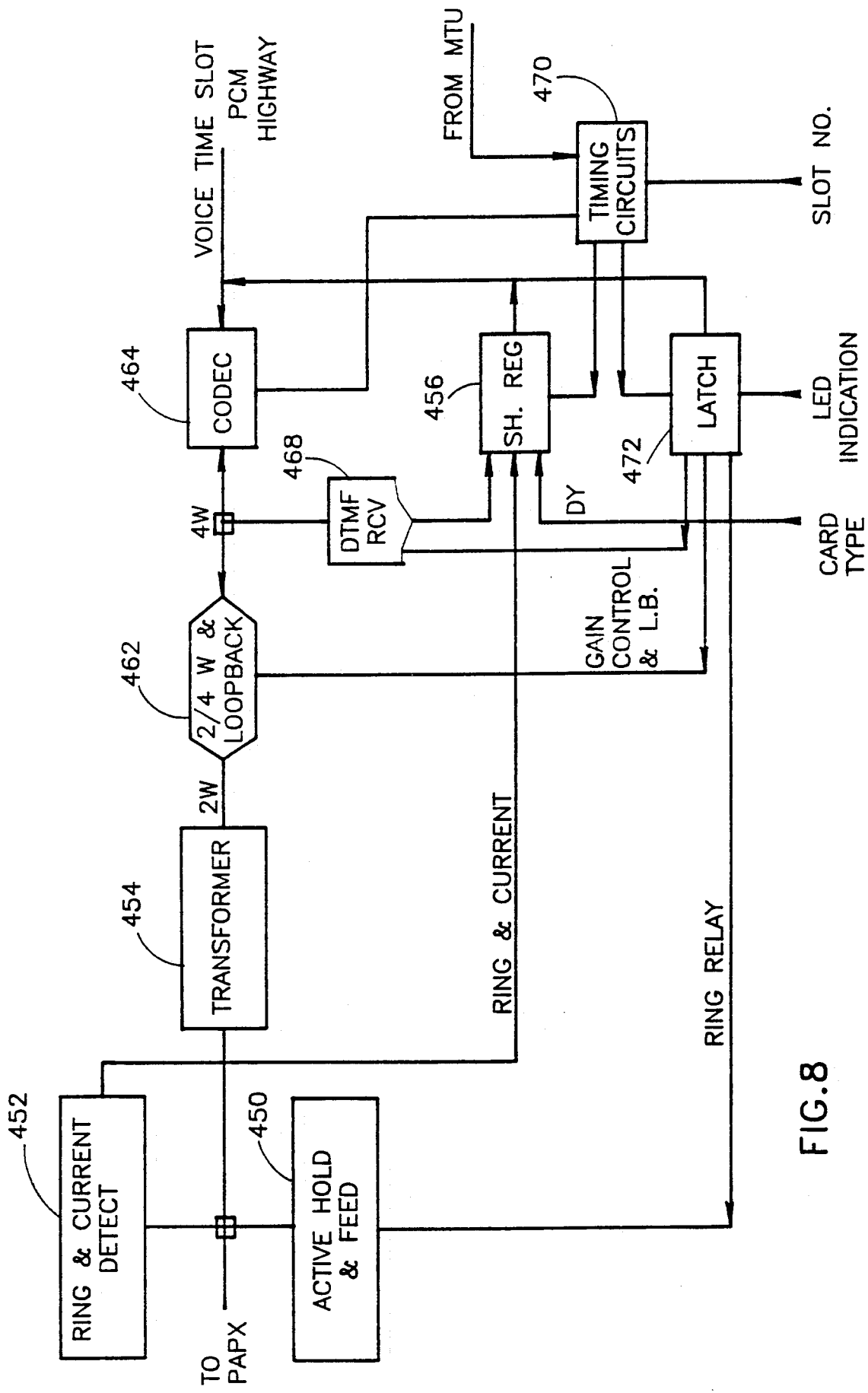
FIG. 8 is a block diagram illustration of TIU (Telephony Interface Unit) circuitry employed in the apparatus of FIG. 3.
Figure 10:
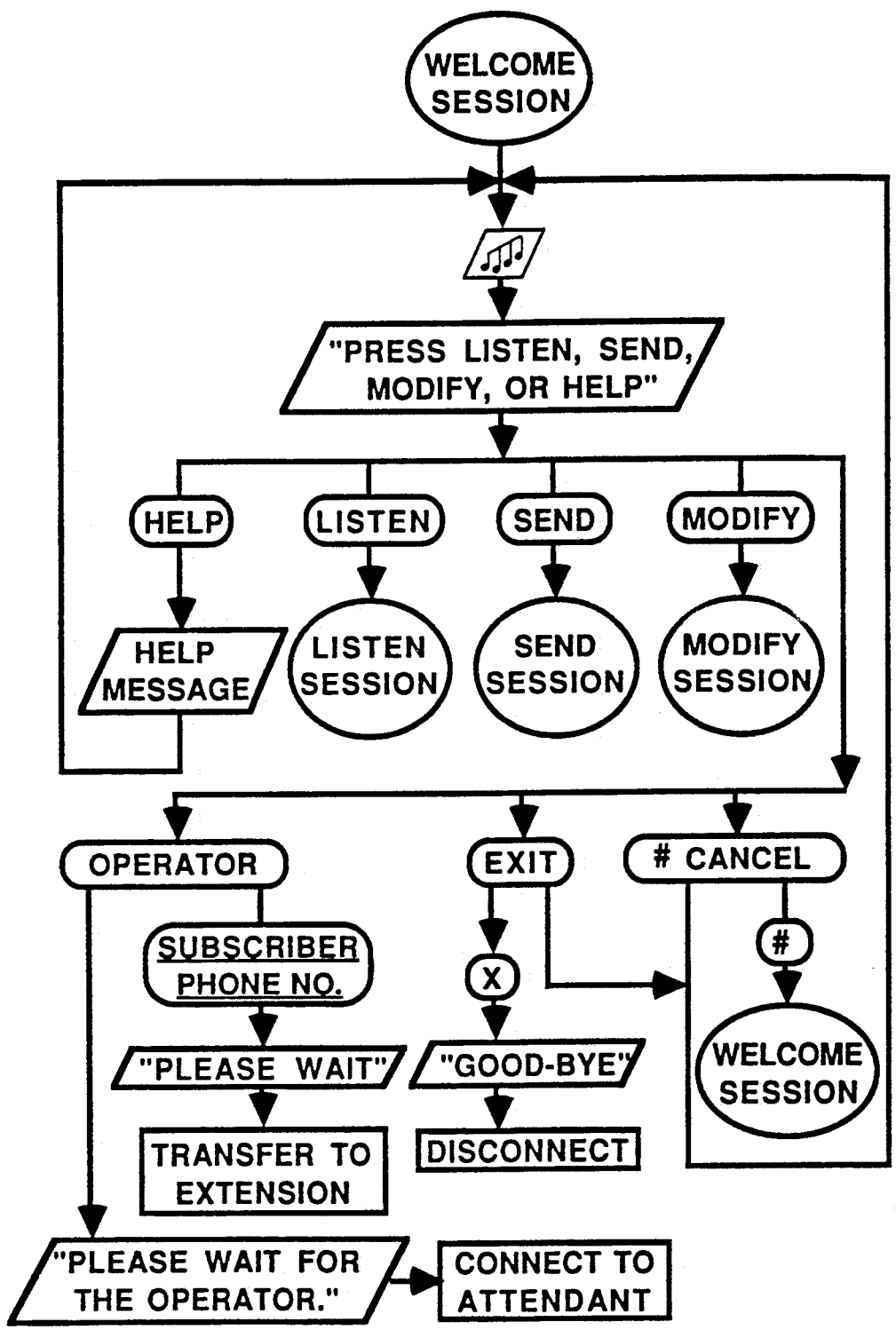
Figure 11:
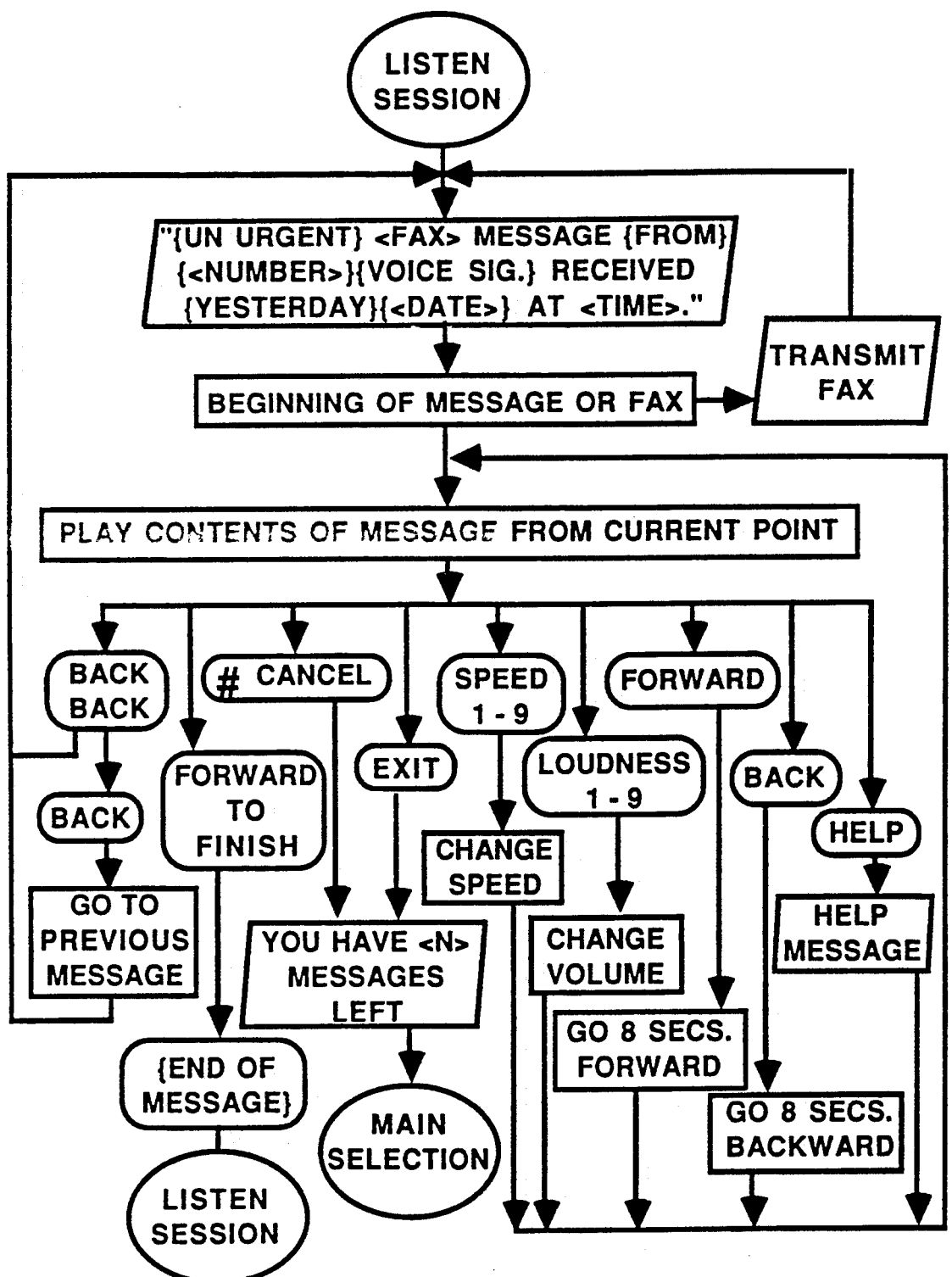
Figure 15:
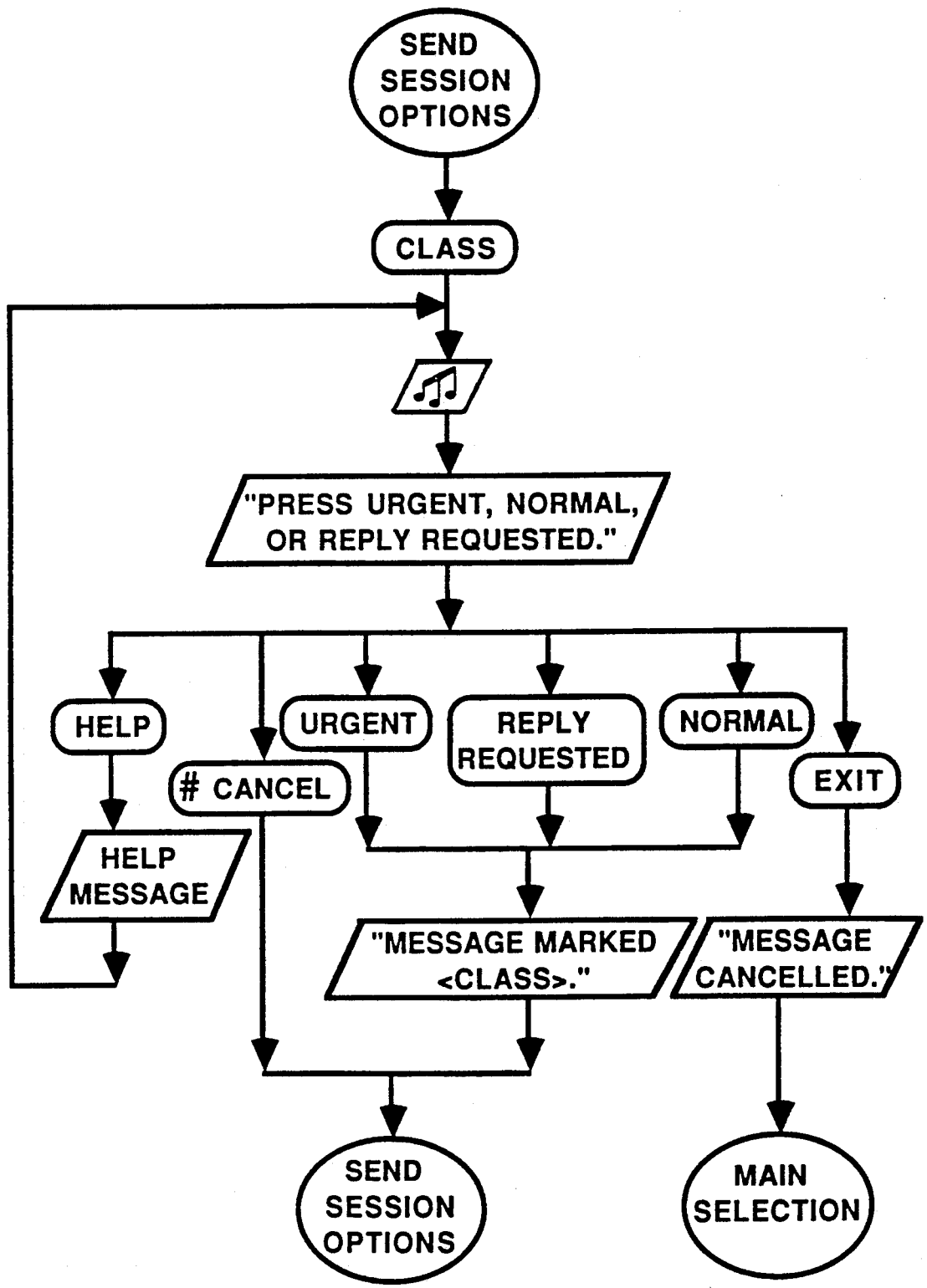
Figure 16:
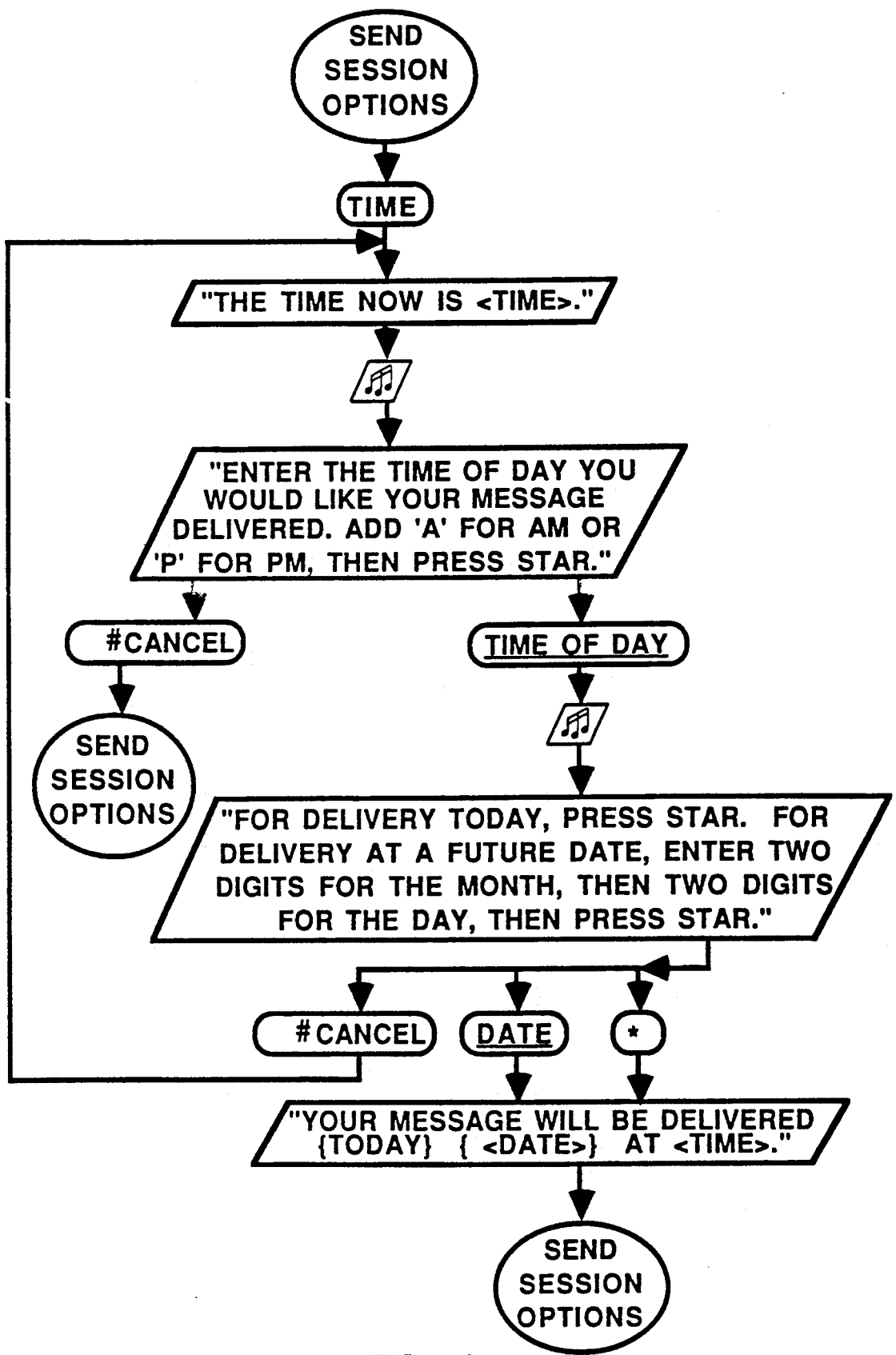

Reference is now made to FIG. 8 which is a block diagram illustration of the TIU circuitry. The general function of the TIU circuitry is to interface the store and forward system of the present invention to subscriber telephone lines. The TIU circuitry converts the analog signals on the subscriber telephone lines to digital form suitable for further processing by the SPU circuits 58. Additionally the TIU circuitry controls the conventional telephone operations such as OFF HOOK/ON HOOK.

A subscriber telephone line is connected to an active hold and feed circuit 450, to ring and current detect circuit 452 and to a transformer 454. When the subscriber calls the system, ring detect circuit 452 converts the ringing signal into a logic level which is transferred to parallel to serial conversion circuits 456. These circuits transmit the converted signal through PCM highway 56 (FIG. 3) to the SPU circuits for further processing.

When the system answers the subscriber's call, it provides an OFF HOOK operation in the following manner:

A relay which is part of ring detect circuit 452 is switched on closing a current loop through the subscriber line and hold and feed circuitry 450. Ring and current detect circuitry 452 detects the current flow through the loop and supplies a digital indication to the parallel to serial converter 456, which, in turn, transmits data through the PCM highway 56 to the SPU circuitry 58.

Any audio signal coming from the telephone subscriber line is fed to transformer 454 which provides DC isolation of 2/4 wire conversion circuitry 462 from the subscriber telephone line, while permitting passage of the audio AC signals therethrough. The 2/4 wire conversion circuitry 462 routes the incoming audio signal to a programmable gain amplifier which amplifies the signal according to a digital code supplied by control latches 472. The amplified signal is fed to an analog to digital converter (codec) 464, which converts the analog signal into a PCM equivalent waveform.

This waveform is transmitted along PCM highway 56 to the SPU circuitry 58 for compression and further processing. The system outputs audio signals to the subscriber line using the following method:

PCM coded audio signals are transferred from the SPU circuitry through the PCM highway 56 to codec 464 which converts the signal to an analog waveform. This waveform is routed by the 2/4 wire conversion circuitry 462 and through the transformer 454 to the subscriber line.

The audio from the transformer 454 is also fed to the DTMF receiver 468. This receiver detects DTMF dialing tones and converts them into 4 bit digital data. This data is coupled onto the PCM highway 56 and transmitted to the SPU circuitry 58 for further processing.

TIU circuitry 60 is controlled by gating and timing signals generated by timing circuitry 470. Whenever the SPU requires control of an operation such as OFF HOOK or OUTPUT GAIN SELECT, it issues, via the PCM highway 56, an appropriate digital code which is then latched onto registers 472 and then fed to the remainder of the circuitry, as shown in FIG. 8.

An oscillator generates a 16 MHZ signal and, together with two counters and two flip flops generates timing signals for devices 352 and 354 and a latch 416 which is used to drive indication LEDs 416.

FIGS. 9-27 are flow chart representations describing the man/machine interface of the message management system of the present invention. In view of the fact that they are self-explanatory and in the interest of conciseness, no further explanation thereof is provided herein.

It will be appreciated by persons skilled in the art that the present invention is not limited by what has been particularly shown and described hereinabove. Rather the scope of the present invention is defined only by the claims which follow:

I claim:

1. A message management system suitable for use with conventional telephones and conventional telefaxes comprising:
   means for producing a combined multi-media message, including a facsimile portion and an aurally sensible portion;
   single control means for transmitting the combined multi-media message to a selected subscriber;
   apparatus for reading said facsimile portion; and
   means for providing an aurally sensible output of said facsimile portion.

2. A message management system according to claim 1 and also comprising means for providing notification to the selected subscriber of the arrival of a multi-media message.

3. A message management system according to claim 1 and wherein said control means includes as a user interface a DTMF keypad.

4. A message management system according to claim 1 and also comprising means for storing facsimile records in digital form without an intermediate conversion to audio.

5. A message management system according to claim 1 and also comprising means permitting a subscriber receiving said message to reply or annotate said message in a medium other than that in which the message was received.

6. A message management system according to claim 5 and wherein said permitting means includes means for providing voice reply or annotation of a received message.

7. A message management system according to claim 1, wherein said conventional telephones and conventional telefaxes are located remotely from each other.

8. A message management system according to claim 1, wherein said conventional telephones and conventional telefaxes are located in close proximity to each other.

9. A message management system suitable for use with conventional telephones and conventional telefaxes comprising:
- means for producing a combined multi-media message, including a facsimile portion and an aurally sensible portion;
- single control means for transmitting the combined multi-media message to a selected subscriber;
- apparatus for reading said facsimile portion; and
- means for providing a visually sensible output of said facsimile portion on a computer display.

10. A message management system having store and forward capability for messages which may include a voice part and a facsimile part and comprising:
- interconnect subsystem means arranged to interconnect with telephone switching apparatus and image transmission apparatus;
- a control subsystem for providing control instructions to the interconnect subsystem means, including means for transmitting instructions for transmitting and receiving facsimile transmissions and voice messages and means for transmitting instructions for providing voice messages relating to such facsimile transmissions; and
- mass storage subsystem means coupled to the control subsystem for storing voice and facsimiles to be forwarded;
- and wherein said mass storage subsystem means is operative for storing voice messages, facsimile records, and messages combining voice and facsimile records to be forwarded.

11. A message management system according to claim 10 and also comprising means permitting a subscriber receiving said messages to reply or annotate said messages in a medium other than that in which the messages were received.

12. A message management system according to claim 11 and wherein said permitting means includes means for providing voice reply or annotation of received messages.

13. A message management system suitable for use with conventional telephones and conventional telefaxes comprising:
- means for producing a combined multi-media message, including a facsimile portion and an aurally sensible portion;
- control means for transmitting the combined multi-media message to a selected subscriber;
- means for providing a store and forward function including;
- interconnect subsystem means arranged to interconnect with telephone switching apparatus and facsimile transmission apparatus;
- a control subsystem for providing control instruction to the interconnect subsystem means, including means for transmitting instructions for transmitting and receiving facsimile transmissions and voice messages and means for transmitting instructions for providing voice messages relating to such facsimile transmissions; and
- mass storage subsystem means coupled to the control system for storing voice and facsimiles to be forwarded;
- and wherein said mass storage subsystem means is operative for storing voice messages, facsimile records, and messages combining voice and facsimile records to be forwarded.

* * * * *